US008447657B2

(12) United States Patent
Jungkind et al.

(10) Patent No.: US 8,447,657 B2
(45) Date of Patent: May 21, 2013

(54) ARCHITECTURAL DESIGN FOR SERVICE PROCUREMENT APPLICATION SOFTWARE

(75) Inventors: Christoph Jungkind, Heidelberg (DE); Zeno Rummler, Stutensee-Friedrichstal (DE); Dieter Krisch, Karlsruhe (DE); Jacques Duparc, Walldorf (DE); Peter Fitz, Waldsee (DE)

(73) Assignee: SAP AG, Walldorf (DE)

( * ) Notice: Subject to any disclaimer, the term of this patent is extended or adjusted under 35 U.S.C. 154(b) by 1543 days.

(21) Appl. No.: 11/967,465

(22) Filed: Dec. 31, 2007

(65) Prior Publication Data
US 2009/0172699 A1 Jul. 2, 2009

(51) Int. Cl.
G06Q 30/00 (2012.01)
G05B 19/418 (2006.01)

(52) U.S. Cl.
USPC ........................................ 705/26; 705/8

(58) Field of Classification Search ............ 705/26
See application file for complete search history.

(56) References Cited

U.S. PATENT DOCUMENTS

| | | |
|---|---|---|
| 4,947,321 A | 8/1990 | Spence et al. |
| 5,361,198 A | 11/1994 | Harmon et al. |
| 5,452,459 A | 9/1995 | Drury et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Navigational Interface For ERP System, Oct. 22, 1999, Rush et al. WO 00/23874.*

(Continued)

Primary Examiner — Garcia Ade
(74) Attorney, Agent, or Firm — Fish & Richardson P.C.

(57) ABSTRACT

Methods, systems, and apparatus, including computer program products, for implementing a software architecture design for a software application implementing service procurement. The application is structured as multiple process components interacting with each other through service interfaces, and multiple service operations, each being implemented for a respective process component. The process components include a Project Processing process component; a Purchase Request Processing process component; a Purchase Order Processing process component; a Purchasing Contract process component; a Goods and Service Acknowledgement process component; an RFQ Processing process component; and a Time and Labor Management process component.

18 Claims, 38 Drawing Sheets

U.S. PATENT DOCUMENTS

| | | | |
|---|---|---|---|
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,078,944 A | 6/2000 | Enko et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadahiro |
| 6,256,773 B1 | 7/2001 | Bowman-Amuah |
| 6,272,672 B1 | 8/2001 | Conway |
| 6,289,502 B1 | 9/2001 | Garland et al. |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,950,802 B1 | 9/2005 | Barnes et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,051,071 B2 | 5/2006 | Stewart et al. |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,762 B2 | 7/2006 | Fisher |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,130,807 B1 | 10/2006 | Mikurak |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,191,740 B2 | 3/2007 | Baba et al. |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,280,955 B2 | 10/2007 | Martin |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,401,334 B2 | 7/2008 | Fussell |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,493,594 B2 | 2/2009 | Shenfield et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,653,898 B1 | 1/2010 | Ali et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,676,786 B2 | 3/2010 | Shenfield et al. |
| 7,681,176 B2 | 3/2010 | Wills et al. |
| 7,685,022 B1 | 3/2010 | Heyworth et al. |
| 7,693,586 B2 | 4/2010 | Dumas et al. |
| 7,703,073 B2 | 4/2010 | Illowsky et al. |
| 7,739,160 B1 | 6/2010 | Ryan et al. |

| Patent/Publication | Date | Inventor(s) |
|---|---|---|
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,784,025 B2 | 8/2010 | Challapalli et al. |
| 7,788,145 B2 | 8/2010 | Wadawadigi et al. |
| 7,788,319 B2 | 8/2010 | Schmidt et al. |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,805,365 B1 | 9/2010 | Slavin et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,006,224 B2 | 8/2011 | Bateman et al. |
| 8,010,938 B2 | 8/2011 | Elaasar |
| 8,051,332 B2 | 11/2011 | Zakonov et al. |
| 8,078,485 B1 | 12/2011 | Kraehmueller et al. |
| 8,086,995 B2 | 12/2011 | Luo et al. |
| 8,091,065 B2 | 1/2012 | Mir et al. |
| 8,112,738 B2 | 2/2012 | Pohl et al. |
| 8,140,455 B2 | 3/2012 | Hutson et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0069144 A1 | 6/2002 | Palardy |
| 2002/0073114 A1 | 6/2002 | Nicastro et al. |
| 2002/0073396 A1 | 6/2002 | Crupi et al. |
| 2002/0078046 A1 | 6/2002 | Uluakar et al. |
| 2002/0082892 A1 | 6/2002 | Raffel et al. |
| 2002/0095650 A1 | 7/2002 | Green et al. |
| 2002/0100014 A1 | 7/2002 | Iborra et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0165745 A1 | 11/2002 | Greene et al. |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0101112 A1 | 5/2003 | Gallagher et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0177342 A1 | 9/2004 | Worley, Jr. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0022160 A1 | 1/2005 | Uluakar et al. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289071 A1 | 12/2005 | Goin et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0116930 A1 | 6/2006 | Goldstein |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0074150 A1 | 3/2007 | Jolfaei et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |

| | | | |
|---|---|---|---|
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1* | 7/2007 | Berger et al. ..................... 705/8 |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Moosmann et al. |
| 2007/0164849 A1 | 7/2007 | Haeberle et al. |
| 2007/0168303 A1 | 7/2007 | Moosmann et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosmann et al. |
| 2007/0220143 A1 | 9/2007 | Lund et al. |
| 2007/0233539 A1 | 10/2007 | Suenderhauf et al. |
| 2007/0233541 A1* | 10/2007 | Schorr et al. ..................... 705/8 |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0010049 A1 | 1/2008 | Pouchak et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Linthicum, D. S., "Chapter 9: RPCs, Messaging, and B2B Application Integration" in: *B2B Application Integration: E-Business Enable your Enterprise*, (Addison Wesley, 2001), pp. 167-181.

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com/docs/VCAB_datasheet.pdf.

Woods, D.; "Packaged Composite Applications: A Liberating Force for the User Interface"; Internet Citation [online]; Oct. 2004; 4 pages; http://www.sapdesignbuild.org/editions/edition7/print_composite_applications.asp.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anon,; "Sequnest Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009;28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 11/396,288; Aug. 19, 2009; 20 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.

Kalakota et al.; "Readings in Electronic Commerce"; Addison-Wesley Longman, Inc.; 1995; ISBN: 0-201-88060-1.

Orsburn; "Spares Management Handbook"; McGrawHill; 1991; ISBN: 0-8306-7626-0.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; 2004; pp. 1-208.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Office Action issued in U.S. Appl. No. 11/396,236 on Oct. 28, 2010; 19 pages.

Notice of Allowance issued in U.S. Appl. No. 12/233,554 on Sep. 17, 2010; 10 pages.

Notice of Allowance issued in U.S. Appl. No. 12/233,554 on Feb. 22, 2011; 7 pages.

Notice of Allowance issued in U.S. Appl. No. 12/233,554 on Jun. 27, 2011; 7 pages.

Office Action issued in U.S. Appl. No. 12/233,550 on Jan. 12, 2011; 29 pages.

Notice of Allowance issued in U.S. Appl. No. 12/233,550 on May 11, 2011; 20 pages.

Office Action issued in U.S. Appl. No. 12/333,146 on Sep. 6, 2011; 21 pages.

Office Action issued in U.S. Appl. No. 11/323,634 on Apr. 29, 2011; 8 pages).

Office Action issued in U.S. Appl. No. 11/322,973 on Dec. 7, 2010; 13 pages.

Office Action issued in U.S. Appl. No. 11/322,973 on May 27, 2011; 15 pages.

Notice of Allowance issued in U.S. Appl. No. 11/396,327 on Nov. 30, 2010; 28 pages.

Office Action issued in U.S. Appl. No. 11/404,147 on Nov. 24, 2010; 27 pages.

Office Action issued in U.S. Appl. No. 11/404,147 on Aug. 4, 2011; 26 pages.

Notice of Allowance issued in U.S. Appl. No. 12/233,462 on Feb. 2, 2011; 11 pages.

Notice of Allowance issued in U.S. Appl. No. 12/233,462 on May 18, 2011; 6 pages.

Notice of Allowance issued in U.S. Appl. No. 12/233,462 on Sep. 2, 2011; 7 pages.

Office Action issued in U.S. Appl. No. 12/233,457 on May 26, 2011; 19 pages.

Office Action issued in U.S. Appl. No. 11/967,483 on Aug. 20, 2010; 10 pages.

Office Action issued in U.S. Appl. No. 11/967, 483 on Mar. 4, 2011; 6 pages.

Office Action issued in U.S. Appl. No. 12/327,232 on May 26, 2011; 20 pages.

Office Action issued in U.S. Appl. No. 12/327,590 on Jun. 23, 2011; 16 pages.

Notice of Allowance issued in U.S. Appl. No. 12/333,085; Sep. 13, 2010; 8 pages.

Office Action issued in U.S. Appl. No. 12/233,087 on Aug. 18, 2011; 42 pages.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 12/233,534 on Oct. 20, 2010; 15 pages.

Notice of Allowance issued in U.S. Appl. No. 12/233,534 on Jan. 31, 2011; 15 pages.

Notice of Allowance issued in U.S. Appl. No. 12/233,534 on May 16, 2011; 12 pages.

Notice of Allowance issued in U.S. Appl. No. 11/322,382 on Sep. 20, 2010; 6 pages.

Notice of Allowance issued in U.S. Appl. No. 11/322,382 on Jan. 6, 2011; 7 pages.

Notice of Allowance issued in U.S. Appl. No. 11/322,382 on Jul. 25, 2011; 5 pages.

Notice of Allowance issued in U.S. Appl. No. 11/322,610 on Sep. 23, 2010; 6 pages.

Notice of Allowance issued in U.S. Appl. No. 11/322,610 on Dec. 22, 2010; 6 pages.

Notice of Allowance issued in U.S. Appl. No. 11/322,610 on Mar. 31, 2011; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.

Notice of Allowanced issued in U.S. Appl. No. 11/322,398 on May 27, 2011; 21 pages.

Notice of Allowance issued in U.S. Appl. No. 11/396,259 on Oct. 15, 2010; 6 pages.

Notice of Allowance issued in U.S. Appl. No. 11/396,259 on Jan. 20, 2011; 6 pages.

Notice of Allowance issued in U.S. Appl. No. 11/396,259 on Aug. 5, 2011; 7 pages.

Notice of Allowance issued in U.S. Appl. No. 11/396,288; Dec. 28, 2010; 4 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,250 on Mar. 2, 2011; 13 pages.

Notice of Allowance issued in U.S. Appl. No. 11/396,250 on Jun. 24, 2011; 5 pages.

Notice of Allowance issued in U.S. Appl. No. 11/396,258 on Jul. 28, 2010; 9 pages.

Notice of Allowance issued in U.S. Appl. No. 11/396,258 on Nov. 16, 2010; 8 pages.

Notice of Allowance issued in U.S. Appl. No. 11/396,258 on Jun. 28, 2011; 9 pages.

Notice of Allowance issued in U.S. Appl. No. 11/322,851 on Sep. 2, 2011; 8 pages.

Notice of Allowance issued in U.S. Appl. No. 11/322,845; Dec. 27, 2010; 16 pages.

Notice of Allowance issued in U.S. Appl. No. 11/322,845; Apr. 8, 2011; 8 pages.

Office Action issued in U.S. Appl. No. 11/323,040 on Nov. 5, 2010; 33 pages.

Office Action issued in U.S. Appl. No. 11/323,040 on Jul. 26, 2011; 34 pages.

Notice of Allowance issued in U.S. Appl. No. 11/397,026 on Nov. 15, 2010; 7 pages.

Notice of Allowance issued in U.S. Appl. No. 11/397,026 on Mar. 3, 2011; 6 pages.

Notice of Allowance issued in U.S. Appl. No. 11/397,026 on Jul. 20, 2011; 8 pages.

Office Action issued in U.S. Appl. No. 12/233,417 on Apr. 7, 2011; 32 pages.

Notice of Allowance issued in U.S. Appl. No. 12/233,417 on Sep. 14, 2011; 11 pages.

Notice of Allowance issued in U.S. Appl. No. 11/968,054 on Sep. 7, 2010; 11 pages.

Office Action issued in U.S. Appl. No. 12/233,530 on Apr. 29, 2011; 11 pages.

Office Action issued in U.S. Appl. No. 11/967,405 on Apr. 27, 2011; 15 pages.

Office Action issued in U.S. Appl. No. 12/233,557 on Sep. 16, 2010; 16 pages.

Office Action issued in U.S. Appl. No. 12/233,557 on Mar. 4, 2011; 19 pages.

Office Action issued in U.S. Appl. No. 12/233,489 on May 13, 2011; 15 pages.

Office Action issued in U.S. Appl. No. 11/967,393 on Apr. 15, 2011; 12 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Business Editors/Technology Writers; "CrossWorlds Software Announces J2EE Interoperability with Open Standards Interface"; Business Wire, 1; Nov. 20; Retrieved on Jun. 12, 2012.
"Extensity and Visa International Partner to Streamline Corporate Purchasing Practices"; PR Newswire; Feb. 14, 2000; Business Dateline, ProQuest, Web; Aug. 7, 2012.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu et al.; "A Building an e-Agriculture Business Intergration Platform with Web Services Composition"; IEEE; 2008; pp. 340-344.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kagermann, Prof. Dr. Henning & Dr. Peter Zencke; "Plug-and-Play Vision Nears Reality with BPM"; Business Times; Sep. 8, 2005; p. 9.
Kloppmann et al.; "Business Process Choreography in WebSphere: Combining the Power of BPEL and J2EE"; IBM Systems Journal; 2004.
Kremic, Tibor; "Outsourcing Decision Support: A Survey of Benefits, Risks, and Decision Factor"; Supply Chain Management; V. 11; 2006; pp. 467-482.
Mani et al.; "Towards Information Networks to Support Composable Manufacturing"; PerMIS 2008.
Meseroll, Robert; "Data Mining Navy Flight"; IEEE Autotestcom 2007; Sep. 2007; pp. 476-481.
Molina et al.; "Resuable Knowledge Based Components for Building Software Applications: A Knowledged Modeling Approach"; International Journal of Software Engineering and Knowledge Engineering; vol. 9, No. 3; 1999; pp. 297-317.
Sarjoughian et al.; "CoSMOs: A Visual Environment for Component Based Modeling, Experimental Design and Simulation"; ACM; 2009; pp. 1-9.
"SAP NetWeaver Empowers IT to Drive Innovation into Business Processes across the Enterprise"; Canada NewsWire, 1; May 13; Retrieved on Jun. 12, 2012.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Zeng et al.; "Model Analysis for Business Event Processing"; IBM Systems Journal 2007.
Zimmermann et al.; "Service-Oriented Architecture and Business Process Choreography in an Order Management Scenario: Rationale, Concepts, Lessons Learned"; OOPLA 2005.
Examiner's Answer to Appeal Brief issued in U.S. Appl. No. 11/396,236 on Nov. 10, 2011; 19 pages.
Notice of Allowance in U.S. Appl. No. 12/233,462 on Apr. 5, 2012; 7 pages.
Notice of Allowance in U.S. Appl. No. 12/233,462 on Dec. 12, 2011; 6 pages.
Notice of Allowance issued in U.S. Appl. No. 11/322,382 on May 21, 2012; 5 pages.
Notice of Allowance issued in U.S. Appl. No. 11/322,816 on Aug. 29, 2012; 18 pages.
Notice of Allowance issued in U.S. Appl. No. 11/322,845; Nov. 3, 2011; 9 pages.
Notice of Allowance issued in U.S. Appl. No. 11/322,845; Aug. 10, 2012; 8 pages.
Notice of Allowance issued in U.S. Appl. No. 11/322,851 on Sep. 27, 2012; 9 pages.
Notice of Allowance issued in U.S. Appl. No. 11/322,851 on Mar. 1, 2012; 9 pages.
Notice of Allowance issued in U.S. Appl. No. 11/323,040 on Jun. 8, 2012; 9 pages.
Notice of Allowance issued in U.S. Appl. No. 11/323,634 on Jan. 25, 2012; 5 pages.
Notice of Allowance issued in U.S. Appl. No. 11/323,634 on Aug. 9, 2012; 20 pages.
Notice of Allowance issued in U.S. Appl. No. 11/396,250 on Dec. 7, 2011; 6 pages.
Notice of Allowance issued in U.S. Appl. No. 11/396,250 on Jul. 10, 2012; 6 pages.
Notice of Allowance issued in U.S. Appl. No. 11/396,258 on Aug. 21, 2012; 11 pages.
Notice of Allowance issued in U.S. Appl. No. 11/396,258 on Feb. 3, 2012; 12 pages.
Notice of Allowance issued in U.S. Appl. No. 11/396,259 on Oct. 2, 2012; 7 pages.
Notice of Allowance issued in U.S. Appl. No. 11/396,259 on Mar. 15, 2012; 7 pages.
Notice of Allowance issued in U.S. Appl. No. 11/396,288; Apr. 27, 2012; 15 pages.
Notice of Allowance issued in U.S. Appl. No. 11/396,327 on Jun. 20, 2012; 29 pages.
Notice of Allowance issued in U.S. Appl. No. 11/396,327 on Sep. 28, 2011; 31 pages.
Notice of Allowance issued in U.S. Appl. No. 11/397,026 on Feb. 23, 2012; 8 pages.
Notice of Allowance issued in U.S. Appl. No. 11/397,026 on Nov. 4, 2011; 8 pages.
Notice of Allowance issued in U.S. Appl. No. 11/404,147 on Jul. 5, 2012; 5 pages.
Notice of Allowance issued in U.S. Appl. No. 11/967,393 on Nov. 9, 2011; 9 pages.
Notice of Allowance issued in U.S. Appl. No. 11/967,405 on Aug. 17, 2012; 15 pages.
Notice of Allowance issued in U.S. Appl. No. 12/233,075 on Mar. 22, 2012; 25 pages.
Notice of Allowance issued in U.S. Appl. No. 12/233,075 on Nov. 9, 2012; 16 pages.
Notice of Allowance issued in U.S. Appl. No. 12/233,087 on Mar. 30, 2012; 30 pages.
Notice of Allowance issued in U.S. Appl. No. 12/233,289 on Feb. 15, 2012; 11 pages.
Notice of Allowance issued in U.S. Appl. No. 12/233,289 on Sep. 18, 2012; 9 pages.
Notice of Allowance issued in U.S. Appl. No. 12/233,417 on Jul. 27, 2012; 10 pages.

Notice of Allowance issued in U.S. Appl. No. 12/233,457 on May 16, 2012; 7 pages.
Notice of Allowance issued in U.S. Appl. No. 12/233,457 on Nov. 3, 2011; 12 pages.
Notice of Allowance issued in U.S. Appl. No. 12/233,458 on May 1, 2012; 17 pages.
Notice of Allowance issued in U.S. Appl. No. 12/233,520 on Nov. 10, 2011; 22 pages.
Notice of Allowance issued in U.S. Appl. No. 12/233,534 won Dec. 28, 2011; 7 pages.
Notice of Allowance issued in U.S. Appl. No. 12/233,534 won Jul. 18, 2012;16 pages.
Notice of Allowance issued in U.S. Appl. No. 12/233,550 on Sep. 26, 2012, 2012; 18 pages.
Notice of Allowance issued in U.S. Appl. No. 12/233,550 on Jan. 9, 2012; 11 pages.
Notice of Allowance issued in U.S. Appl. No. 12/233,554 on Aug. 3, 2012; 8 pages.
Notice of Allowance issued in U.S. Appl. No. 12/327,232 on Jun. 6, 2012; 7 pages.
Notice of Allowance issued in U.S. Appl. No. 12/327,232 on Nov. 2, 2011; 16 pages.
Notice of Allowance issued in U.S. Appl. No. 12/327,354 on Jul. 25, 2012; 17 pages.
Notice of Allowance issued in U.S. Appl. No. 12/327,590 on Dec. 28, 2011; 10 pages.
Notice of Allowance issued in U.S. Appl. No. 12/327,590 on Jul. 19, 2012; 11 pages.
Notice of Allowance issued in U.S. Appl. No. 12/327,701 on Apr. 6, 2012; 9 pages.
Notice of Allowance issued in U.S. Appl. No. 12/327,737 on Jul. 10, 2012; 7 pages.
Notice of Allowance issued in U.S. Appl. No. 12/332,965 on Jun. 11, 2012; 21 pages.
Notice of Allowance isued in U.S. Appl. No. 11/323,039 on Jun. 7, 2012; 9 pages.
Notice of Allowanced issued in U.S. Appl. No. 11/322,398 on May 3, 2012; 7 pages.
Notice of Allowanced issued in U.S. Appl. No. 11/322,398 on Oct. 18, 2011; 7 pages.
Notice of Allowance issued in U.S. Appl. No. 11/322,383 on May 21, 2012; 14 pages.
Office Action issued in U.S. Appl. No. 11/322,482; Aug. 21, 2012; 27 pages.
Office Action issued in U.S. Appl. No. 11/322,612 on Jun. 26, 2012; 11 pages.
Office Action issued in U.S. Appl. No. 11/322,816 on Jun. 7, 2012; 12 pages.
Office Action issued in U.S. Appl. No. 11/323,041 on Jun. 7, 2012; 12 pages.
Office Action issued in U.S. Appl. No. 11/396,252 on Nov. 10, 2011; 18 pages.
Office Action issued in U.S. Appl. No. 11/396,288 on Oct. 17, 2011; 38 pages.
Office Action issued in U.S. Appl. No. 11/967,387 on Apr. 12, 2012; 13 pages.
Office Action issued in U.S. Appl. No. 11/967,489 on Feb. 6, 2012; 9 pages.
Office Action issued in U.S. Appl. No. 11/967,489 on Sep. 28, 2011; 7 pages.
Office Action issued in U.S. Appl. No. 12/233,289 on Oct. 27, 2011; 15 pages.
Office Action issued in U.S. Appl. No. 12/233,458 on Oct. 12, 2011; 19 pages.
Office Action issued in U.S. Appl. No. 12/233,479 on May 7, 2012; 26 pages.
Office Action issued in U.S. Appl. No. 12/233,479 on Oct. 27, 2011; 24 pages.
Office Action issued in U.S. Appl. No. 12/233,489 on Jun. 6, 2012; 87 pages.
Office Action issued in U.S. Appl. No. 12/327,701 on Nov. 8, 2011; 20 pages.
Office Action issued in U.S. Appl. No. 12/327,737 on Mar. 26, 2012; 14 pages.
Office Action issued in U.S. Appl. No. 12/332,965 on Oct. 11, 2011; 6 pages.
Office Action issued in U.S. Appl. No. 12/333,146 on Feb. 2, 2012; 21 pages.
Office Action issued in U.S. Appl. No. 13/413,069 on Aug. 1, 2012; 18 pages.
Supplemental Notice of Allowance issued in U.S. Appl. No. 12/333,085; Jun. 13, 2012; 5 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaptation"; International Workshop on Software Engineering for Adaptive and Self-Managing Systems (SEAMS '08); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistic Management; vol. 12, No. 1; 2001, pp. 1-19.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Supper 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Jun. 25, 2009; 9 pages.
Office Action issued in U.S. Appl. No. 12/333,085; Mar. 23, 2010; 5 pages.

* cited by examiner

ARCHITECTURAL DESIGN FOR SERVICE PROCUREMENT APPLICATION SOFTWARE

BACKGROUND

The subject matter of this patent application relates to computer software architecture, and, more particularly, to the architecture of application software for service procurement.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing service procurement.

In its various aspects, the subject matter described in the specification can be implemented as methods, systems, and apparatus, including computer program products, for implementing a software architecture design for a software application implementing service procurement. The software application is structured as multiple process components interacting with each other through service interfaces, and multiple service operations, each being implemented for a respective process component. The process components include a Project Processing process component; a Purchase Request Processing process component; a Purchase Order Processing process component; a Purchasing Contract Processing process component; a Goods and Service Acknowledgement process component; a Supplier Invoice Processing process component; an RFQ Processing process component; an Accounting process component; a Balance of Foreign Payment Management process component; a Due Item Processing process component; a Payment Processing process component; an Internal Request Processing process component; and a Time and Labor Management process component.

In its various aspects, the subject matter can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1:
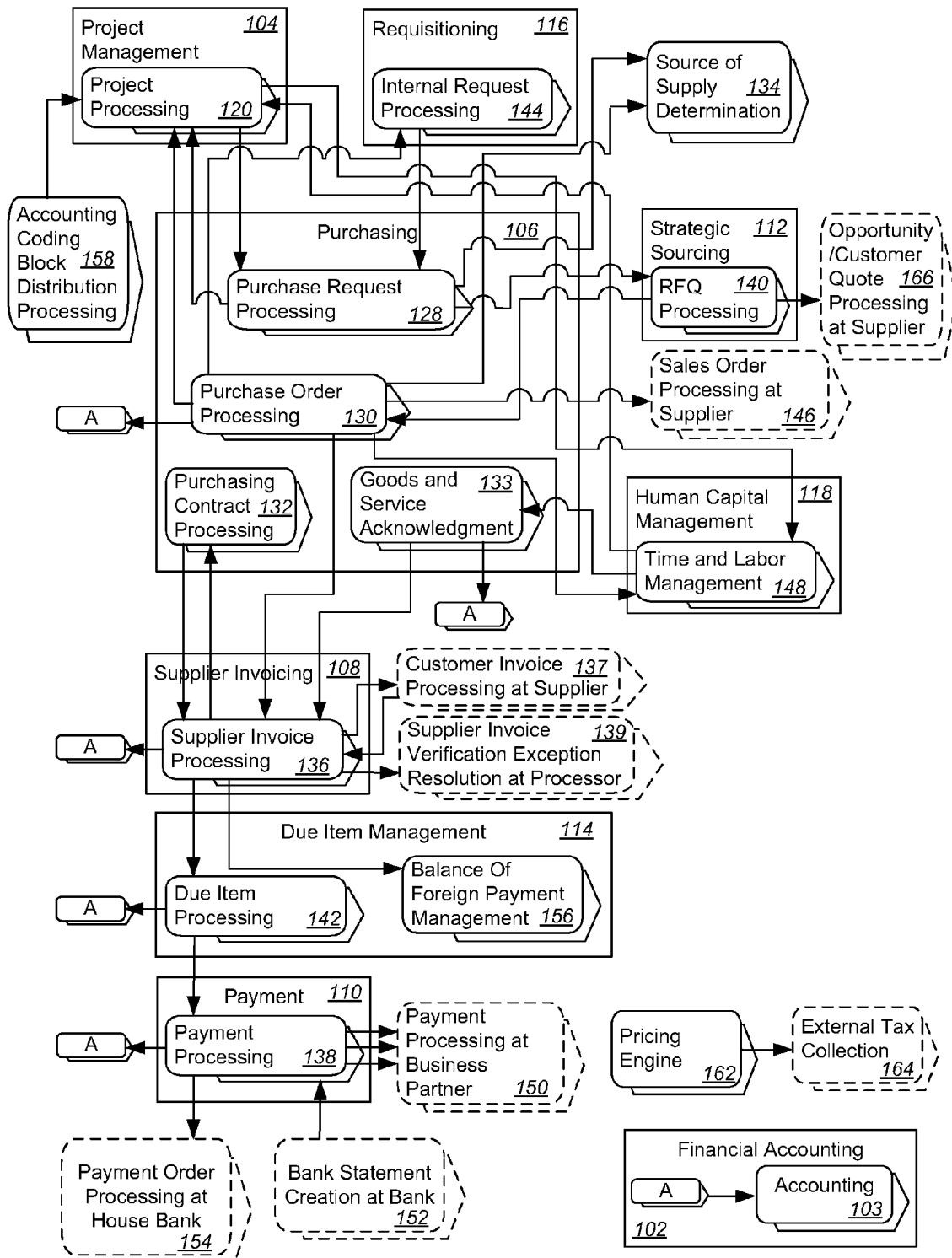
FIG. 1 is a block diagram of a software architectural design for a service procurement software application.

FIG. 1 shows the software architectural design for a service procurement software application. The service procurement application is software that implements an operative procurement of planned and unplanned external services triggered by internal requests, purchase orders, or project tasks.

As shown in FIG. 1, the service procurement design includes a Financial Accounting deployment unit 102, a Project Management deployment unit 104, a Purchasing deployment unit 106, a Supplier Invoicing deployment unit 108, a Payment deployment unit 110, a Strategic Sourcing deployment unit 112, a Due Item Management deployment unit 114, a Requisitioning deployment unit 116, and a Human Capital Management deployment unit 118.

The Financial Accounting deployment unit 102 includes an Accounting process component 103 that represents relevant business transactions for valuation and profitability analysis.

The Project Management deployment unit 104 includes a Project Processing process component 120 that is responsible for structuring, planning, and executing measures or projects (e.g., short-term measures, complex projects, etc).

The Purchasing deployment unit 106 includes a Purchase Request Processing process component 128, a Purchase Order Processing process component 130, a Purchase Contract Processing process component 132, and a Goods and Service Acknowledgement process component 133. The Purchase Request Processing process component 128 handles the creation, change, or processing of purchase requests to locate appropriate external sources of supply. The Purchase Order Processing process component 130 handles the creation and maintenance of purchase orders and purchase order confirmations. The Purchasing Contract Processing process component 132 handles the creation and maintenance of purchasing contracts. The Purchasing Contract Processing process component 132 includes a Purchasing Contract business object. The Goods and Service Acknowledgement process component 133 represents a confirmation by an employee of goods received or services rendered.

The Supplier Invoicing deployment unit 108 includes a Supplier Invoice Processing process component 136 that represents management and volume processing of supplier invoices, including exception handling and approval. The Supplier Invoice Processing process component 136 includes a supplier invoice business object and a supplier invoice request business object. The supplier invoice is a document that states the recipient's obligation to pay the supplier for goods received or services rendered. The invoice may be created after the goods and service acknowledgment has been confirmed. The supplier invoice request is a document that is sent to invoice verification, advising that an invoice for specified quantities and prices is expected and may be created through evaluation settlement. The system uses the invoice request as a basis for invoice verification, as well as for the automatic creation of the invoice.

The Payment deployment unit 110 includes a Payment Processing process component 138. The Payment Processing process component 138 is used to handle the processing and management of all payments and is also responsible for the associated communication with financial institutions such as banks, and provides the primary input for liquidity management.

The Strategic Sourcing Processing deployment unit 112 includes an RFQ Processing process component 140. The RFQ Processing process component 140 handles requests for quotes and supplier quotes for strategic as well as operational negotiation purposes. In general, a request for quotation (RFQ) is a description of materials and services that purchasers use to request responses from potential suppliers. Requests for Quotation can be one of a number of types, including: a request for price information, a request for quote that may run over a certain period of time, a request for proposal in complex purchasing situation or live auctions that may be performed over a short time frame. A quote is a response to a request for quotation in which a supplier offers to sell goods and services at a certain price. The quote can be subject to complex pricing and conditions.

The Due Item Management deployment unit 114 includes a Due Item Processing process component 142, and a Balance Of Foreign Payment Management process component 156.

The Due Item Processing process component 142 is used to collect, manage, and monitor trade receivables or payables and corresponding taxes, e.g., sales tax or withholding tax. The Balance Of Foreign Payment Management process component 156 is used to collect, process, and report receivables and payables to foreign trade regulations that are required by the central banks to create the balance of payments of a country.

The Requisitioning deployment unit 116 includes an Internal Request Processing process component 144. The Internal Request Processing process component 144 handles the management and processing of internal requests from employees. Employees of a company may make an internal request for the procurement of goods or services for the company. For example, the employees can order stationary, computer hardware, or removal services by creating an internal request. The internal request can be fulfilled by an issue of a purchase request to the purchasing department, a reservation of goods from stock, or a production request.

The Human Capital Management deployment unit 118 includes a Time and Labor Management process component 148. The Time and Labor Management process component 148 handles the management of employees' planned working times, and the recording and valuation of work performed and absence times.

The foundation layer, described below, includes a Source of Supply Determination process component 134, an Accounting Coding Block Distribution Processing process component 158, and a Pricing Engine processing component 162. The Pricing Engine process component 162 handles the processing of price and tax calculations. The Accounting Coding Block Distribution Processing process component 158 handles the registration and checking of all accounting objects that can be assigned in a source document for a business transaction, such as cost center or project. The process component 158 can dispatch a check request to the Financial Accounting deployment unit 102.

The Source of Supply Determination process component 134 handles the maintenance of and access to sources of supply and quota arrangements for external and internal procurement processes. The Source of Supply Determination process component 134 uses two business objects to determine a source of supply: a supply quota arrangement business object, and a source of supply business object. A supply quota arrangement is a distribution of material requirements or goods to different sources of supply, business partners, or organizational units within a company. An example of the use of supply quota arrangements is the distribution of material requirements between in-house production and different sources for external procurement. A supply quota arrangement can also define the distribution of goods to customers in case of excess production or shortages. A source of supply is an object that describes a logical link between a possible source of products and a possible target.

A number of external process components, described below, will be used to describe the architectural design. These include a Customer Invoice Processing at Supplier process component 137, a Supplier Invoice Verification Exception Resolution at Processor process component 139, a Sales Order Processing at Supplier process component 146, a Payment Processing at Business Partner process component 150, a Bank Statement Creation at Bank process component 152, a Payment Order Processing at House Bank process component 154, an External Tax Collection process component 164, and an Opportunity/Customer Quote Processing at Supplier process component 166.

The Pricing Engine process component 162 requests a tax calculation from the External Tax Collection process component 164.

The RFQ Processing process component 140 requests the creation or update of a supplier quote from the Opportunity/Customer Quote Processing at Supplier process component 166.

The Supplier Invoice Processing process component 136 sends messages to and receives messages from the Customer Invoice Processing at Supplier processing component 137, which is used, at a supplier, to charge a customer for the delivery of goods or services. The Supplier Invoice Processing process component 136 also sends messages to the Supplier Invoice Verification Exception Resolution at Processor process component 139.

The Sales Order Processing at Supplier process component 146 receives messages from the Purchase Order Processing process component 130. The Sales Order Processing at Supplier process component 146 handles customers' requests to a company for delivery of goods or services at a certain time. The requests can be received by a sales area, which is then responsible for fulfilling the contract.

The Payment Processing at Business Partner process component 150, the Bank Statement Creation at Bank process component 152, and the Payment Order Processing at House Bank process component 154 can interact with the Payment Processing process component 138. The Payment Processing process component 138 sends updates to a Payment Processing at Business Partner processing component 150, which is used to handle, at the business partner, all incoming and outgoing payments and represent the main data base for the liquidity status. The Payment Processing process component 138 also receives messages from the Bank Statement Creation at Bank process component 152. The message can include a bank statement for a bank account. The Payment Processing process component 138 send messages to the Payment Order Processing at House Bank process component 154. The messages can include a bank payment order that is a payment order which will be sent to a house bank. The bank payment order can include bank transfers as well direct debits.

Figure 2:
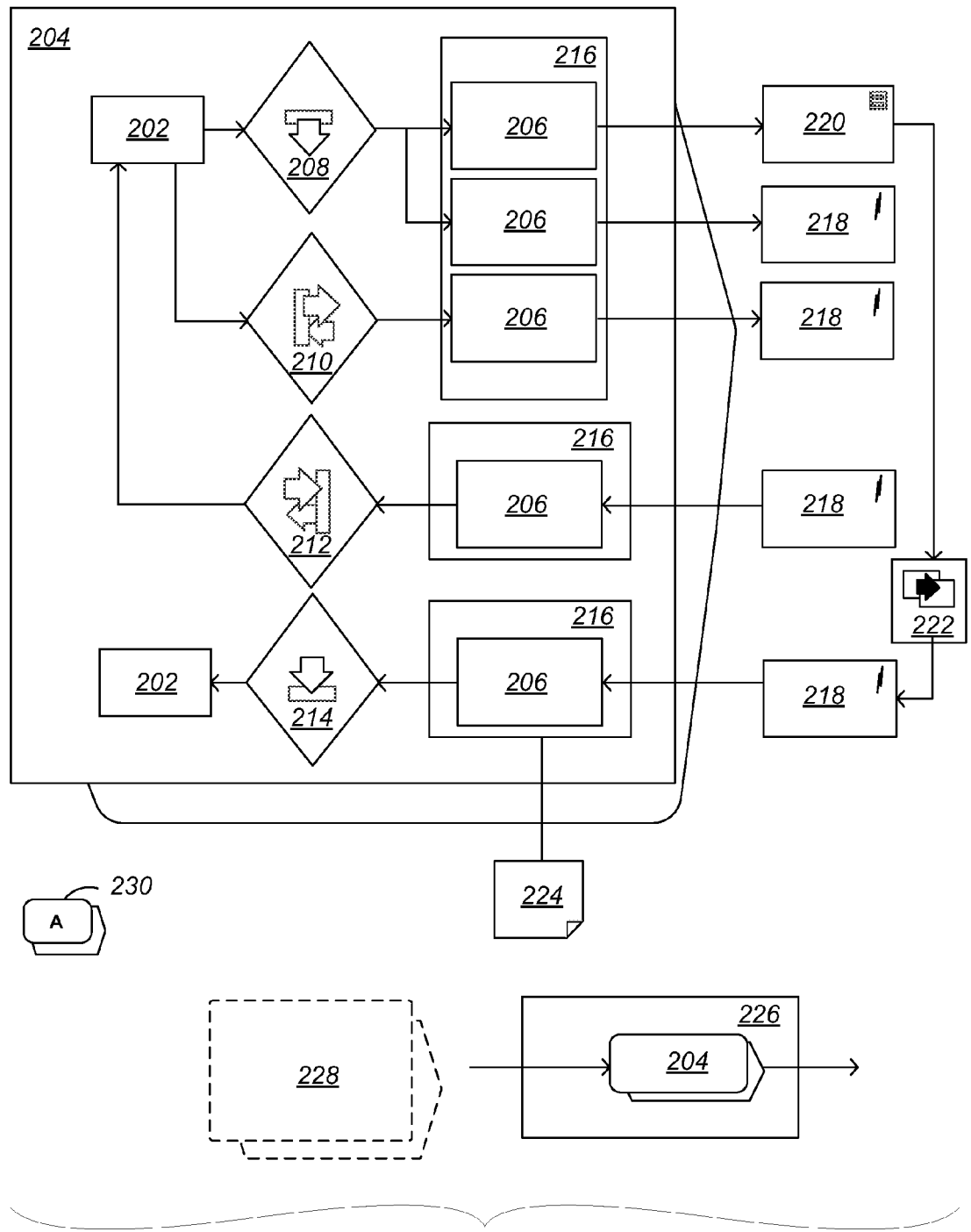
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIG. 1 by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions between Process Components "Purchase Request Processing" and "Project Processing"

Figure 3:
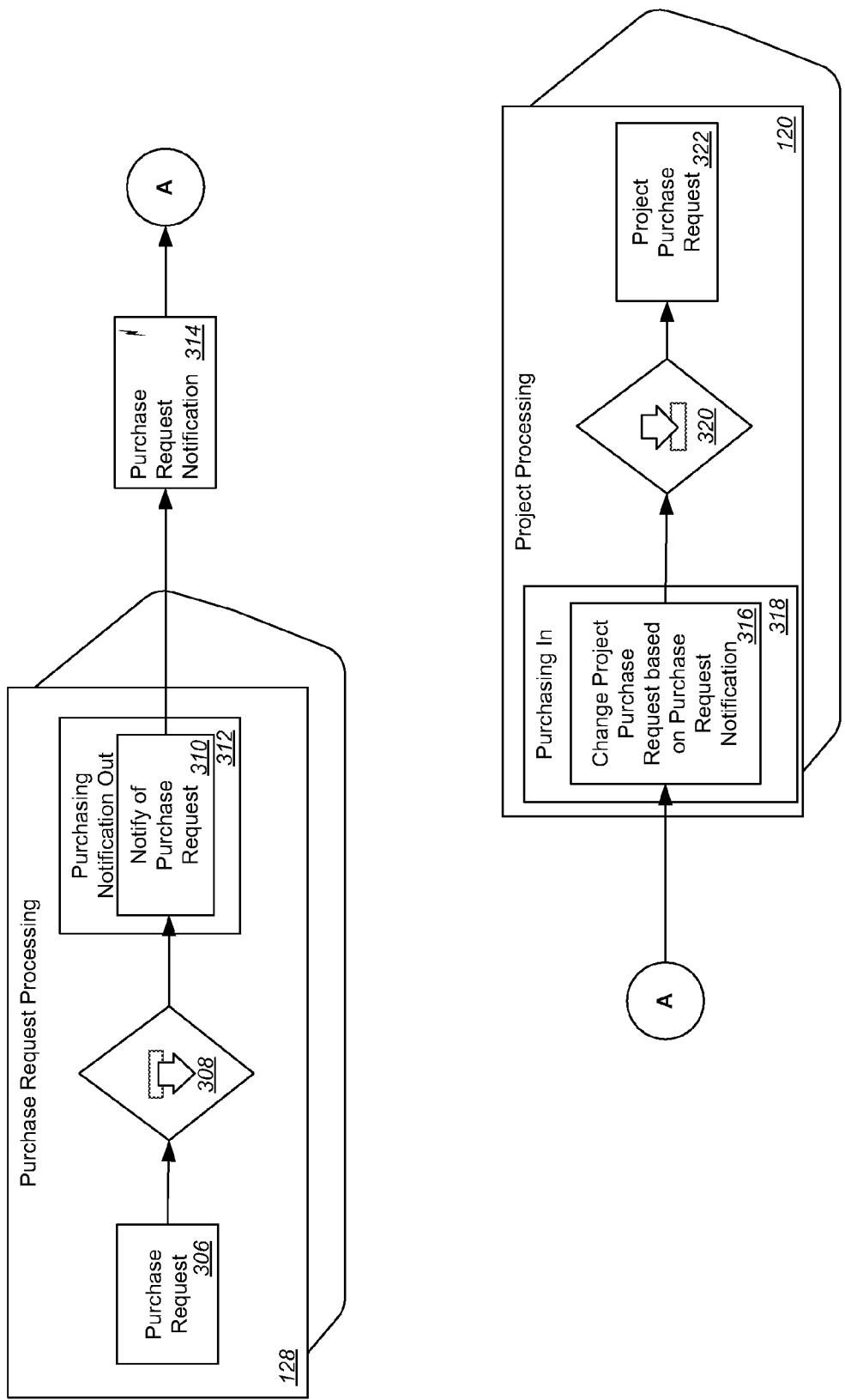
FIG. 3 is a block diagram showing example interactions between a Purchase Request Processing process component and a Project Processing process component.

FIG. 3 is a block diagram showing example interactions between the Purchase Request Processing process component 128 and the Project Processing process component 120 in the architectural design of FIG. 1.

As shown in FIG. 3, the Purchase Request Processing process component 128 includes a Purchase Request business object 306. The Purchase Request business object 306 represents a request or instruction to the purchasing department to purchase specified goods or services in specified quantities, at a specified price, within a specified time. When a Purchase Request business object 306 has been created, changed or cancelled, a notification can be sent using a Notify of Purchase Request to Project Processing outbound process agent 308. The process agent 308 invokes a Notify of Purchase Request operation 310 to notify the Project Processing process component 120 about purchase requests that have project accounting information. The Notify of Purchase Request operation 310 is included in a Purchasing Notification Out interface 312. A Purchase Request Notification message 314 is generated and sent to the Project Processing process component 120. The message 314 is handled in a Change Project Purchase Request based on Purchase Request Notification operation 316. The operation 316 changes a project purchase request based on a notification about the creation of a new purchase request or a change to an existing purchase request. The operation 316 is included in a Purchasing Notification In interface 318. The operation 316 uses a Change Project Purchase Request based on Purchase Request Notification inbound process agent 320 to update a Project Purchase Request business object 322 about the creation of a purchase request for an external resource. The Project Purchase Request business object 322 represents a request to purchasing for procurement of products that are required during a project. In some implementations, a request can originate in a project. In other implementations, a request can originate outside a project, and is assigned to a project task as an accounting object.

Interactions between Process Components "Purchase Request Processing" and "RFQ Processing"

Figure 4:
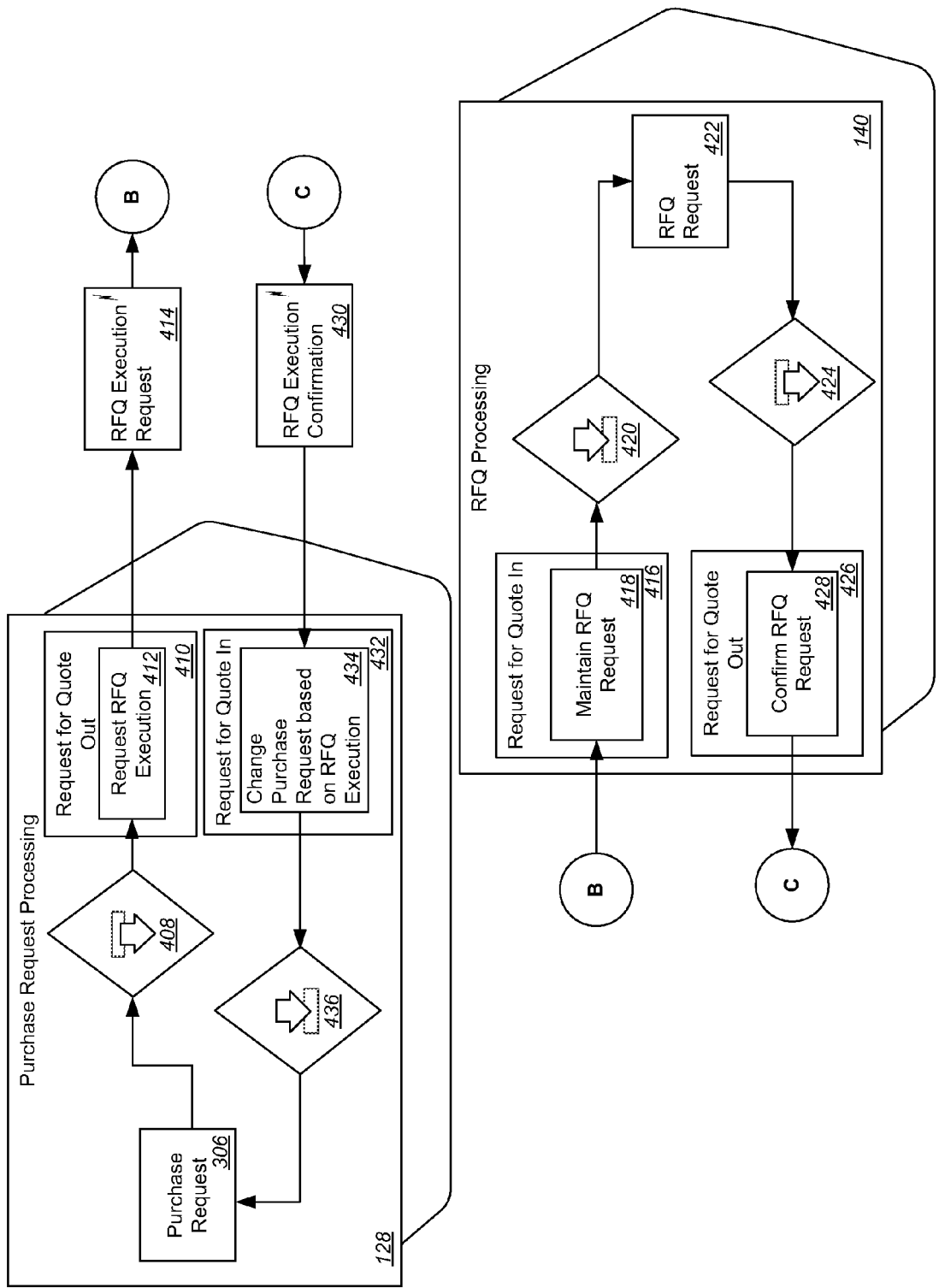
FIG. 4 is a block diagram showing example interactions between a Purchase Request Processing process component and an RFQ Processing process component.

FIG. 4 is a block diagram showing example interactions between the Purchase Request Processing process component 128 and the RFQ Processing process component 140 in the architectural design of FIG. 1. The interaction starts when a purchase request is created. The Purchase Request Processing process component 128 requests the creation of a request for quote from the RFQ Processing process component 140. The RFQ Processing process component 140 can confirm the performed action to the Purchase Request Processing process component 128.

As shown in FIG. 4, the Purchase Request Processing process component 128 includes the Purchase Request business object 306. The Purchase Request business object 306 uses a Request RFQ Execution from Purchase Request to RFQ Processing outbound process agent 408 to invoke a Request RFQ Execution operation 412. The Request RFQ Execution operation 412 sends an RFQ Execution Request message 414 to the RFQ Processing process component 140. The Request RFQ Execution operation 412 is included in a Request for Quote Out interface 410.

The RFQ Execution Request message 414 is received by a Maintain RFQ Request operation 418 in a Request for Quote In interface 416. The Maintain RFQ Request operation 418 creates an RFQ request from business documents that are involved in the bidding or negotiation process. The operation 418 initiates a Maintain RFQ inbound process agent 420 to update an RFQ Request business object 422. The RFQ Request business object 422 represents a request to the purchasing department to prepare a request for quote. A Confirm RFQ Request outbound process agent 424 receives the request for quote, which is created or updated from purchase request processing or from purchasing contract processing, and invokes a Confirm RFQ Request operation 428. The Confirm RFQ Request operation 428 is included in a Request for Quote Out Interface 426.

The Confirm RFQ Request operation 428 sends an RFQ Execution Confirmation message 430 to the Purchase Request Processing process component 128 to confirm an RFQ execution. A Change Purchase Request based on RFQ Execution operation 434 receives the RFQ Execution Confirmation message 430. The Change Purchase Request based on RFQ Execution operation 434 is included in a Request for Quote In interface 432. The Change Purchase Request based on RFQ Execution operation 434 uses a Change Purchase Request based on RFQ Execution inbound process agent 436 to update the references of the purchase request in the Purchase Request business object 306. The Purchase Request business object 306 represents a request or instruction to the purchasing department to purchase specified goods or services in specified quantities at a specified price within a specified time.

Interactions between Process Components "Bank Statement Creation at Bank" and "Payment Processing"

Figure 5:
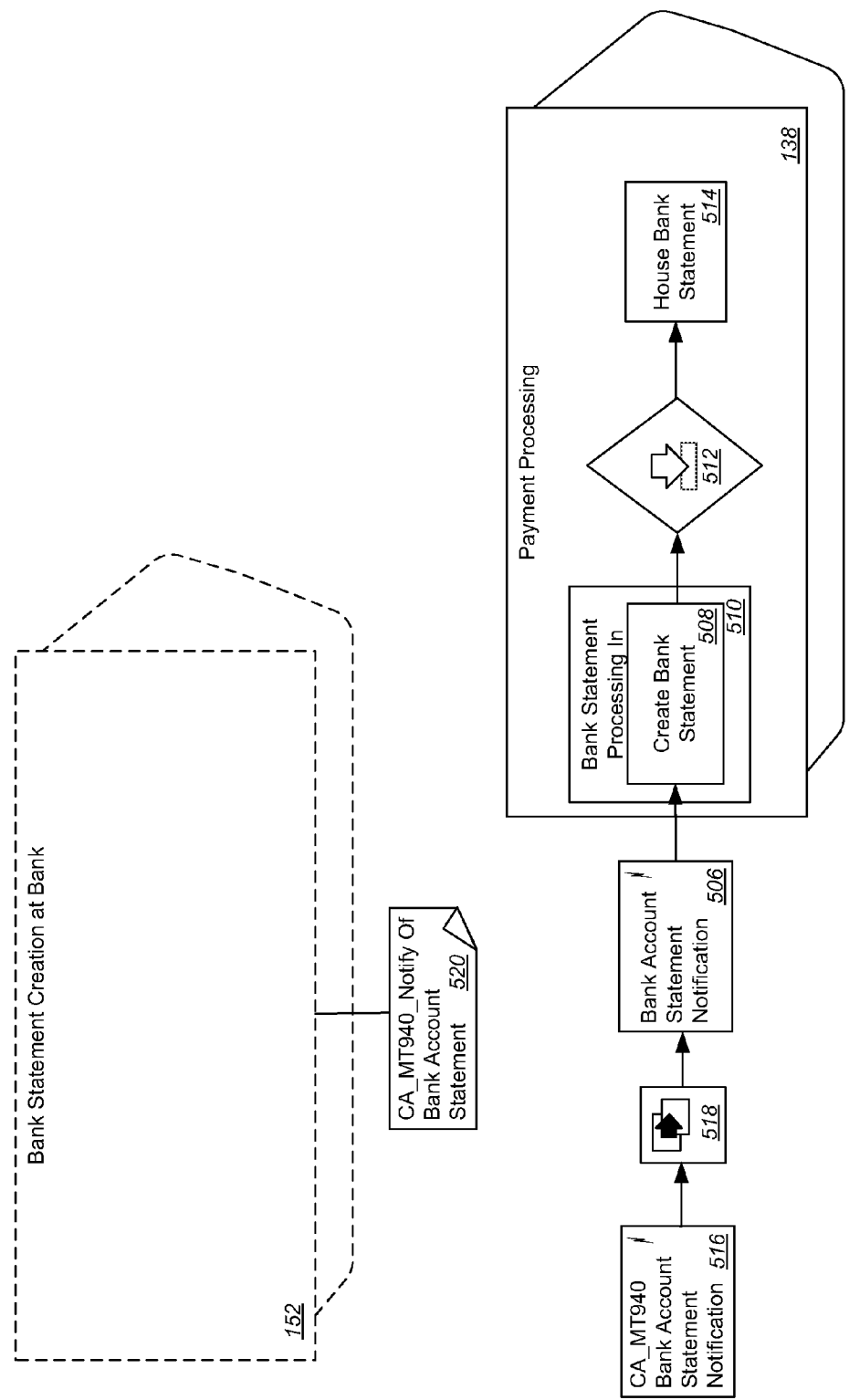
FIG. 5 is a block diagram showing example interactions between a Bank Statement Creation at Bank process component and a Payment Processing process component.

FIG. 5 is a block diagram showing example interactions between the Bank Statement Creation at Bank process component 152 and the Payment Processing process component 138 in the architectural design of FIG. 1. The interaction starts when a bank statement is created at a bank. The Bank Statement Creation at Bank process component 152 notifies the Payment Processing process component 138 about transactions on a bank account. In some implementations, a bank account statement following a predefined standard, such as the MT940 standard defined by the Society for Worldwide Interbank Financial Telecommunication (SWIFT) may provide balance and transaction details of an account to a financial institution on behalf of the account holder.

As shown in FIG. 5, a bank statement is created at a bank and a CA_MT940 Bank Account Statement Notification message 516 with statement information is generated. The CA_MT940 Bank Account Statement Notification message 516 uses Mapping Entity 518 to transform the CA_MT940 formatted message to a Bank Account Statement Notification message 506. The message 506 is received in the Payment Processing process component 138 where a Create Bank Statement operation 508 is invoked to create a bank statement. The Create Bank Statement operation 508 is included in a Bank Statement Processing In interface 510. A Maintain Bank Statement inbound process agent 512 updates the House Bank Statement business object 514 by creating a new bank statement. The House Bank Statement business object 514 represents a legally binding notification from the house bank about the revenue items within a specific time period at a house bank account with a defined starting and closing balance.

The Bank Statement Creation at Bank process component 152 receives information from a CA_MT940_Notify Of Bank Account Statement communication channel template 520. The communication channel template 520 can provide information from an external party about a bank statement.

Interactions between Process Components "Time and Labor Management" and "Project Processing"

Figure 6:
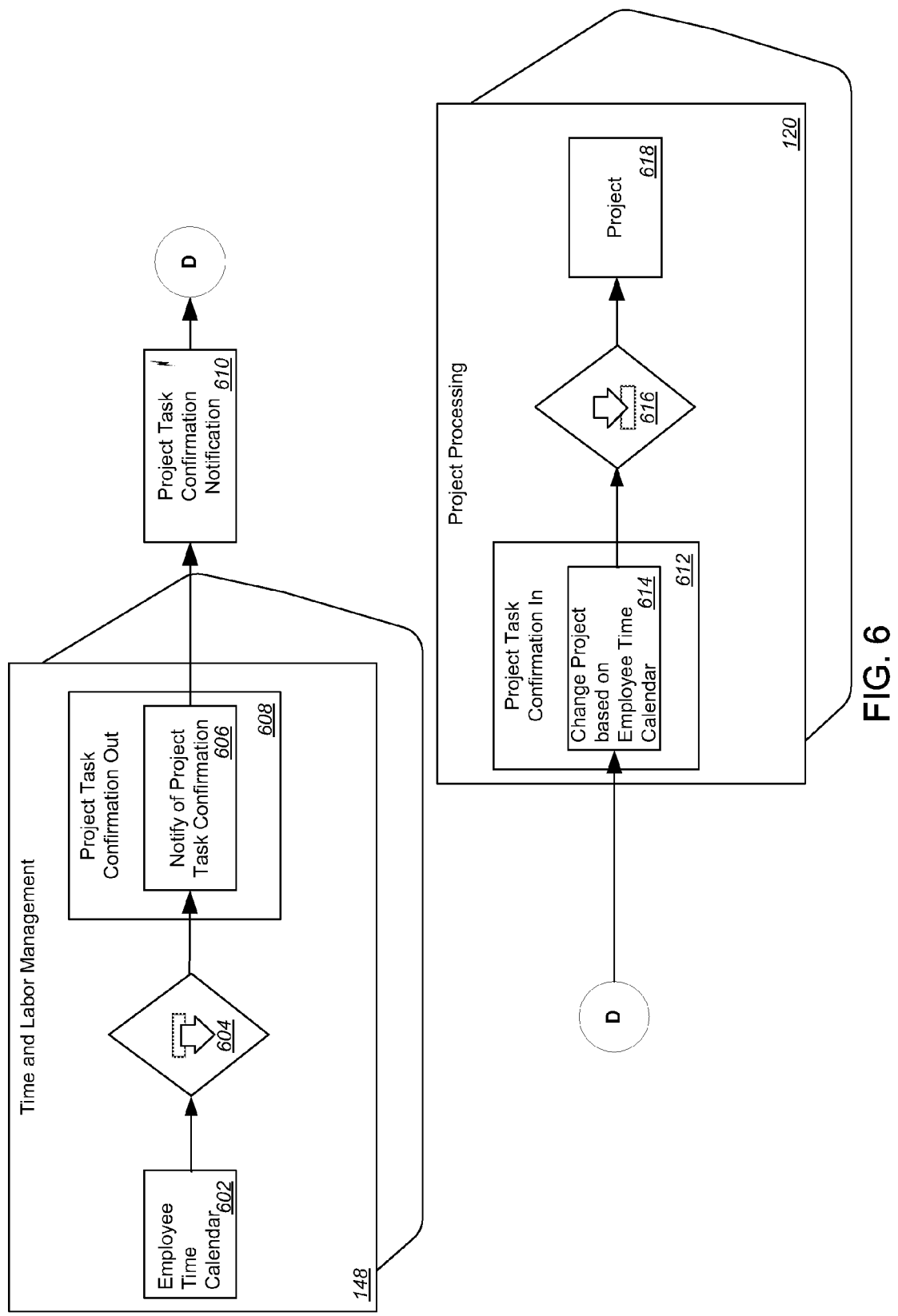
FIG. 6 is a block diagram showing example interactions between a Time and Labor Management process component and the Project Processing process component.

FIG. 6 is a block diagram showing example interactions between the Time and Labor Management process component 148 and the Project Processing process component 120 in the architectural design of FIG. 1. The Time and Labor Management process component 148 handles the management of employees' planned working times, the recording and valuation of work performed, and employee absence occurrences. The Project Processing process component 120 handles the structuring, planning, and execution of simple short-term measures and complex projects.

As shown in FIG. 6, the Time and Labor Management process component 148 includes an Employee Time Calendar business object 602. The Employee Time Calendar business object 602 represents a read-only calendar of time valuation results that can be derived from the recorded times of an employee. The Employee Time Calendar business object 602 uses a Notify of Project Task Confirmation from Employee Time Calendar to Project Processing outbound process agent 604 to invoke a Notify of Project Task Confirmation operation 606. The Notify of Project Task Confirmation operation 606 sends a project task confirmation notification to the Project Processing process component 120. For example, the notification is sent when an active employee time item with project relevant information is created, changed or cancelled. The Notify of Project Task Confirmation operation 606 is included in a Project Task Confirmation Out interface 608. The operation 606 generates a Project Task Confirmation Notification message 610.

A Change Project based on Employee Time Calendar operation 614 receives the Project Task Confirmation Notification message 610. The operation 614 is included in a Project Task Confirmation In interface 612. The Change Project based on Employee Time Calendar operation 614 can be invoked to confirm or cancel actual work for tasks in projects. The operation 614 uses a Change Project based on Employee Time Calendar inbound process agent 616 to update a Project business object 618. The Project business object 618 represents a business undertaking with a defined goal that can be attained in a specified time frame. The business undertaking can be achieved using predefined funds and planned resources, while reaching an agreed quality level. The project can be characterized by the fact that it is unique, and that it involves an element of risk.

Interactions between Process Components "Supplier Invoice Processing" and "Due Item Processing"

Figure 7:
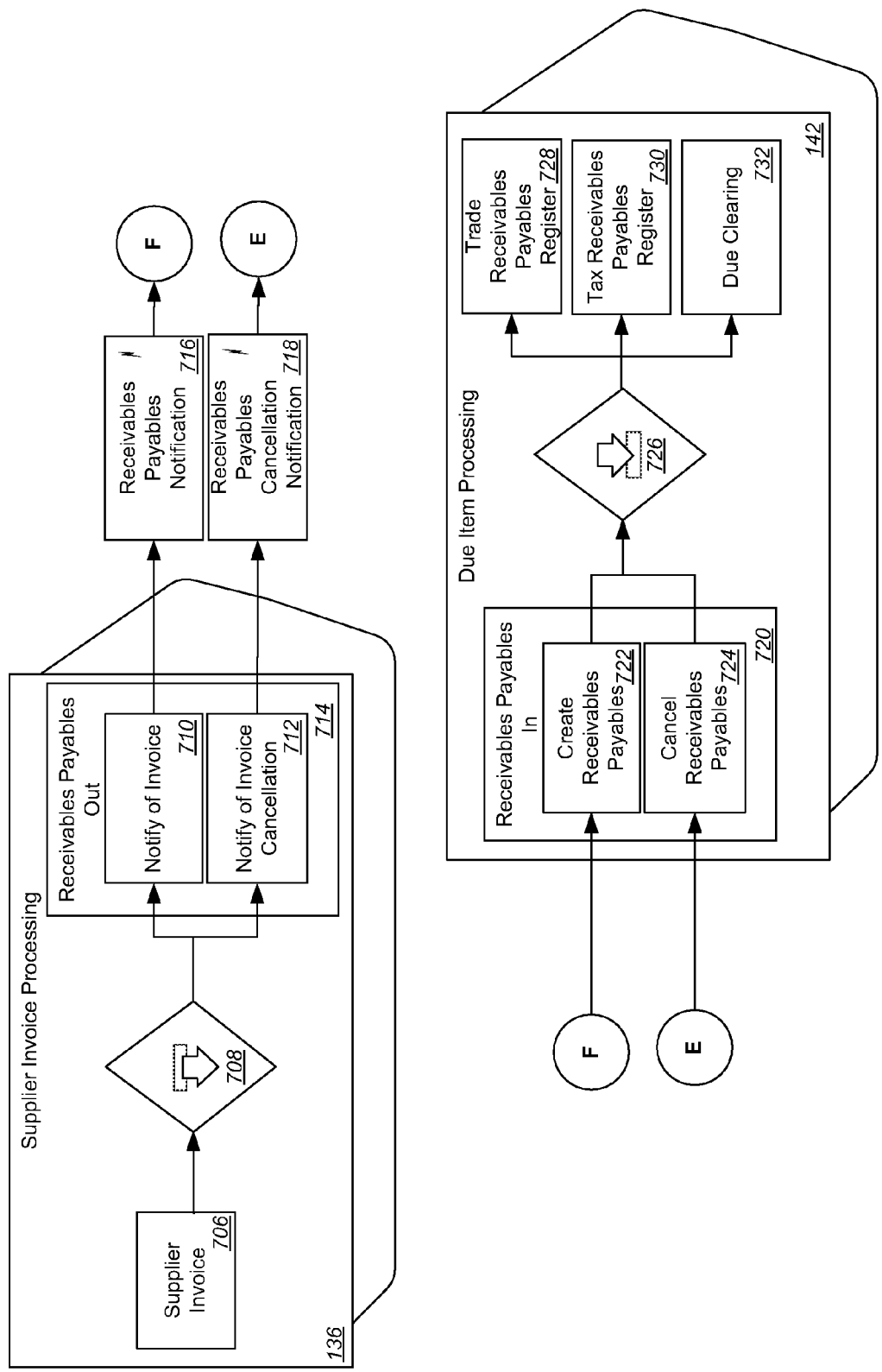
FIG. 7 is a block diagram showing example interactions between a Supplier Invoice Processing process component and a Due Item Processing process component.

FIG. 7 is a block diagram showing example interactions between the Supplier Invoice Processing process component 136 and the Due Item Processing process component 142 in the architectural design of FIG. 1. The interaction starts when a supplier invoice is created or cancelled. The Supplier Invoice Processing process component 136 notifies the Due Item Processing process component 142 about the creation or cancellation of a supplier invoice.

As shown in FIG. 7, the Supplier Invoice Processing process component 136 includes a Supplier Invoice business object 706. The Supplier Invoice business object 706 represents a company's obligation to pay a supplier for delivered goods and services. For example, if the company returns goods or complains about services, the supplier can issue a credit memo for an amount equal to or lower than the original invoice, and can refund the money to the company. In some implementations, for invoiced goods that require a duty, a customs duty invoice can be submitted by the customs authority, stating a company's obligation to pay tax on the import or export of goods.

The Supplier Invoice business object 706 uses a Notify Supplier of Invoice to a Due Item Processing outbound process agent 708 to invoke a Notify of Invoice operation 710. The operation 710 sends a Receivables Payables Notification message 716 to the Due Item Processing process component 142. The message 716 is a notification about the receivables/payables due for an invoice that has been paid. Alternatively, the Notify Supplier of Invoice to a Due Item Processing outbound process agent 708 invokes a Notify of Invoice Cancellation operation 712 to cancel a previously sent notification for receivables/payables due. Both operations 710 and 712 are included in a Receivables Payables Out interface 714. If the Notify of Invoice operation 710 is invoked, then the Receivables Payables Notification message 716 is sent to the Due Item Processing process component 142. If the Notify of Invoice Cancellation operation 712 is invoked, a Receivables Payables Cancellation Notification message 718 is sent to the Due Item Processing process component 142.

The Receivables Payables Notification message 716 is received in a Create Receivables Payables operation 722. The Receivables Payables Cancellation Notification message 718 is received in a Cancel Receivables Payables operation 724. The operations 722 and 724 are included in a Receivables Payables In interface 720. If the Receivables Payables Notification message 716 is received, then the Create Receivables Payables operation 722 is performed to create a trade and/or tax receivable or payable. If the Receivables Payables Cancellation Notification message 718 is received, then the Cancel Receivables Payables operation 724 is performed to cancel a trade and/or tax receivable or payable. The operations 722 and 724 use a Maintain Trade and Tax Receivables Payables inbound process agent 726 to update one or more of three business objects including a Trade Receivables Payables Register business object 728, a Tax Receivables Payables Register business object 730, and a Due Clearing business object 732. The Trade Receivables Payables Register business object 728 represents the register of trade receivables and payables of a company to or from its business partners. The Tax Receivables Payables Register business object 730 represents the register of tax receivables and payables of a company for the delivered goods and rendered services between buyers and sellers, the consumption of goods, the transfer of goods, and amounts withheld from payments to sellers. The Due Clearing business object 732 represents a group of receivables and payables for clearing. "Clearing" can refer to the amounts of the receivables and payables of a group balance to zero, taking cash discounts and other deductions into account. The "group" can be payments and invoices that belong together, but it can also be credit memos and invoices, or customer and vendor invoices. A group can result uniquely from the invoice reference information of a payment.

Interactions between Process Components "Project Processing" and "Purchase Request Processing"

Figure 8:
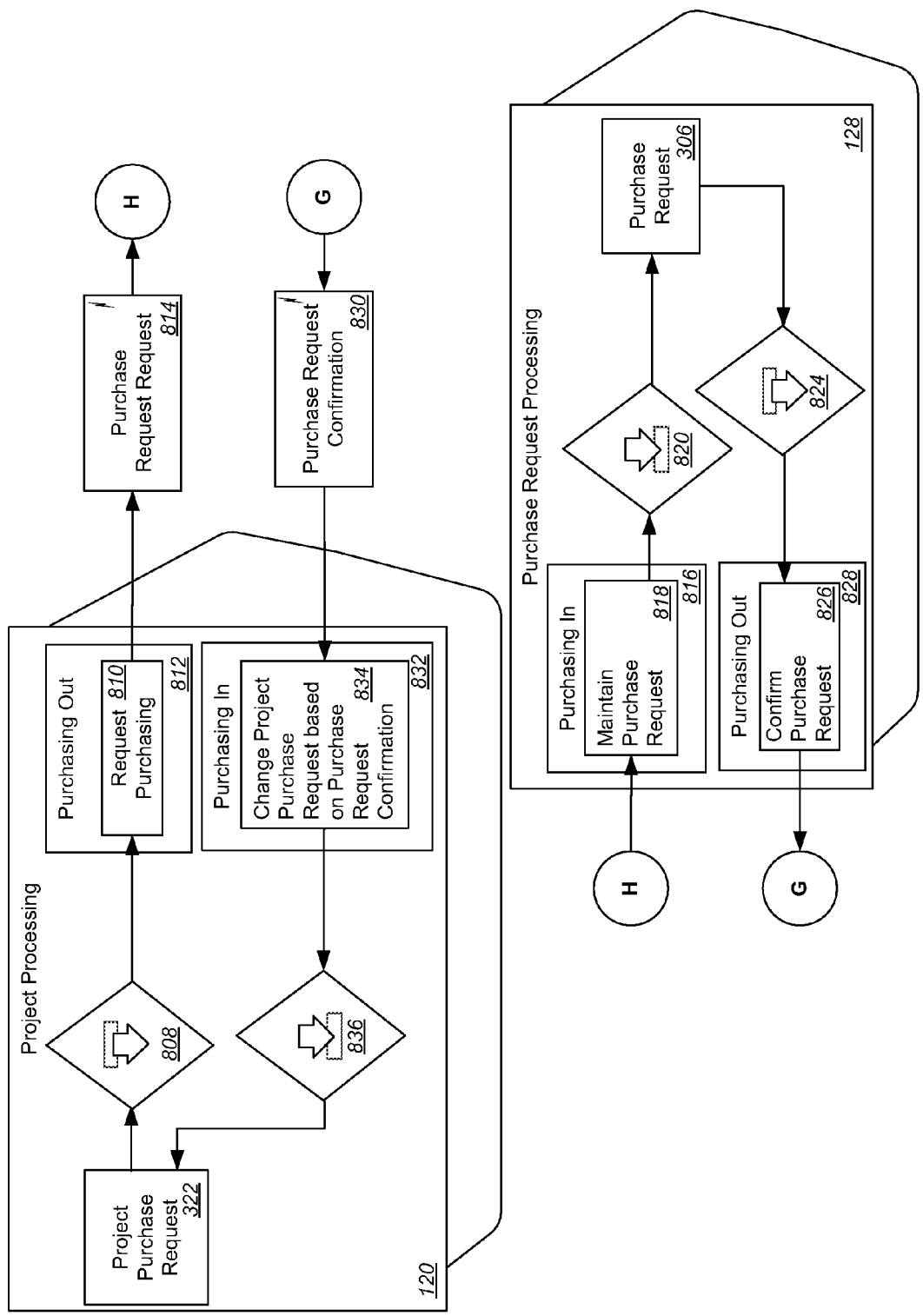
FIG. 8 is a block diagram showing example interactions between the Project Processing process component and a Purchase Request Processing process component.

FIG. 8 is a block diagram showing example interactions between the Project Processing process component 120 and the Purchase Request Processing process component 128 in the architectural design of FIG. 1. The interaction starts as soon as a demand for procurement of external services is detected during project processing. For example, a project lead can trigger a purchase request which identifies the type of service, dates, quantities, and shipping locations. The request can result in the creation of a purchase request at a later time.

As shown in FIG. 8, the Project Processing process component 120 includes the Project Purchase Request business object 322. The Project Purchase Request business object 322 represents a request to purchasing to procure products that are used during a project. In some implementations, the request can originate in a project, or it can originate outside a project, in which case it is assigned to a project task as an accounting object. The Project Purchase Request business object 322 uses a Request Purchasing from Project Purchase Request to Purchase Request Processing outbound process agent 808 to invoke a Request Purchasing operation 810. The operation 810 requests the procurement of goods and/or services. The Request Purchasing operation 810 is included in a Purchasing Out interface 812. The Request Purchasing operation 810 sends a Purchase Request Request message 814 to the Purchase Request Processing process component 128.

A Maintain Purchase Request operation 818 receives the message 814. The Maintain Purchase Request operation 818 creates or updates a request from a requester to a purchaser in order to externally procure products, materials and/or services (i.e. it creates or updates a purchase request). The operation 818 is included in a Purchasing In interface 816. The Maintain Purchase Request operation 818 uses a Maintain Purchase Request inbound process agent 820 to update the Purchase Request business object 306.

The Purchase Request business object 306 represents a request or instruction to the purchasing department to purchase specified goods or services in specified quantities at a specified price within a specified time. The Purchase Request business object 822 uses a Confirm Purchase Request outbound process agent 824 to invoke a Confirm Purchase Request operation 826. The operation 826 confirms a creation, change, or cancellation of a purchase request to the requester. The Confirm Purchase Request operation 826 is included in a Purchasing Out interface 828. The operation 826 sends a Request Confirmation message 830 to the Project Processing process component 120 to confirm the creation, change, or cancellation of the purchase request.

A Change Project Purchase Request based on Purchase Request Confirmation operation 834 receives the Purchase Request Confirmation message 830. The Change Project Purchase based on Purchase Request Confirmation operation 834 is included in a Purchasing In interface 832. The Change Project Purchase based on Purchase Request Confirmation operation 834 changes the project purchase request based on a confirmation from purchasing about the degree to which a request has been fulfilled. The operation 834 uses a Change Project Purchase Request based on Purchase Request Confirmation inbound process agent 836 to update the Project Purchase Request business object 322.

Interactions between Process Components "Payment Processing" and "Payment Processing at Business Partner"

Figure 9:
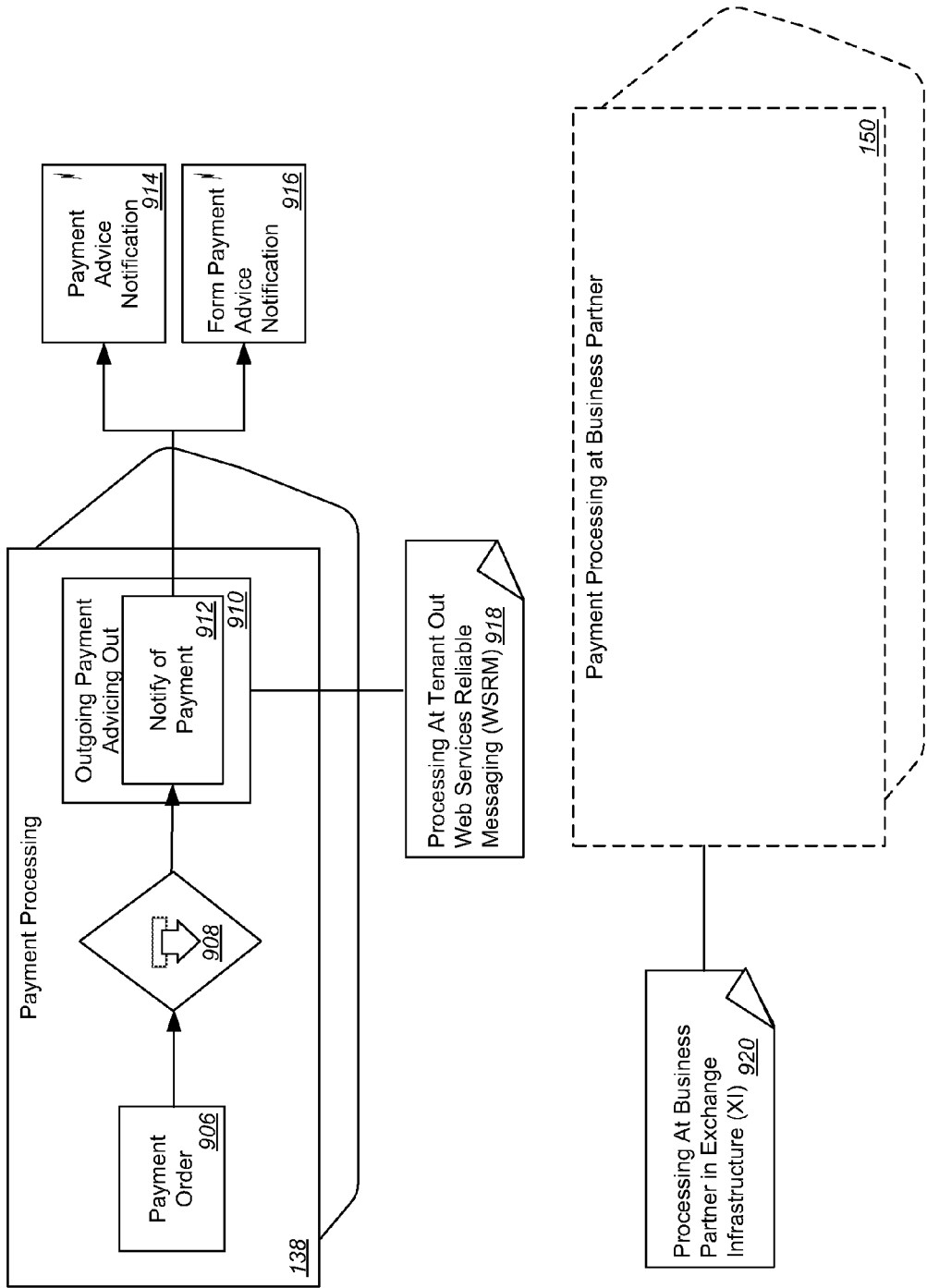
FIG. 9 is a block diagram showing example interactions between a Payment Processing process component and a Payment Processing at Business Partner process component.

FIG. 9 is a block diagram showing example interactions between the Payment Processing process component 138 and the Payment Processing at a Business Partner processing component 150 in the architectural design of FIG. 1. The interaction starts with the creation of a payment advice from a payment order within the Payment Processing process component 138. The Payment Processing process component 138 notifies the Payment Processing at the Business Partner process component 150 about payments in transfer.

As shown in FIG. 9, the Payment Processing process component 138 includes a Payment Order business object 906. The Payment Order business object 906 represents an order within a company to make a payment to a business partner at a specified time. A payment order can be a collective order that includes several individual orders.

The Payment Order business object 906 uses a Notify of Payment from Payment Order to Business Partner outbound process agent 908 to invoke a Notify of Payment operation 912. The Notify of Payment operation 912 is included in an Outgoing Payment Advicing Out interface 910. The Notify of Payment operation 912 generates data to allow an assignment of payments to receivables/payables at the business partner. The Notify of Payment operation 912 sends a Payment Advice Notification message 914 or a Form Payment Advice Notification 916 to the Payment Processing at Business Partner processing component 150.

The Outgoing Payment Advicing Out interface 910 receives a Processing At Tenant Out Web Services Reliable Messaging (WSRM) communication channel template 918. The communication channel template 918 can define protocols and parameters used for communication with an external party. The Payment Processing at Business Partner processing component 150 receives information from a Processing At Business Partner in XI communication channel template 920. The Processing At Business Partner in Exchange Infrastructure (XI) communication channel template 920 can define protocols and parameters used for communication with an external party.

Interactions between Process Components "Purchase Order Processing" and "Project Processing"

Figure 10:
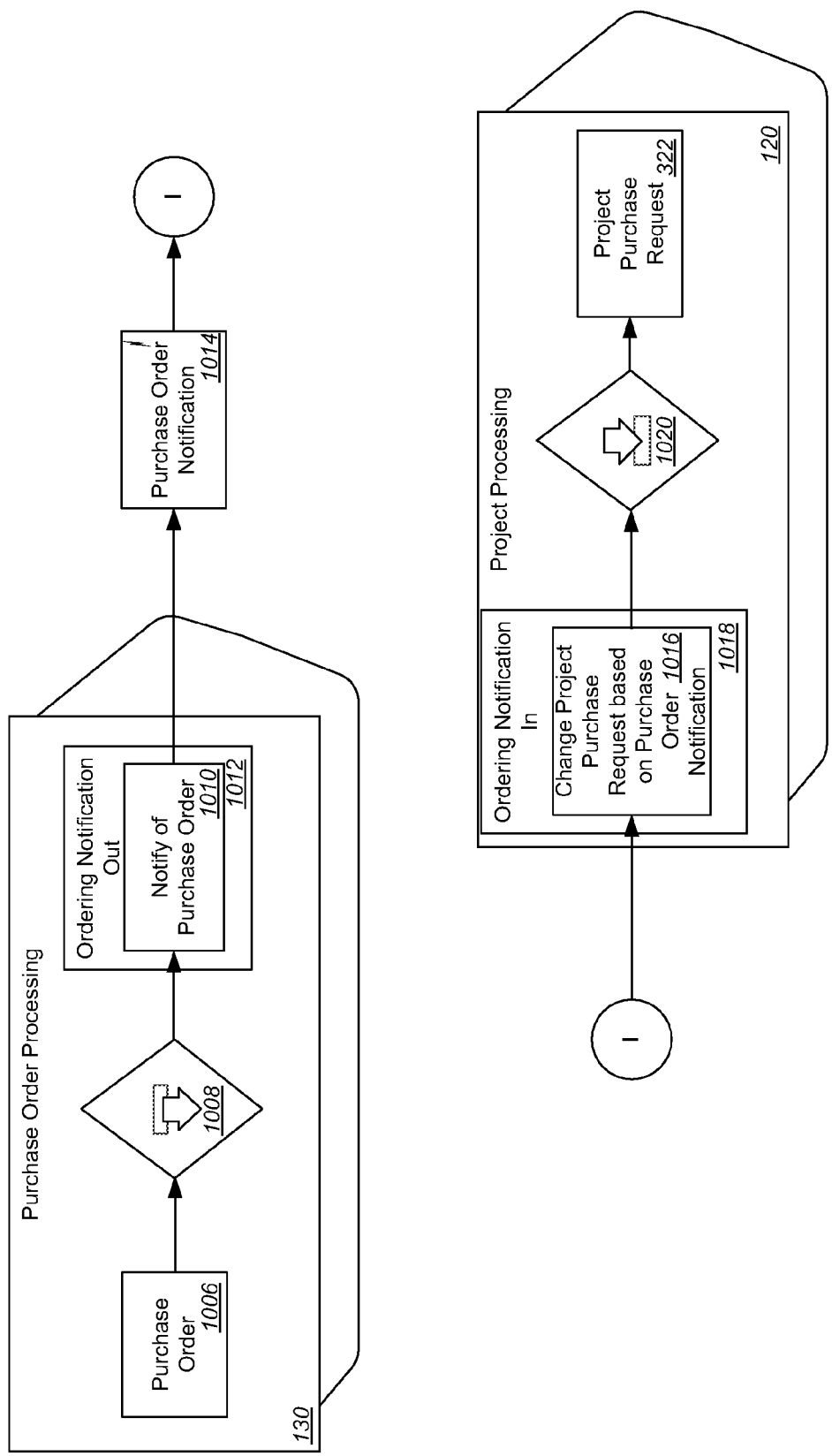
FIG. 10 is a block diagram showing example interactions between a Purchase Order Processing process component and a Project Processing process component.

FIG. 10 is a block diagram showing example interactions between the Purchase Order Processing process component 130 and the Project Processing process component 120 in the architectural design of FIG. 1. The interaction starts in the Purchase Order Processing process component 130 with the updating of a Purchase Order business object 1006.

As shown in FIG. 10, the Purchase Order business object 1006 represents a request from a buyer to a seller to deliver a specified quantity of material, or perform a specified service, at a specified price within a specified time. When the Purchase Order business object 1006 has been created, changed or cancelled, the Purchase Order business object 1006 uses a Notify of Purchase Order to Project Processing outbound process agent 1008 to invoke a Notify of Purchase Order operation 1010. The operation 1010 creates, changes, or cancels a purchase order. The Notify of Purchase Order operation 1010 is included in an Ordering Notification Out interface 1012. The operation 1010 generates a Purchase Order Notification message 1014.

The Purchase Order Notification message 1014 is received in a Change Project Purchase Request based on Purchase Order Notification operation 1016. The operation 1016 is included in an Ordering Notification In interface 1018. The operation 1016 uses a Change Project Purchase Request based on Purchase Order Notification inbound process agent 1020 to update the Project Purchase Request business object 322. The Change Project Purchase Request based on Purchase Order Notification operation 1016 changes the project purchase request based on a notification about the creation of a new purchase order, or a change to an existing purchase order. The Project Purchase Request business object 322 represents a request to purchasing to procure products that are required during a project. In some implementations, the request can originate in a project, or it can originate outside a project, in which case it must be assigned to a project task as an accounting object.

Interactions between Process Components "RFQ Processing" and "Purchase Order Processing"

Figure 11:
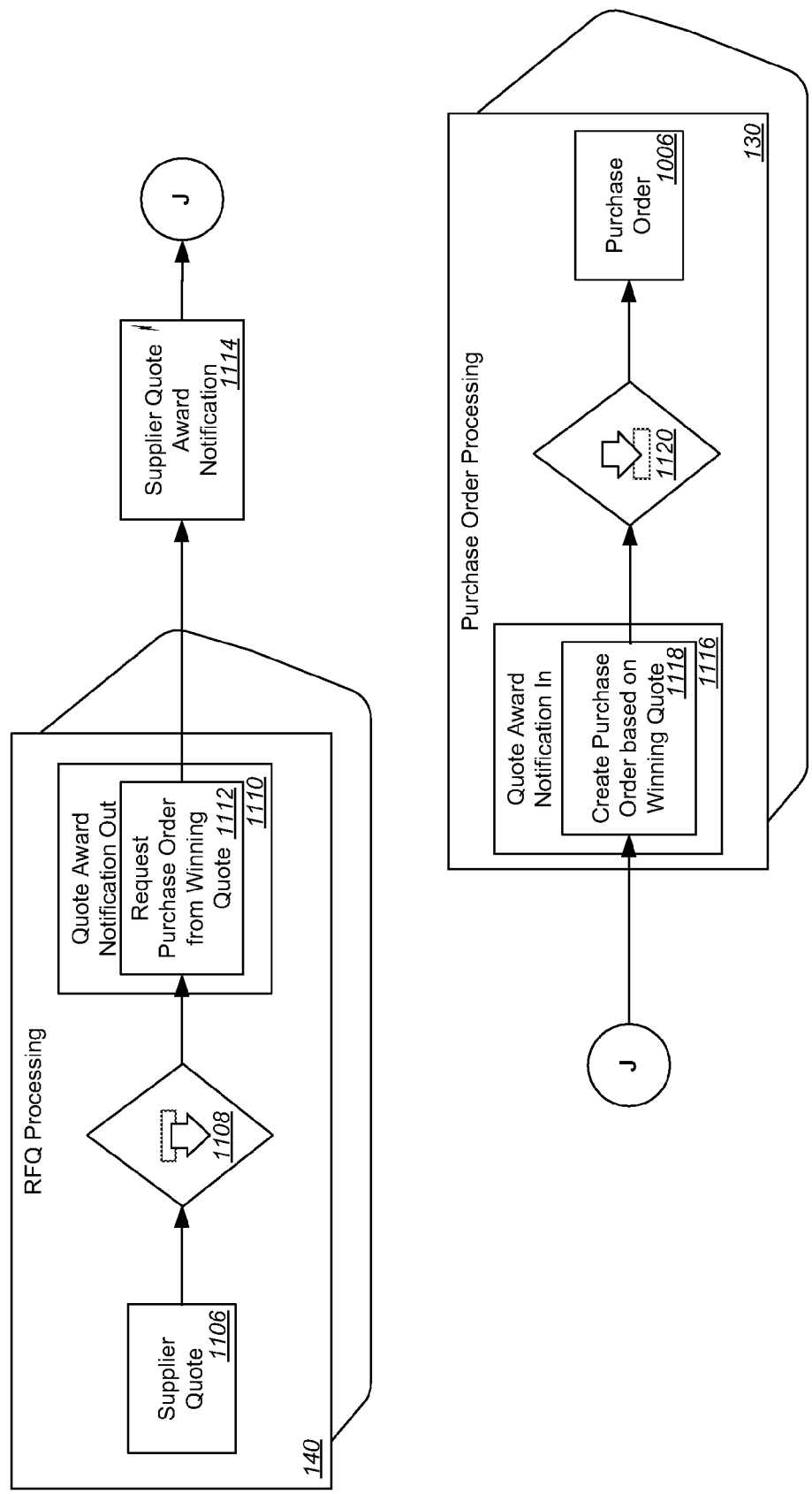
FIG. 11 is a block diagram showing example interactions between an RFQ Processing process component and a Purchase Order Processing process component.

FIG. 11 is a block diagram showing example interactions between the RFQ Processing process component 140 and the Purchase Order Processing process component 130 in the architectural design of FIG. 1. The interaction starts when a supplier quote is created. The RFQ Processing process component 140 requests the creation of a purchase order from the Purchase Order Processing process component 130.

As shown in FIG. 11, the RFQ Processing process component 140 includes a Supplier Quote business object 1106. The Supplier Quote business object 1106 represents a response to a request for quote, in which a bidder offers to sell goods and services to a buyer according to the requested criteria.

The Supplier Quote business object 1106 uses a Request Purchase Order from Supplier Quote to Purchase Order Processing outbound process agent 1108 to invoke a Request Purchase Order from Winning Quote operation 1112. The operation 1112 is included in a Purchasing Out interface 1110. The operation 1112 requests a purchase order based on the awarded respective winning supplier quote. The Request Purchase Order from Winning Quote operation 1112 generates a Supplier Quote Award Notification message 1114.

A Create Purchase Order based on Winning Quote operation 1118 receives the message 1114. The operation 1118 is included in a Quote Award Notification In interface 1116. The operation 1118 creates a purchase order based on data included in a winning supplier quote. For example, if the supplier quote refers to a purchase request, data from the purchase request items are added by the operation to complete the purchase order. The Create Purchase Order based on Winning Quote operation 1118 uses a Maintain Purchase Order based on Winning Quote inbound process agent 1120 to update the Purchase Order business object 1006. The Purchase Order business object 1006 represents a request from a buyer to a seller to deliver a specified quantity of material, or perform a specified service, at a specified price within a specified time.

Interactions between Process Components "Internal Request Processing" and "Purchase Request Processing"

Figure 12:
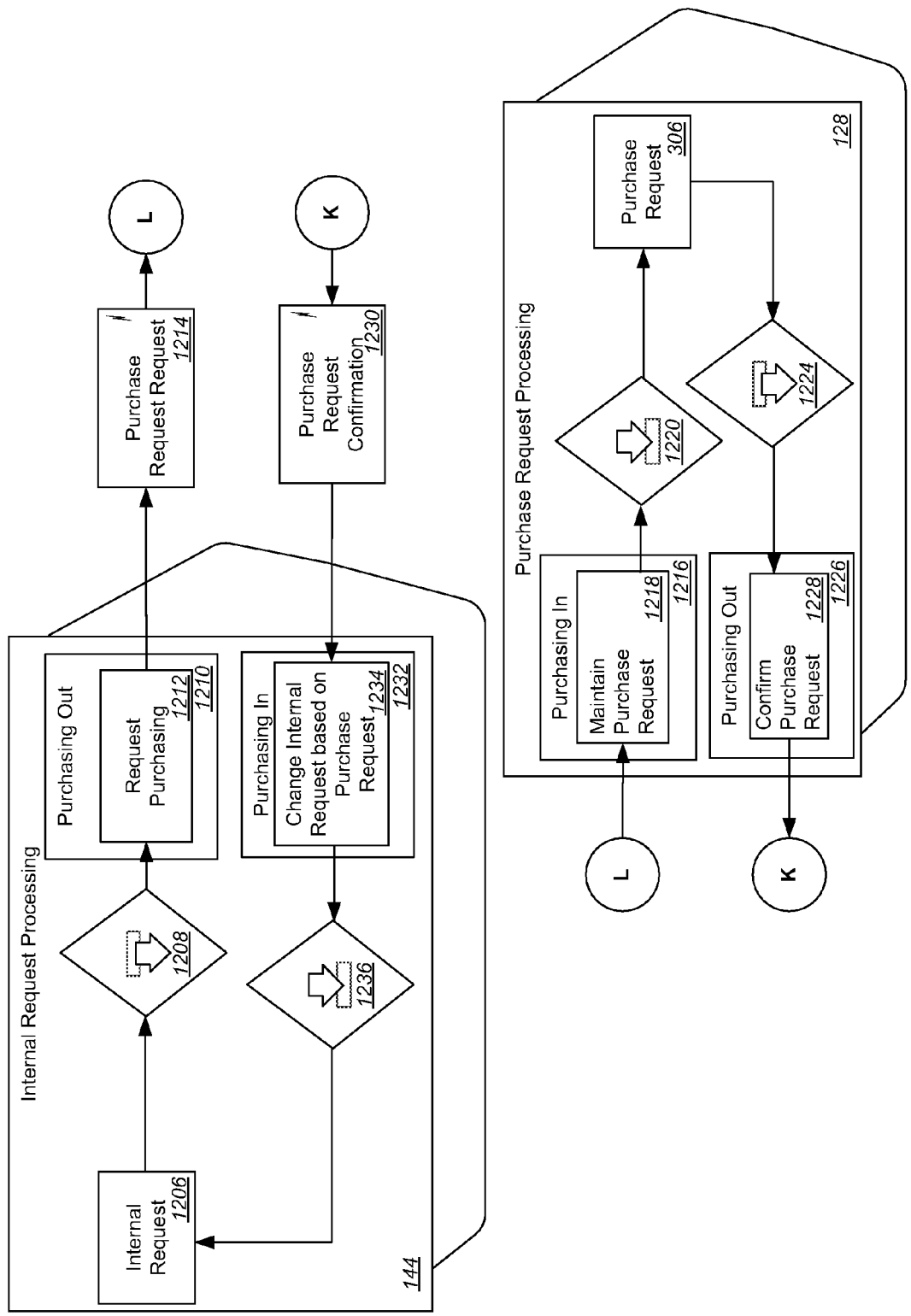
FIG. 12 is a block diagram showing example interactions between an Internal Request Processing process component and the Purchase Request Processing process component.

FIG. 12 is a block diagram showing example interactions between the Internal Request Processing process component 144 and the Purchase Request Processing process component 128. The interaction starts when an internal request is created.

As shown in FIG. 12, the Internal Request Processing process component 144 includes an Internal Request business object 1206. The Internal Request business object 1206 represents a request from an employee of a company for the procurement of goods or services for their own or for company use.

The Internal Request business object 1206 uses a Request Purchasing from Internal Request to Purchase Request Processing outbound process agent 1208 to invoke a Request Purchasing operation 1212. The operation 1212 requests the purchase of materials and/or services. The operation 1212 is included in a Purchasing Out interface 1210. The Request Purchasing operation 1212 generates a Purchase Request Request message 1214.

A Maintain Purchase Request operation 1218 receives the Purchase Request Request message 1214. The operation 1218 creates or updates a request from a requestor to a purchaser to externally procure materials and/or services (i.e., it creates or updates a purchase request). The operation 1218 is included in a Purchasing In interface 1216. The operation 1218 uses a Maintain Purchase Request inbound process agent 1220 to update the Purchase Request business object 306. The Purchase Request business object 306 represents a request or instruction to the purchasing department to purchase specified goods or services in specified quantities at a specified price within a specified time.

The Purchase Request business object 306 uses a Confirm Purchase Request outbound process agent 1224 to invoke a Confirm Purchase Request operation 1228. The operation 1228 confirms the creation, change or cancellation of a purchase request to the requestor. The Confirm Purchase Request operation 1228 is included in a Purchasing Out interface 1226. The operation 1228 generates a Purchase Request Confirmation message 1230.

A Change Internal Request based on Purchase Request operation 1234 receives the Purchase Request Confirmation message 1230. The operation 1234 is included in a Purchasing In interface 1232. The operation 1234 confirms the creation, change, or cancellation of a purchase request to the requester. The operation 1234 uses a Change Internal Request based on Purchase Request inbound process agent 1236 to update the Internal Request business object 1206.

Interactions between Process Components "Due Item Processing" and "Payment Processing"

Figure 13A:
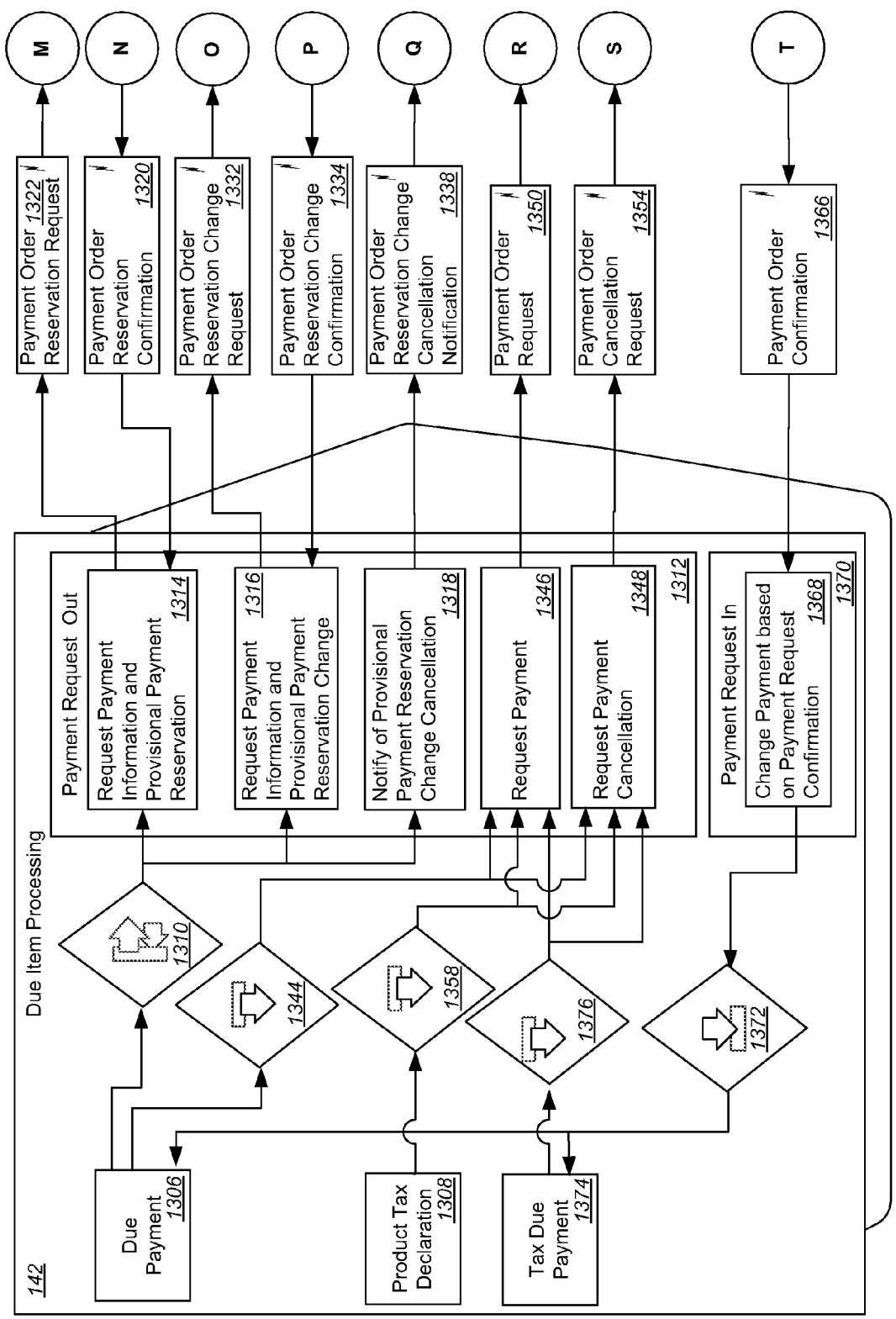
FIGS. 13A and 13B are block diagrams collectively showing interactions between the Due Item Processing process component and the Payment Processing process component.
Figure 13B:
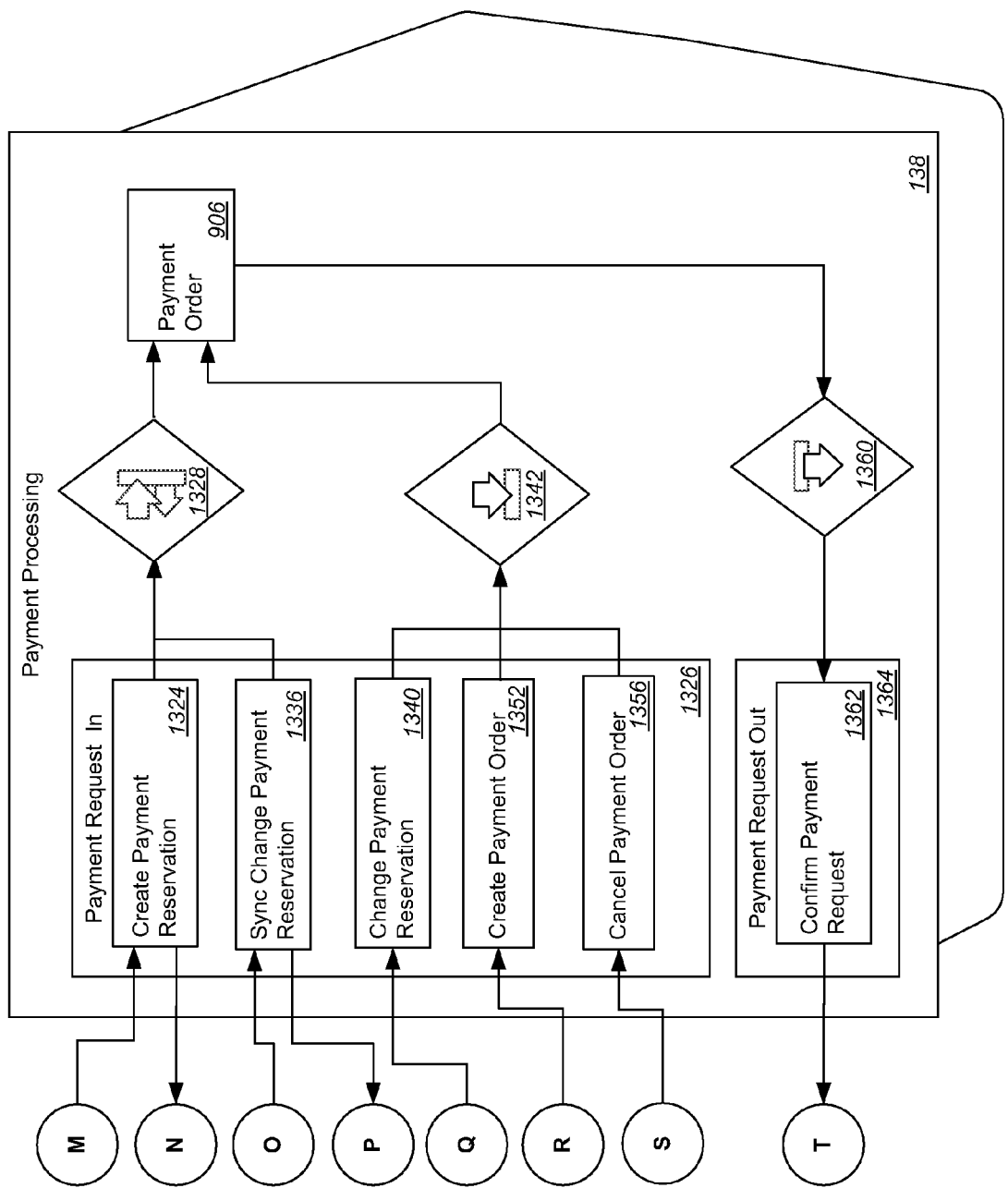

FIGS. 13A and 13B are block diagrams collectively showing interactions between the Due Item Processing process component 142 and the Payment Processing process component 138 in the architectural design of FIG. 1. The interaction starts when a payment for trade or tax receivables or payables is initiated or cancelled. The interaction allows the Due Item Processing process component 142 to request a reservation or change a previously made reservation of cash from the Payment Processing process component 138 within the creation process. The Payment Processing process component 138 confirms the creation or the change of a reservation immediately or nearly immediately.

As shown in FIG. 13A, the Due Item Processing process component 142 includes a Due Payment business object 1306, a Product Tax Declaration business object 1308, and a Tax Due Payment business object 1374. The Due Payment business object 1306 represents a payment request or payment confirmation with regard to trade receivables and payables. The Product Tax Declaration business object 1308 represents a declaration of the product tax payables and receivables of a company to the responsible tax authority according to the tax declaration arrangement, and country specific legal requirements that trigger the payment to the tax authority. The Tax Due Payment business object 1374 represents a payment request or payment confirmation with regard to tax payables and receivables.

The Due Item business object uses a Synchronous Request Payment Reservation from Due Payment to Payment Processing outbound process agent 1310 to invoke one or more operations including a Request Payment Information and Provisional Payment Reservation operation 1314, a Request Payment Information and Provisional Payment Reservation Change operation 1316, and a Notify of Provisional Payment Reservation Change Cancellation operation 1318. The operations 1314, 1316, and 1318 are included in a Payment Request Out interface 1312. The Request Payment Information and Provisional Payment Reservation operation 1314 can request payment information with a provisional reservation of money in payment processing. The Request Payment Information and Provisional Payment Reservation Change operation 1316 can request payment information with a change of provisional reservation of money in payment processing. The Notify of Provisional Payment Reservation Cancellation operation 1318 can register a change of a provisional payment to the last transactional or saved state.

If the Request Payment Information and Provisional Payment Reservation operation 1314 is invoked, the operation 1314 generates a Payment Order Reservation Request message 1322. If the Request Payment Information and Provisional Payment Reservation Change operation 1316 is invoked, the operation 1316 generates a Payment Order Reservation Change Request message 1332. If the Notify of Provisional Payment Reservation Change Cancellation operation 1318 is invoked, the operation 1318 generates a Payment Order Reservation Change Cancellation Notification message 1338.

The Due Payment business object 1306 also uses a Request Payment from Due Payment to Payment Processing outbound process agent 1344 to invoke a Request Payment operation 1346 or a Request Payment Cancellation operation 1348. The operations 1344 and 1346 are included in the Payment Request Out interface 1312. The Request Payment operation 1346 sends a request for payment to the Payment Processing process component 138. This confirms a previously made provisional payment. The Request Payment Cancellation operation 1348 cancels at least one provisional, requested, or ordered payment. If the Request Payment operation 1346 is invoked, a Payment Order Request message 1350 is generated. If the Request Payment Cancellation operation 1348 is invoked, the operation 1348 generates a Payment Order Cancellation Request message 1354.

The Product Tax Declaration business object 1308 uses a Request Payment from Product Tax Declaration to Payment Processing outbound process agent 1358 to invoke the Request Payment operation 1346 or the Request Payment Cancellation operation 1348. If the Request Payment operation 1346 is invoked, a Payment Order Request message 1350 is generated. If the Request Payment Cancellation operation 1348 is invoked, the operation 1348 generates a Payment Order Cancellation Request message 1354.

The Tax Due Payment business object 1374 uses a Request Payment from Tax Due Payment to Payment Processing outbound process agent 1376 to invoke the Request Payment operation 1346 or the Request Payment Cancellation operation 1348. If the Request Payment operation 1346 is invoked, a Payment Order Request message 1350 is generated. If the Request Payment Cancellation operation 1348 is invoked, the operation 1348 generates a Payment Order Cancellation Request message 1354.

As shown in FIG. 13B, a Create Payment Reservation operation 1324 receives the Payment Order Reservation Request message 1322. The operation 1324 uses a synchronous Request Payment Reservation from Due Payment to Payment Processing inbound process agent 1328 to create, change, or cancel a payment order for a reservation request. The synchronous inbound process agent 1328 updates the Payment Order business object 906. The Payment Order business object 906 represents an order within a company to make a payment to a business partner at a specified time. A payment order can be a collective order that includes several individual orders.

A synchronous Change Payment Reservation operation 1336 receives a Payment Order Reservation Change Request message 1332. The operation 1336 uses the synchronous Request Payment Reservation from Due Payment to Payment Processing inbound process agent 1328 to update the Payment Order business object 906.

A Change Payment Reservation operation 1340 receives the Payment Order Reservation Change Cancellation Notification message 1338. A Create Payment Order operation 1352 receives the Payment Order Request message 1350. A Cancel Payment Order operation 1356 receives the Payment Order Cancellation Request message 1354. The operations 1340, 1352, and 1356 use a Maintain Payment Order inbound process agent 1342 to update the Payment Order business object 906. The Cancel Payment Order operation 1356 cancels a previously sent payment request by reference. The Create Payment Order operation 1352 cancels a request for payment. The operations 1324, 1336, 1340, 1352, and 1356 are included in a Payment Request In interface 1326.

The Payment Order business object 906 uses a Confirm Payment Request from Payment Order to Due Item Processing outbound process agent 1360 to invoke a Confirm Payment Request operation 1362. The operation 1362 confirms a processing status of a payment to a sender. The operation 1362 is included in a Payment Request Out interface 1364. The Confirm Payment Request operation 1362 generates a Payment Order Confirmation message 1366.

As shown in FIG. 13A, the Payment Order Confirmation message 1366 is received in a Change Payment based on Payment Request Confirmation operation 1368. The operation 1368 confirms the execution of a payment request or a payment request cancellation. The operation 1368 is included in a Payment Request In interface 1370. The Change Payment based on Payment Request Confirmation operation 1368 uses a Change Payment based on Payment Request Confirmation inbound process agent 1372 to update the Due Payment business object 1306.

The Create Payment Reservation 1324 operation (shown in FIG. 13B) sends a Payment Order Reservation Confirmation message 1320 to the Due Item Processing process component 130 (shown in FIG. 13A). The message 1320 is a confirmation response received in the Request Payment Information and Provisional Payment Reservation operation 1314.

The Synchronous Change Payment Reservation operation 1336 (shown in FIG. 13B) sends a Payment Order Reservation Change Confirmation message 1334 to the Due Item Processing process component 130 (shown in FIG. 13A). The message 1334 is a confirmation response received in the Request Payment Information and Provisional Payment Reservation Change operation 1316.

Interactions between Process Components "Payment Processing" and "Payment Order Processing at House Bank"

Figure 14:
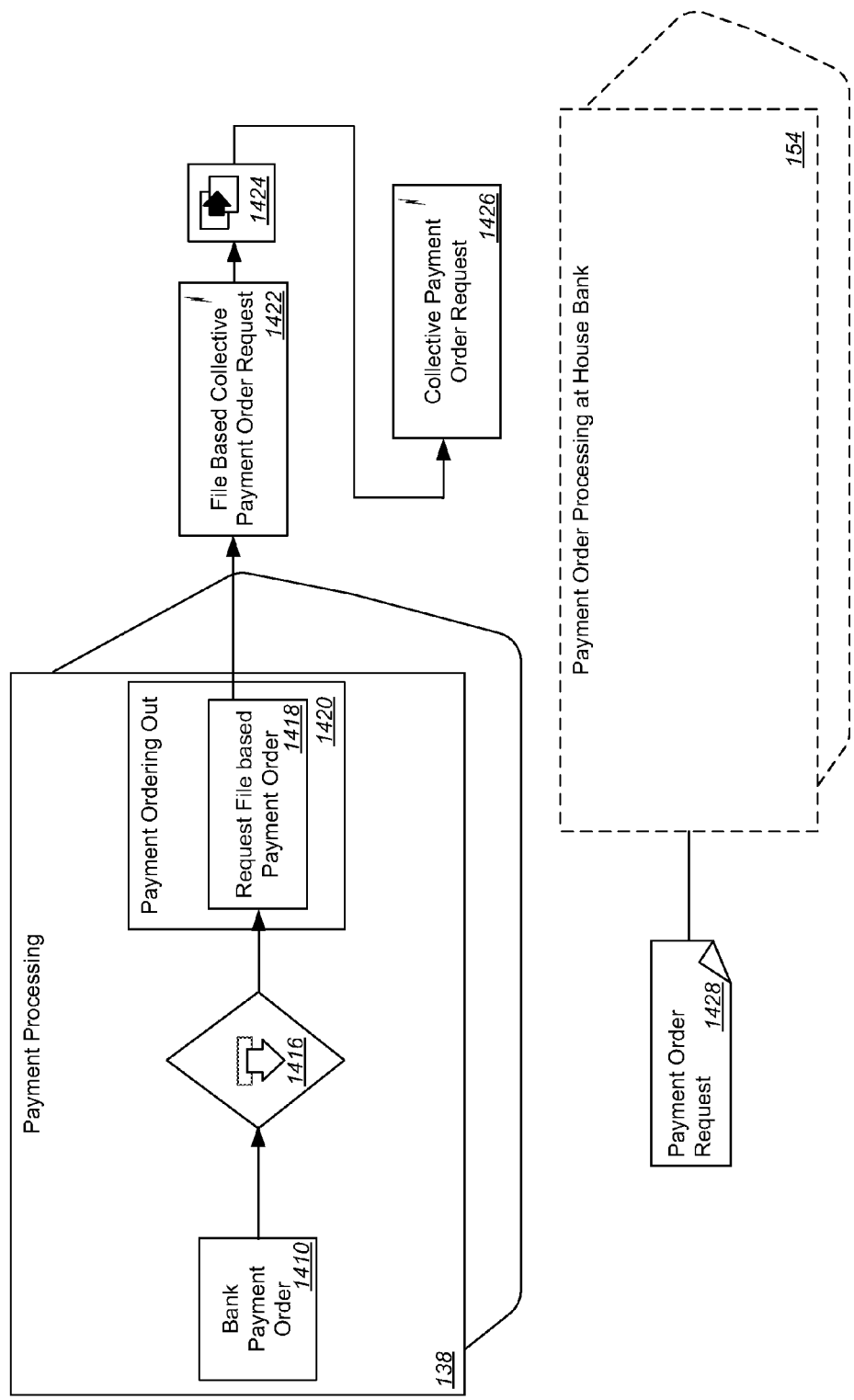
FIG. 14 is a block diagram showing example interactions between the Payment Processing process component and a Payment Order Processing at House Bank process component.

FIG. 14 is a block diagram showing example interactions between the Payment Processing process component 138 and the Payment Order Processing at House Bank process component 154 in the architectural design of FIG. 1.

As shown in FIG. 14, the Payment Processing process component 138 includes a Bank Payment Order business object 1410. The Bank Payment Order business object 1410 represents an order to a house bank to make a transfer or direct debit from a specified house bank account to fulfill a payment order. The house bank can be a bank located in France.

The Bank Payment Order business object 1410 uses a Request File Based Payment Order from Bank Payment Order to House Bank outbound process agent 1416 to invoke a Request File based Payment Order operation 1418. The Request File based Payment Order operation 1418 instructs a house bank, using a file, to make a bank transfer or a direct debit. The operation 1418 is included in a Payment Ordering Out interface 1420. The Request File based Payment Order operation 1418 generates a File based Collective Payment Order Request message 1422. The File based Collective Payment Order Request message 1422 uses Mapping Entity 1424 to transform the file-based message type to a Collective Payment Order Request message 1426 that can be received by the Payment Order Processing at House Bank process component 154. The Collective Payment Order Request message 1426 is in a format that the house bank (a bank located in France) can understand. A collective payment order can be an instruction based on a file transfer to a credit institution to carry out one or more payment transactions (e.g. bank transfers or direct debits). The Payment Order Processing at House Bank process component 154 receives information from a Payment Order Request communication channel template 1428. The communication channel template 1428 can provide information from a third party about a payment order request.

Interactions between Process Components "Customer Invoice Processing at Supplier" and "Supplier Invoice Processing"

Figure 15:
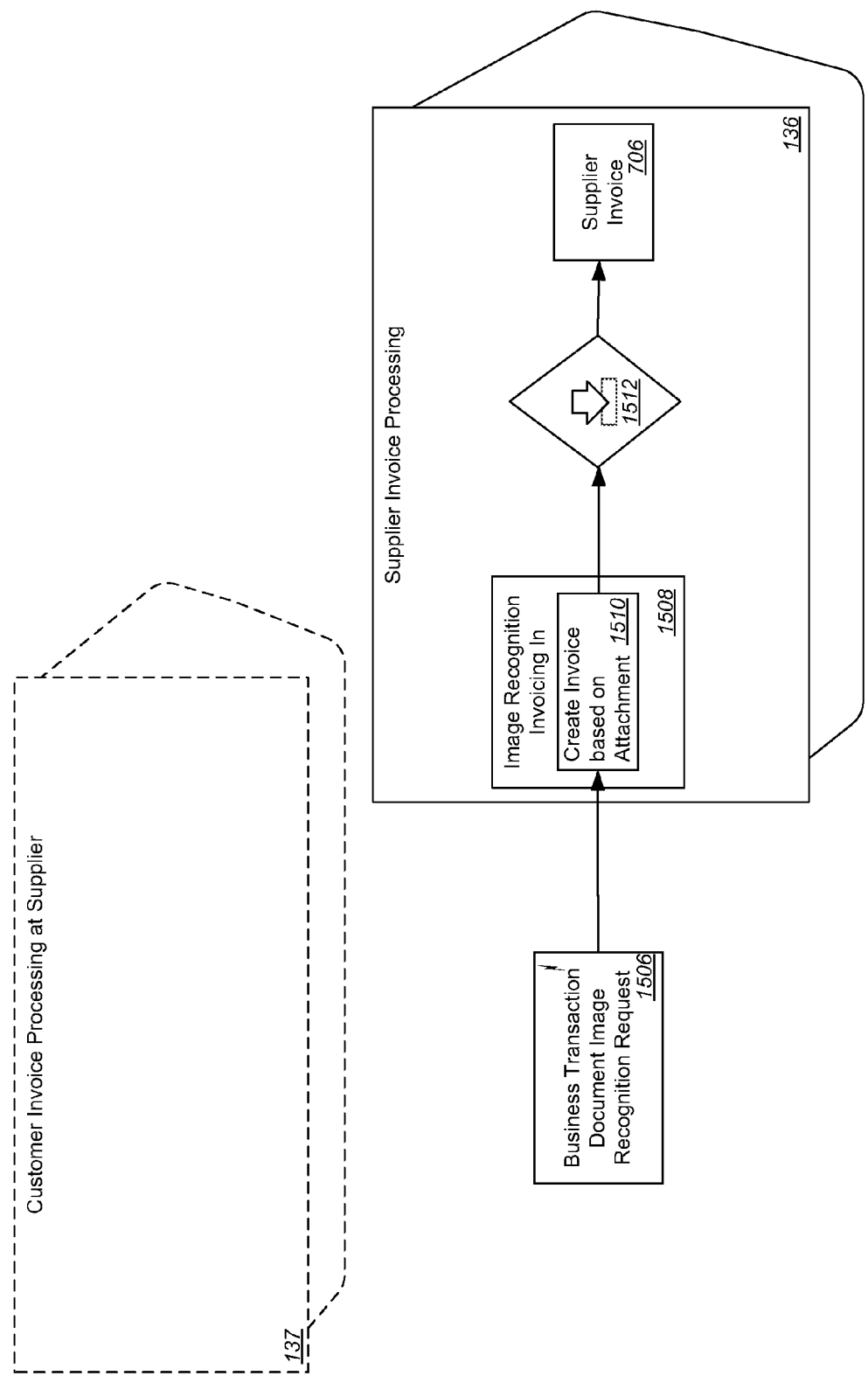
FIG. 15 is a block diagram showing example interactions between a Customer Invoice Processing at Supplier process component and a Supplier Invoice Processing process component.

FIG. 15 is a block diagram showing example interactions between the Customer Invoice Processing at Supplier process component 137 and the Supplier Invoice Processing process component 136 in the architectural design of FIG. 1.

As shown in FIG. 15, the Supplier Invoice Processing process component 136 receives a Business Transaction Document Image Recognition Request message 1506. A Create Invoice based on Attachment operation 1510 receives the message 1506 and creates an empty supplier invoice with an attachment of an invoice image according to legally binding claims or liabilities for delivered goods and rendered services. The Create Invoice based on Attachment operation 1510 is included in an Image Recognition Invoicing In interface 1508. The operation 1510 uses a Create Supplier Invoice based on Attachment inbound process agent 1512 to update the Supplier Invoice business object 706. The Supplier Invoice business object 706 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

Interactions between Process Components "Due Item Processing" and "Accounting"

Figure 16:
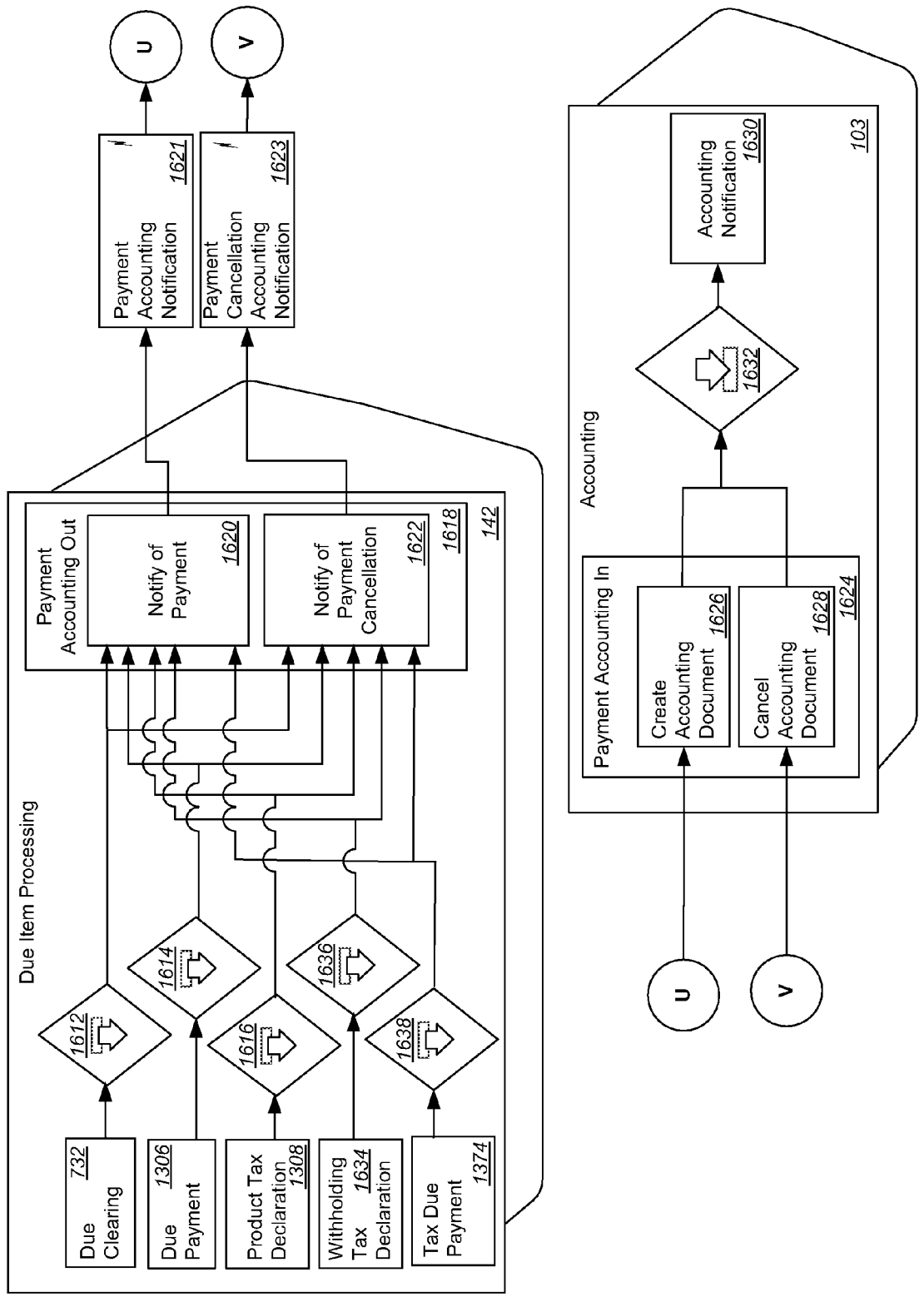
FIG. 16 is a block diagram showing example interactions between the Due Item Processing process component and an Accounting process component.

FIG. 16 is a block diagram showing example interactions between the Due Item Processing process component 142 and the Accounting process component 103 in the architectural design of FIG. 1. The interaction starts when a payment or clearing for trade or tax receivables or payables is created or cancelled. The Due Item Processing process component 142 notifies the Accounting process component 103 about the creation or cancellation of the payment or clearing.

As shown in FIG. 16, the Due Item Processing process component 142 includes the Due Clearing business object 732, the Due Payment business object 1306, the Product Tax Declaration business object 1308, a Withholding Tax Declaration business object 1634, and the Tax Due Payment business object 1374. The Due Clearing business object 732 represents a group of receivables and payables for clearing. The Due Payment business object 1306 represents a payment request or payment confirmation with regard to trade receivables and payables. The Product Tax Declaration business object 1308 represents a declaration of the product tax payables or receivables of a company to the responsible tax authority according to the tax declaration arrangement and country specific legal requirements, that triggers the payment to the tax authority if required. The Withholding Tax Declaration business object 1334 represents a declaration of withholding tax payables of a company to a tax authority according to the tax declaration arrangement and country specific legal requirements. The Tax Due Payment business object 1374 represents a payment request or payment confirmation with regard to tax payables and receivables.

The Due Clearing business object 732 uses a Notify of Payment from Due Clearing to Accounting outbound process agent 1612 to invoke a Notify of Payment operation 1620 or a Notify of Payment Cancellation operation 1622. The operations 1620 and 1622 are included in a Payment Accounting Out interface 1618.

The Due Payment business object 1306 uses a Notify of Payment from Due Payment to Accounting outbound process agent 1614 to invoke the Notify of Payment operation 1620 or the Notify of Payment Cancellation operation 1622.

The Product Tax Declaration business object 1308 uses a Notify of Payment from Product Tax Declaration to Accounting outbound process agent 1616 to invoke the Notify of Payment operation 1620 or the Notify of Payment Cancellation operation 1622.

The Withholding Tax Declaration business object 1634 uses a Notify of Payment from to Withholding Tax Declaration to Accounting outbound process agent 1636 to invoke the Notify of Payment operation 1620 or the Notify of Payment Cancellation operation 1622.

The Tax Due Payment business object 1374 uses a Notify of Payment from Tax Due Payment to Accounting outbound process agent 1638 to invoke the Notify of Payment operation 1620 or the Notify of Payment Cancellation operation 1622.

The Notify of Payment operation 1620 is invoked if a VAT (value added tax) declaration is released. The Notify of Payment Cancellation operation 1622 is invoked if the VAT declaration is cancelled.

If the Notify of Payment operation 1620 is invoked, the operation 1620 generates a Payment Accounting Notification message 1621. If the Notify of Payment Cancellation operation 1623 is invoked, the operation 1623 generates a Payment Cancellation Accounting Notification message 1623.

The Payment Accounting Notification message 1621 is received in a Create Accounting Document operation 1626. The Create Accounting Document operation 1626 handles the Payment Accounting Notification message 1621. The Create Accounting Document operation 1626 is included in a Payment Accounting In interface 1624.

The Payment Cancellation Accounting Notification message 1623 is received in a Cancel Accounting Document operation 1628. The Cancel Accounting Document operation 1628 handles the Payment Cancellation Accounting Notification message 1623. The Cancel Accounting Document operation 1628 is included in a Payment Accounting In interface 1624.

The Create Accounting Document operation 1626 and the Cancel Accounting Document operation 1628 both use a Maintain Accounting Document based on Payment inbound process agent 1632 to update the Accounting Notification business object 1630. The Accounting Notification business object 1630 represents a notification sent to the Accounting process component 103 by an operational component regarding a business transaction. For example, the Accounting Notification business object 1630 can represent this operational business transaction in a standardized form for all business transaction documents, and can include the data needed to valuate the business transaction.

Interactions between Process Components "Goods and Service Acknowledgement" and "Accounting"

Figure 17:
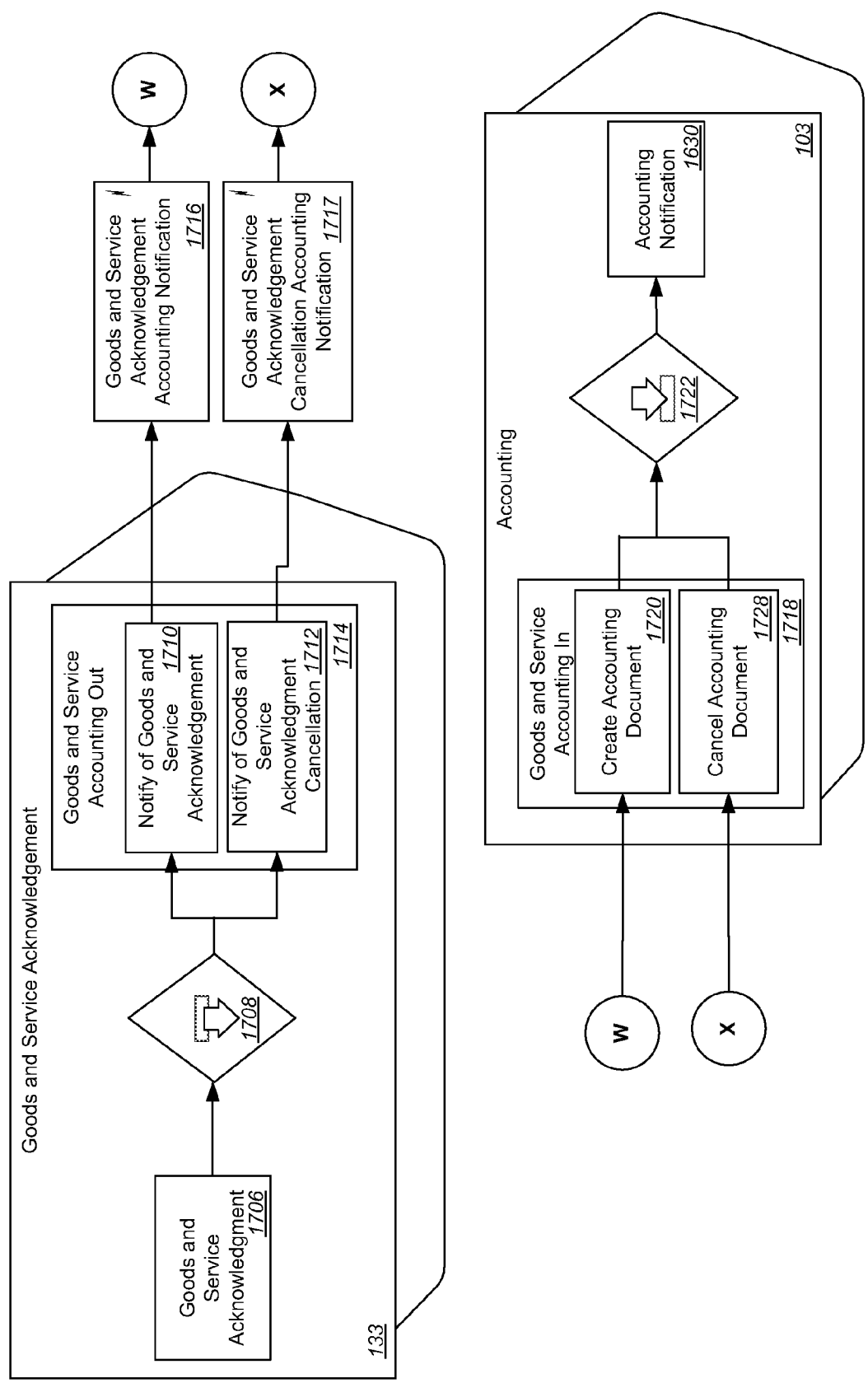
FIG. 17 is a block diagram showing example interactions between a Goods and Service Acknowledgement process component and the Accounting process component.

FIG. 17 is a block diagram showing example interactions between the Goods and Service Acknowledgement process component 133 and the Accounting process component 103 in the architectural design of FIG. 1. The interaction starts when a goods and service acknowledgment is created or cancelled. The Goods and Service Acknowledgement Processing process component 133 requests the creation or cancellation of accounting documents from the Accounting process component 103.

As shown in FIG. 17, the Goods and Service Acknowledgement process component 133 includes a Goods and Service Acknowledgement business object 1706. The Goods and Service Acknowledgement business object 1706 represents a notification sent to the Accounting process component 103 by an operational component regarding a business transaction. For example, the Goods and Service Acknowledgement business object 1706 can represent the operational business transaction in a standardized form for all business transaction documents, and can include the data needed to valuate the business transaction.

The Goods and Service Acknowledgement business object 1706 uses a Notify of Goods and Service Acknowledgement to Accounting outbound process agent 1708 to invoke a Notify of Goods and Service Acknowledgement operation 1710 or a Notify of Goods and Service Acknowledgement Cancellation operation 1712. The Notify of Goods and Service Acknowledgement operation 1710 notifies the Accounting process component 103 about delivered goods and rendered services of a goods and service acknowledgement. The Notify of Goods and Service Acknowledgement Cancellation operation 1712 notifies the Accounting process component 103 about goods and service acknowledgement cancellation. The operations 1710 and 1712 are included in a Goods and Service Accounting Out interface 1714. The Notify of Goods and Service Acknowledgement operation 1710 generates a Goods and Service Acknowledgement Accounting Notification message 1716.

A Create Accounting Document operation 1720 receives the message 1716. The Create Accounting Document operation 1720 receives goods movement resource consumption notification from the Goods and Service Acknowledgement process component 133. The Create Accounting Document operation 1720 is included in a Goods and Service Accounting In interface 1718. The operation 1720 uses a Maintain Accounting Document based on a Goods and Service Acknowledgement Description inbound process agent 1722 to update the Accounting Notification business object 1630. The Accounting Notification business object 1630 represents a notification sent to the Accounting process component 103 by an operational component regarding a business transaction. For example, the Accounting Notification business object 1630 can represent the operational business transaction in a standardized form for all business transaction documents, and can include the data needed to valuate the business transaction.

The Notify of Goods and Service Acknowledgement Cancellation operation 1712 generates a Goods and Service Acknowledgement Cancellation Accounting Notification message 1717. A Cancel Accounting Document operation 1728, in the Goods and Service Accounting In interface 1718, receives the Goods and Service Acknowledgement Cancellation Request message 1717 from the Goods and Service Acknowledgement process component 133. The Cancel Accounting Document operation 1728 receives a goods movement resource consumption cancellation request from the Goods and Service Acknowledgement process component 133. The operation 1728 uses a Maintain Accounting Document based on the Goods and Service Acknowledgement Description inbound process agent 1722 to update the Accounting Notification business object 1630.

Interactions between Process Components "Purchasing Contract Processing" and "Supplier Invoice Processing"

Figure 18:
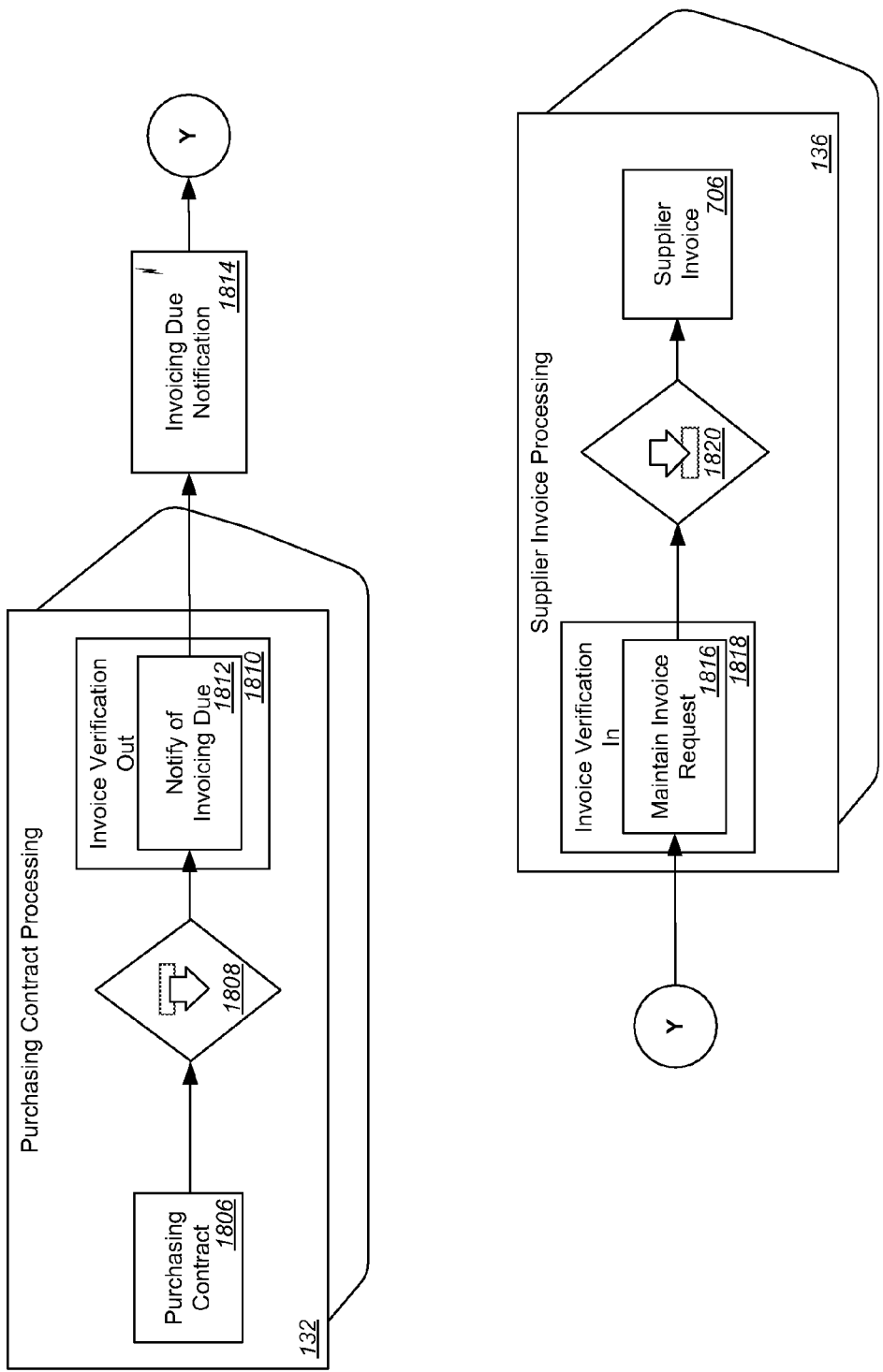
FIG. 18 is a block diagram showing example interactions between a Purchasing Contract Processing process component and the Supplier Invoice Processing process component.

FIG. 18 is a block diagram showing example interactions between the Purchasing Contract Processing process component 132 and the Supplier Invoice Processing process component 136 in the architectural design of FIG. 1. The interaction starts when a purchasing contract is released. The Purchasing Contract Processing process component 132 notifies the Supplier Invoice Processing process component 136 about the invoicing-relevant data included in the purchasing contract.

As shown in FIG. 18, the Purchasing Contract Processing process component 132 includes a Purchasing Contract business object 1806. The business object 1806 represents a legally binding purchase agreement that can includes special conditions that are negotiated between a buyer and a seller, covering goods to be supplied or services to be performed. The purchase agreement can be valid for a specific period, during which goods and services are released against the contract.

The Purchasing Contract business object 1806 uses a Notify of Invoicing Due from Purchasing Contract to Supplier Invoice Processing outbound process agent 1808 to invoke a Notify of Invoicing Due operation 1812. The operation 1812 is included in an Invoice Verification Out interface 1810. The operation 1812 creates a new supplier invoicing request or updates an existing supplier invoice request from a released Purchasing Contract. The Notify of Invoicing Due operation 1812 generates an Invoicing Due Notification message 1814.

A Maintain Invoice Request operation 1816 receives the Invoicing Due Notification message 1814. The operation 1816 is included in an Invoice Verification In interface 1818. The Maintain Invoice Request operation 1816 creates or updates a reference object in the Supplier Invoice Processing process component 136 in order to perform invoice verification with reference to a purchase order without having to access other deployment units. The reference object can be used for checks against the preceding documents and to make proposals for invoice entry. The Maintain Invoice Request operation 1816 uses a Maintain Supplier Invoice Request inbound process agent 1820 to update the Supplier Invoice Request business object 706. The Supplier Invoice Request business object 706 represents a request sent to invoice verification advising that a supplier invoice for specified quantities and prices is expected and can be created through evaluation settlement.

Interactions between Process Components "Supplier Invoice Processing" and "Accounting"

Figure 19:
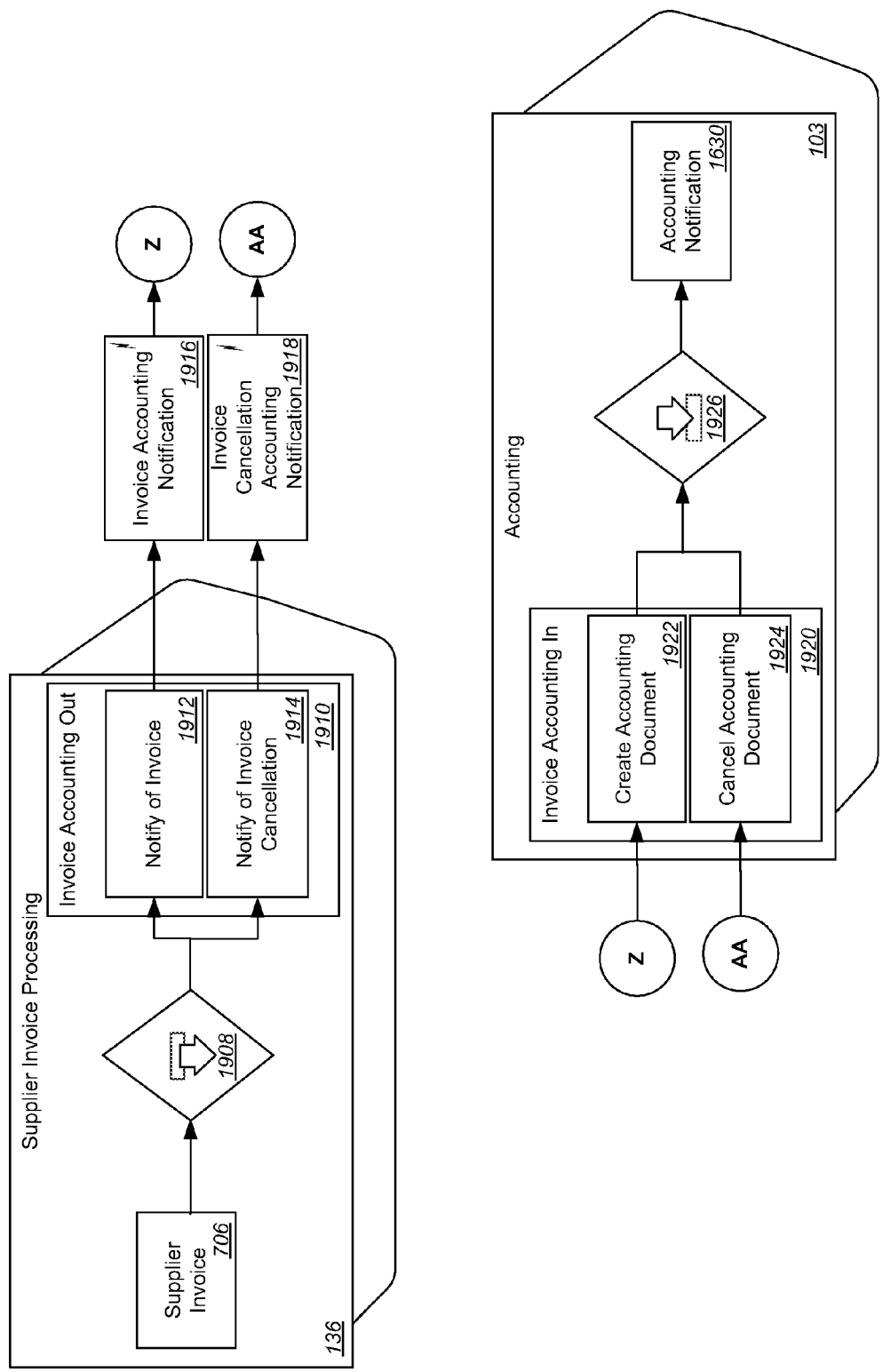
FIG. 19 is a block diagram showing example interactions between the Supplier Invoice Processing process component and the Accounting process component.

FIG. 19 is a block diagram showing example interactions between the Supplier Invoice Processing process component 136 and the Accounting process component 103 in the architectural design of FIG. 1. The interaction starts when a supplier invoice is created or cancelled. The Supplier Invoice Processing process component 136 requests the creation or cancellation of accounting documents from the Accounting process component 103.

As shown in FIG. 19, the Supplier Invoice Processing process component 136 includes the Supplier Invoice business object 706. The Supplier Invoice business object 706 represents a company's obligation to pay the supplier for delivered goods and services. For example, if the company returns goods or complains about services, the supplier can issue a credit memo for an amount equal to or lower than the original invoice, and can refund the money to the company.

The Supplier Invoice business object 706 uses a Notify of Supplier Invoice to Accounting outbound process agent 1908 to invoke a Notify of Invoice operation 1912 or a Notify of Invoice Cancellation operation 1914. The Notify of Invoice operation 1912 and the Notify of Invoice Cancellation operation 1914 are included in an Invoice Accounting Out interface 1910. The Notify of Invoice operation 1912 forwards accounting relevant information about a billing document (e.g., invoice, credit memo) to the Accounting process component 103 in order to assure posting. The Notify of Invoice operation 1912 generates an Invoice Accounting Notification message 1916.

The Notify of Invoice Cancellation operation 1914 cancels accounting relevant information about a billing document (e.g., invoice, credit memo). The Notify of Invoice Cancellation operation 1914 generates an Invoice Cancellation Accounting Notification message 1918.

A Create Accounting Document operation 1922 receives the Invoice Accounting Notification message 1916. The operation 1922 creates an accounting document for a customer invoice or supplier invoice. For example, the accounting document records payables, receivables, expenses, and revenues for the invoice in the Accounting process component 103. The Create Accounting Document operation 1922 is included in an Invoice Accounting In interface 1920.

A Cancel Accounting Document operation 1924 receives the Invoice Cancellation Accounting Notification message 1918. The operation 1924 receives an invoice accounting cancellation request from the Customer Invoice Processing process component or the supplier Invoice Processing process component 136. The Cancel Accounting Document operation 1924 is included in the Invoice Accounting In interface 1920.

The Create Accounting Document operation 1922 and the Cancel Accounting Document operation 1924 both use a Maintain Accounting Document based on Invoice inbound process agent 1926 to update the Accounting Notification business object 1630. The Accounting Notification business object 1630 represents a notification sent to the Accounting process component 103 by an operational component regarding a business transaction. The Accounting Notification business object 1630 can represent the operational business transaction in a standardized form for all business transaction documents, and can include the data needed to valuate the business transaction.

Interactions between Process Components "Purchase Order Processing" and "Supplier Invoice Processing"

Figure 20:
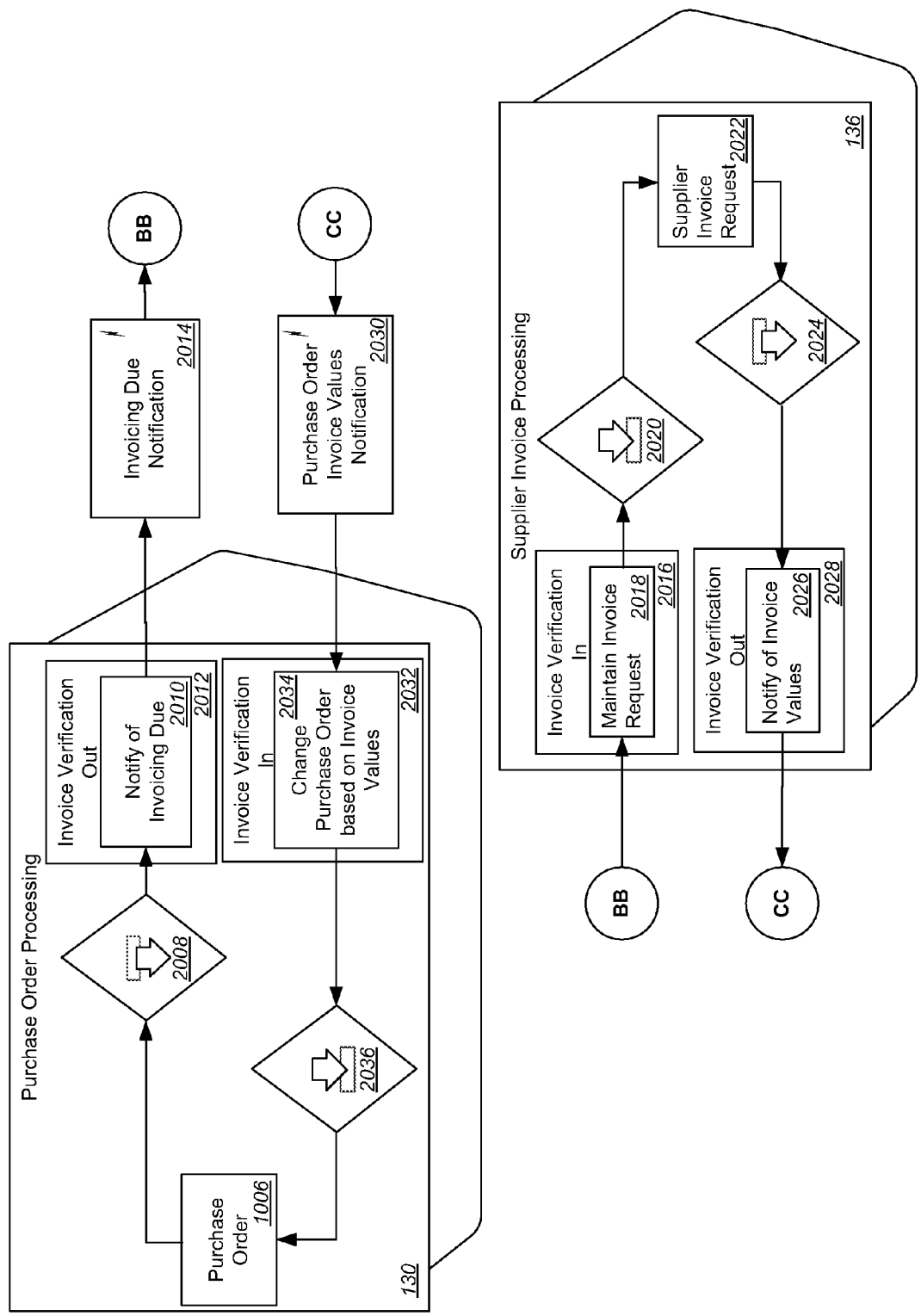
FIG. 20 is a block diagram showing example interactions between the Purchase Order Processing process component and the Supplier Invoice Processing process component.

FIG. 20 is a block diagram showing example interactions between the Purchase Order Processing process component 130 and the Supplier Invoice Processing process component 136 in the architectural design of FIG. 1. The interaction starts when a purchase order is requested. The Purchase Order Processing process component 130 notifies the Supplier Invoice Processing process component 136 about the invoicing-relevant data contained in the purchase order.

As shown in FIG. 20, the Purchase Order Processing process component 130 includes the Purchase Order business object 1006. The Purchase Order business object 1006 represents a request from a buyer to a seller to deliver a specified quantity of material, or to perform a specified service, at a specified price within a specified time.

The Purchase Order business object 1006 uses a Notify of Invoicing Due from Purchase Order to Supplier Invoice Processing outbound process agent 2008 to invoke a Notify of Invoicing Due operation 2010. The Notify of Invoicing Due operation 2010 notifies a supplier invoice about an invoice due, or when a purchase order has been created, changed or cancelled. The Notify of Invoicing Due operation 2010 is included in an Invoice Verification Out interface 2012. The operation 2010 generates an Invoicing Due Notification message 2014.

A Maintain Invoice Request operation 2018 receives the Invoicing Due Notification message 2014. The operation 2018 creates or updates a reference object in the Supplier Invoice Processing process component 136 in order to perform invoice verification with reference to a purchase order without having to access other deployment units. The reference object is used for checks against the preceding documents and to make proposals for invoice entry. The Maintain Invoice Request operation 2018 is included in an Invoice Verification In interface 2016.

A Maintain Supplier Invoice Request inbound process agent 2020 updates invoice data into a Supplier Invoice Request business object 2022. The Supplier Invoice Request business object 2022 represents a request that is sent to invoice verification, advising that a supplier invoice for specified quantities and prices is expected, or is to be created through evaluation settlement.

The business object 2022 uses a Notify of Invoiced Values from Supplier Invoice Request to Purchase Order Processing outbound process agent 2024 to invoke a Notify of Invoice Values operation 2026. The Notify of Invoice Values operation 2026 notifies the Purchase Order Processing process component 130 that at least parts of the purchase order have been invoiced. The operation 2026 is included in an Invoice Verification Out interface 2028. The Notify of Invoice Values operation 2026 generates a Purchase Order Invoice Values Notification message 2030.

The message 2030 is received in a Change Purchase Order based on Invoice Values operation 2034. The Change Purchase Order based on Invoice Values operation 2034 changes a purchase order based on invoice values by adding the quantity and amount of a supplier invoice to the cumulated invoiced quantity and amount in a purchase order. The operation can also add the reference to the supplier invoice document to the purchase order. The operation 2034 is included in an Invoice Verification In interface 2032. The Change Purchase Order based on Invoice Values operation 2034 uses a Change Purchase Order based on Invoice Values inbound process agent 2036 to update the Purchase Order business object 1006.

Interactions between Process Components "Goods and Service Acknowledgement" and "Supplier Invoice Processing"

Figure 21:
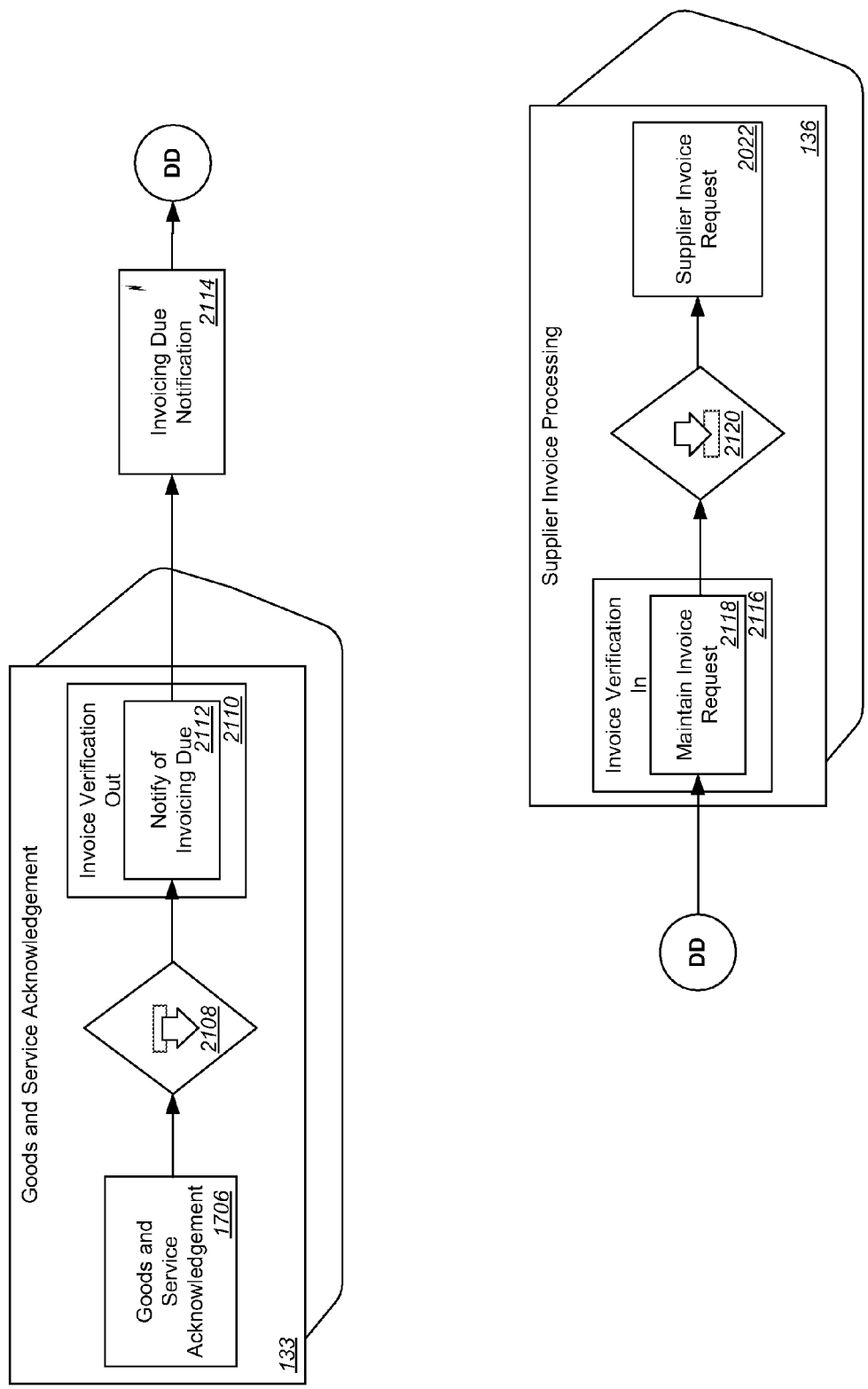
FIG. 21 is a block diagram showing example interactions between the Goods and Service Acknowledgement process component and the Supplier Invoice Processing process component.

FIG. 21 is a block diagram showing example interactions between the Goods and Service Acknowledgement process component 133 and the Supplier Invoice Processing process component 136 in the architectural design of FIG. 1. The interaction starts when a goods and service acknowledgement is posted. The Goods and Service Acknowledgement process component 133 notifies the Supplier Invoice Processing process component 136 of the invoicing-relevant data included in the goods and service acknowledgement.

As shown in FIG. 21, the Goods and Service Acknowledgement process component 133 includes the Goods and Service Acknowledgement business object 1706. The Goods and Service Acknowledgement business object 1706 represents a document that reports the receipt of goods and services.

The Goods and Service Acknowledgement business object 1706 uses a Notify of Invoicing Due from GSA (Goods and Service Acknowledgement) to Supplier Invoice Processing outbound process agent 2108 to invoke a Notify of Invoicing Due operation 2112. The Notify of Invoicing Due operation 2112 notifies the Goods And Service Acknowledgement process component 133 of a goods and service acknowledgement due for invoicing. The operation 2112 is included in an Invoice Verification Out interface. The Notify of Invoicing Due operation 2112 generates an Invoicing Due Notification message 2114.

A Maintain Invoice Request operation 2118 receives the Invoicing Due Notification message 2114. The operation 2118 is included in an Invoice Verification In interface 2116. The operation 2118 creates or updates a reference object in the Supplier Invoice Processing process component 136 in order to perform invoice verification with reference to a purchase order without having to access other logical deployment units. The reference object can be used for checks against the preceding documents, and to make proposals for invoice entry.

The Maintain Invoice Request operation 2118 uses a Maintain Supplier Invoice Request inbound process agent 2120 to update the Supplier Invoice Request business object 2022. The Supplier Invoice Request business object 2022 represents a request that is sent to invoice verification, advising that a supplier invoice for specified quantities and prices is expected, or is to be created through evaluation settlement.

Interactions between Process Components "Project Processing" and "Time and Labor Management"

Figure 22:
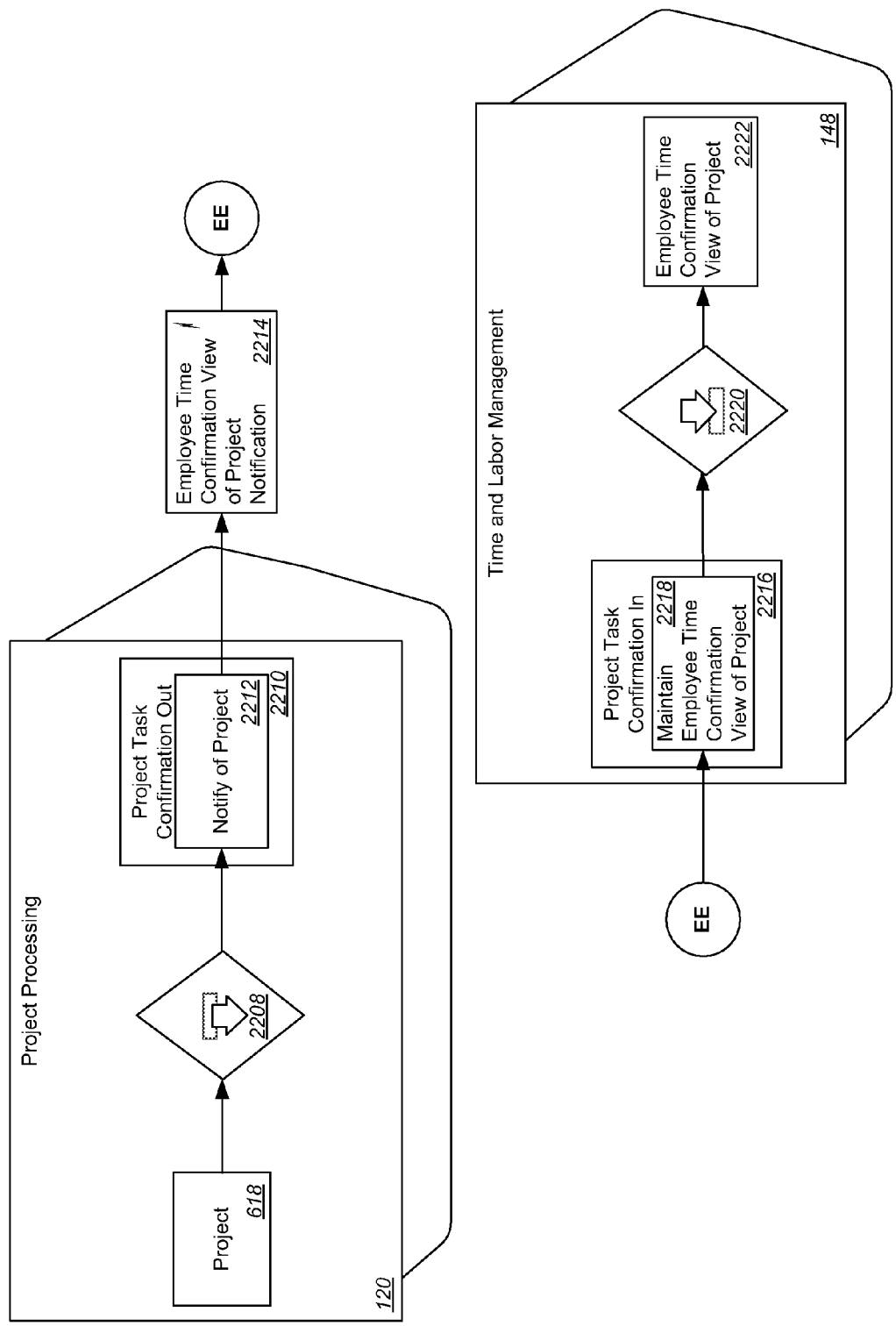
FIG. 22 is a block diagram showing example interactions between the Project Processing process component and the Time and Labor Management process component.

FIG. 22 is a block diagram showing example interactions between the Project Processing process component 120 and the Time and Labor Management process component 148 in the architectural design of FIG. 1. The interaction starts when a project is released, and ends when it is closed or cancelled. The Time and Labor Management process component 148 can be notified with a list of project tasks and planned employees in order to be able to create a work list for time confirmations. After a confirmation is done, the Project Processing process component 120 can be notified about the actuals.

As shown in FIG. 22, The Project Processing process component includes the Project business object 618. The Project business object 618 represents a business undertaking with a defined goal that can be attained in a specified time frame. The business undertaking can be achieved using predefined funds and planned resources, while reaching an agreed quality level. The project can be characterized by the fact that it is unique, and that it involves an element of risk.

The Project business object 618 uses a Notify of Project to Time and Labor Management outbound process agent 2208 to invoke a Notify of Project operation 2212. The Notify of Project operation 2212 provides information about tasks and assigned employees in a project. The Notify of Project operation 2212 is included in a Project Task Confirmation Out interface 2210. The operation 2212 generates an Employee Time Confirmation View of Project Notification message 2214

A Maintain Employee Time Confirmation View Of Project operation 2218 receives the Employee Time Confirmation View of Project Notification message 2214. The Maintain Employee Time Confirmation View Of Project operation 2218 maintains the Employee Time Confirmation View Of Project business object 2222 based on changes of the Project business object 618 in the Project Processing process component 120. The operation 2218 is included in a Project Task Confirmation In interface 2216. The Maintain Employee Time Confirmation View Of Project operation 2218 uses a Maintain Employee Time Confirmation View on Project inbound process agent 2220 to update an Employee Time Confirmation View Of Project business object 2222. The Employee Time Confirmation View on Project business object 2222 represents a view on a project restricted to those project tasks for which employee times are confirmed.

Interactions between Process Components "Purchase Order Processing" and "Accounting"

Figure 23:
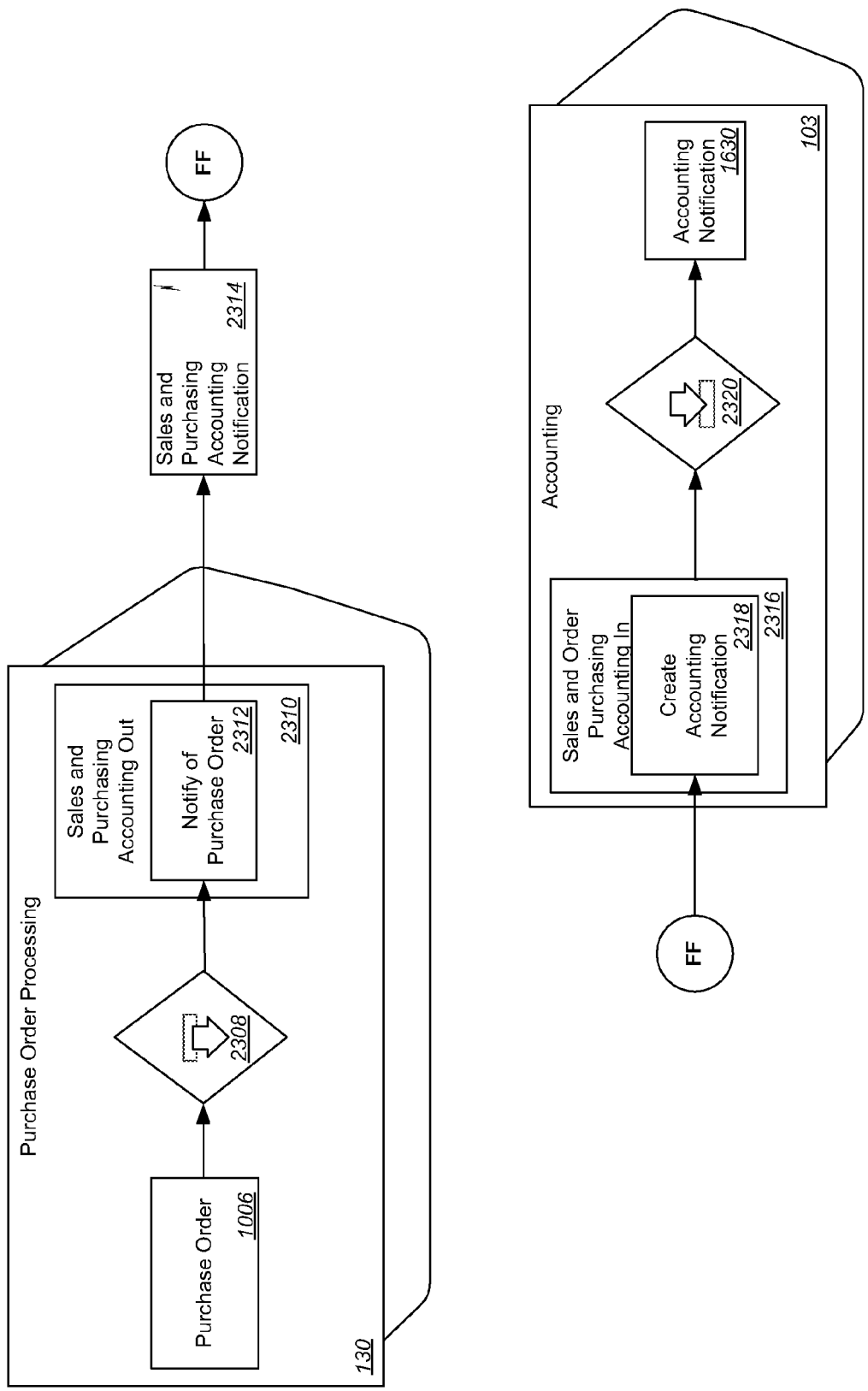
FIG. 23 is a block diagram showing example interactions between the Purchase Order Processing process component and the Accounting process component.

FIG. 23 is a block diagram showing example interactions between the Purchase Order Processing process component 130 and the Accounting process component 103 in the architectural design of FIG. 1. The interaction starts when a purchase order is created or updated. The Purchase Order Processing process component 130 requests the creation or update of subledger account (based on purchasing) from the Accounting process component 103.

As shown in FIG. 23, the Purchase Order Processing component 130 includes the Purchase Order business object 1006. The Purchase Order business object 1006 represents a request from a buyer to a seller to deliver a specified quantity of material, or perform a specified service, at a specified price within a specified time.

The Purchase Order business object 1006 uses the Notify of Purchase Order to Accounting outbound process agent 2308 to invoke a Notify of Purchase Order operation 2312. The Notify of Purchase Order operation 2312 notifies about a created, changed, or cancelled purchase order. The operation 2312 is included in an Order Accounting Out interface 2310. The operation 2312 generates a Sales and Purchasing Accounting Notification message 2314.

A Create Accounting Notification operation 2318 receives the Sales and Purchasing Accounting Notification message 2314. The operation 2318 receives order accounting notification from the Purchase Order Processing process component 130. The notification can inform the Accounting process component 103 about the creation, change or deletion of any kind of order business objects. The operation 2318 is included in a Sales and Order Purchasing Accounting In interface 2316. The Create Accounting Notification operation 2318 uses a Maintain Subledger Account based Sales and Purchasing inbound process agent 2320 to update the Accounting Notification business object 1630. The Accounting Notification business object 1630 represents a notification sent to the Accounting process component 103 by an operational component regarding a business transaction. For example, the Accounting Notification business object 1630 can represent the operational business transaction in a standardized form for all business transaction documents, and can include the data needed to valuate the business transaction.

Interactions between Process Components "Payment Processing" and "Accounting"

Figure 24:
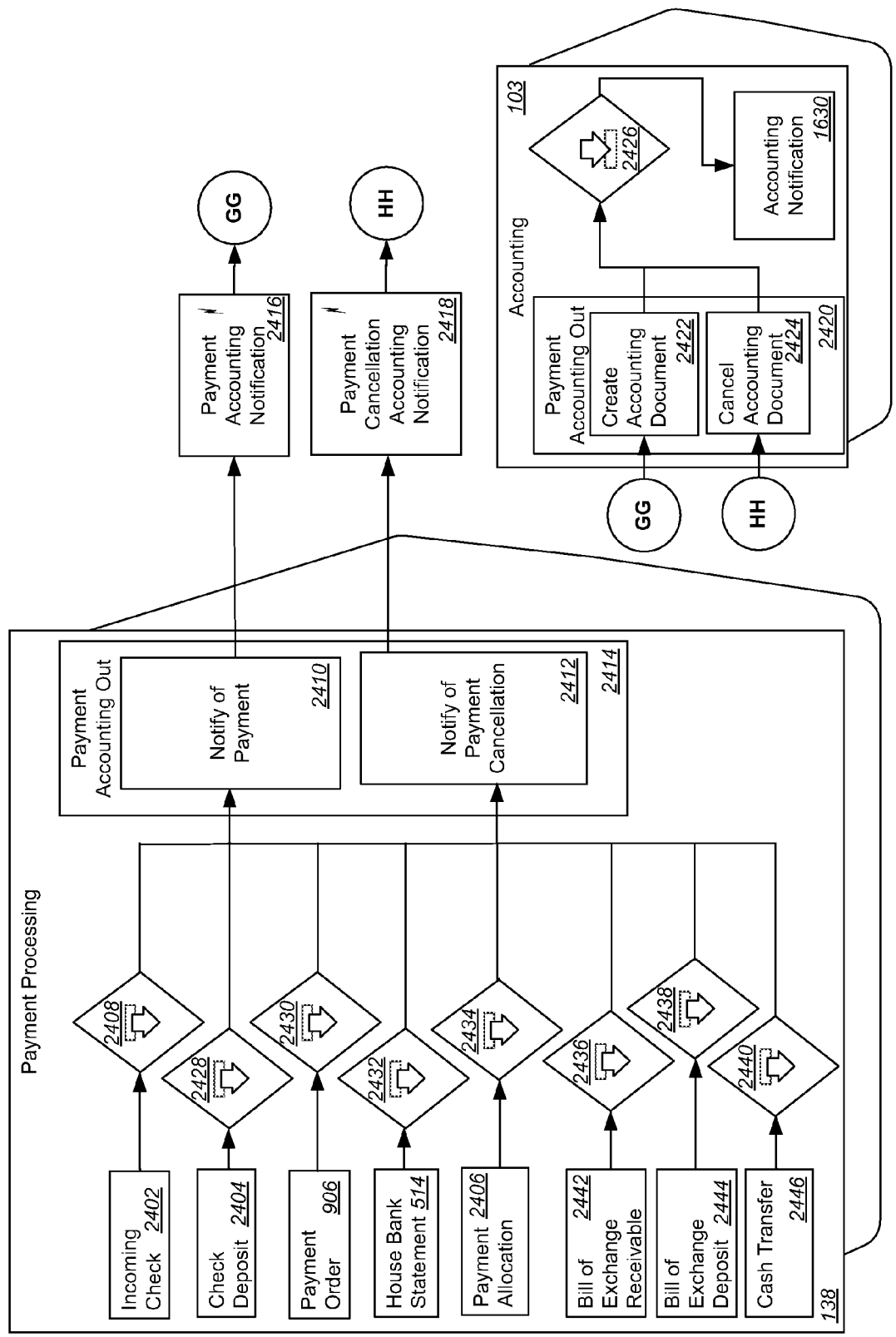
FIG. 24 is a block diagram showing example interactions between the Payment Processing process component and the Accounting process component.

FIG. 24 is a block diagram showing example interactions between the Payment Processing process component 138 and the Accounting process component 103 in the architectural design of FIG. 1. The interaction starts when a payment is ordered, received, allocated or cancelled. The Payment Processing process component 138 can notify the Accounting process component 103 about the creation or cancellation of a payment ordered, received or allocated.

As shown in FIG. 24, the Payment Processing process component 138 includes an Incoming Check business object 2402, a Check Deposit business object 2404, the Payment Order business object 906, the House Bank Statement business object 514, a Payment Allocation business object 2406, a Bill of Exchange Receivable business object 2442, a Bill of Exchange Deposit business object 2444, and a Cash Transfer business object 2446. The Incoming Check business object 2402 represents a check issued by a business partner payable to the company. The Check Deposit business object 2404 represents a deposit of checks at a house bank for credit to a house bank account. The Payment Allocation business object 2406 represents an assignment of a payment item to the payment reasons from which the payment item originated. The Payment Order business object 906 represents an order within a company to make a payment to a business partner at a specified time. For example, a payment order can be a collective order that includes several individual orders. The House Bank Statement business object 514 represents a legally binding notification from the house bank about the revenues (items) within a specific time period at a house bank account with a defined starting and closing balance. The Bill of Exchange Receivable business object 2442 represents a bill of exchange issued either by the company or by a business partner for the benefit of the company. The Bill of Exchange Deposit business object 2444 represents a deposit of bills of exchange receivable at a house bank for credit to a house bank account. The Cash Transfer business object 2446 represents a company-internal money transfer that can include the following payments: from one house bank account to another (house bank account transfer); from one cash storage to another (cash transfer); from a cash storage to a house bank account (cash deposit); from a house bank account to a cash storage (cash withdrawal).

The Incoming check business object 2402 uses a Notify of Payment from Incoming Check to Accounting outbound process agent 2408 to invoke a Notify of Payment operation 2410 or a Notify of Payment Cancellation operation 2412. The operations 2410 and 2412 are included in a Payment Accounting Out interface 2414.

The Check Deposit business object 2404 uses a Notify of Payment from Check Deposit to Accounting outbound process agent 2428 to invoke the Notify of Payment operation 2410 or the Notify of Payment Cancellation operation 2412.

The Payment Order business object 906 uses a Notify of Payment from Payment Order to Accounting outbound process agent 2430 to invoke the Notify of Payment operation 2410 or the Notify of Payment Cancellation operation 2412.

The House Bank Statement business object 514 uses a Notify of Payment from Bank Statement to Accounting outbound process agent 2432 to invoke the Notify of Payment operation 2410 or the Notify of Payment Cancellation operation 2412.

The Payment Allocation business object 2406 uses a Notify of Payment from Payment Allocation to Accounting outbound process agent 2434 to invoke the Notify of Payment operation 2410 or the Notify of Payment Cancellation operation 2412.

The Bill of Exchange Receivable business object 2442 uses a Notify of Payment from Bill of Exchange Receivable to Accounting outbound process agent 2436 to invoke the Notify of Payment operation 2410 or the Notify of Payment Cancellation operation 2412.

The Bill of Exchange Deposit business object 2444 uses a Notify of Payment from Bill of Exchange Deposit to Accounting outbound process agent 2438 to invoke the Notify of Payment operation 2410 or the Notify of Payment Cancellation operation 2412.

The Cash Transfer business object 2446 uses a Notify of Payment Cash Transfer to Accounting outbound process agent 2440 to invoke the Notify of Payment operation 2410 or the Notify of Payment Cancellation operation 2412.

If the Notify of Payment operation 2410 is invoked, the operation 2410 generates a Payment Accounting Notification message 2416. If the Notify of Payment Cancellation operation 2412 is invoked, the operation 2412 generates a Payment Cancellation Accounting Notification message 2418.

A Create Accounting Document operation 2422 receives the Payment Accounting Notification message 2416. A Cancel Accounting Document operation 2424 receives the Payment Cancellation Accounting Notification message 2418. The operations 2422 and 2424 are included in a Payment Accounting Out interface 2420. The operations 2422 and 2424 use a Maintain Accounting Document based on Payment inbound process agent 2426 to update the Accounting Notification business object 1630. The Accounting Notification business object 1630 represents a notification sent to the Accounting process component 103 by an operational component regarding a business transaction. For example, the Accounting Notification business object 1630 can represent the operational business transaction in a standardized form for all business transaction documents, and can include the data needed to valuate the business transaction.

If the Notify of Payment operation 2410 is invoked, then the Payment Accounting Notification message 2416 is sent to the Accounting process component 103 to update the Accounting Notification business object 1630. If the Notify of Payment Cancellation operation 2412 is invoked, then the Payment Cancellation Accounting Notification message 2418 is sent to the Accounting process component 103 to update the Accounting Notification business object 1630.
Interactions between Process Components "Purchase Order Processing" and "Sales Order Processing at Supplier"

Figure 25:
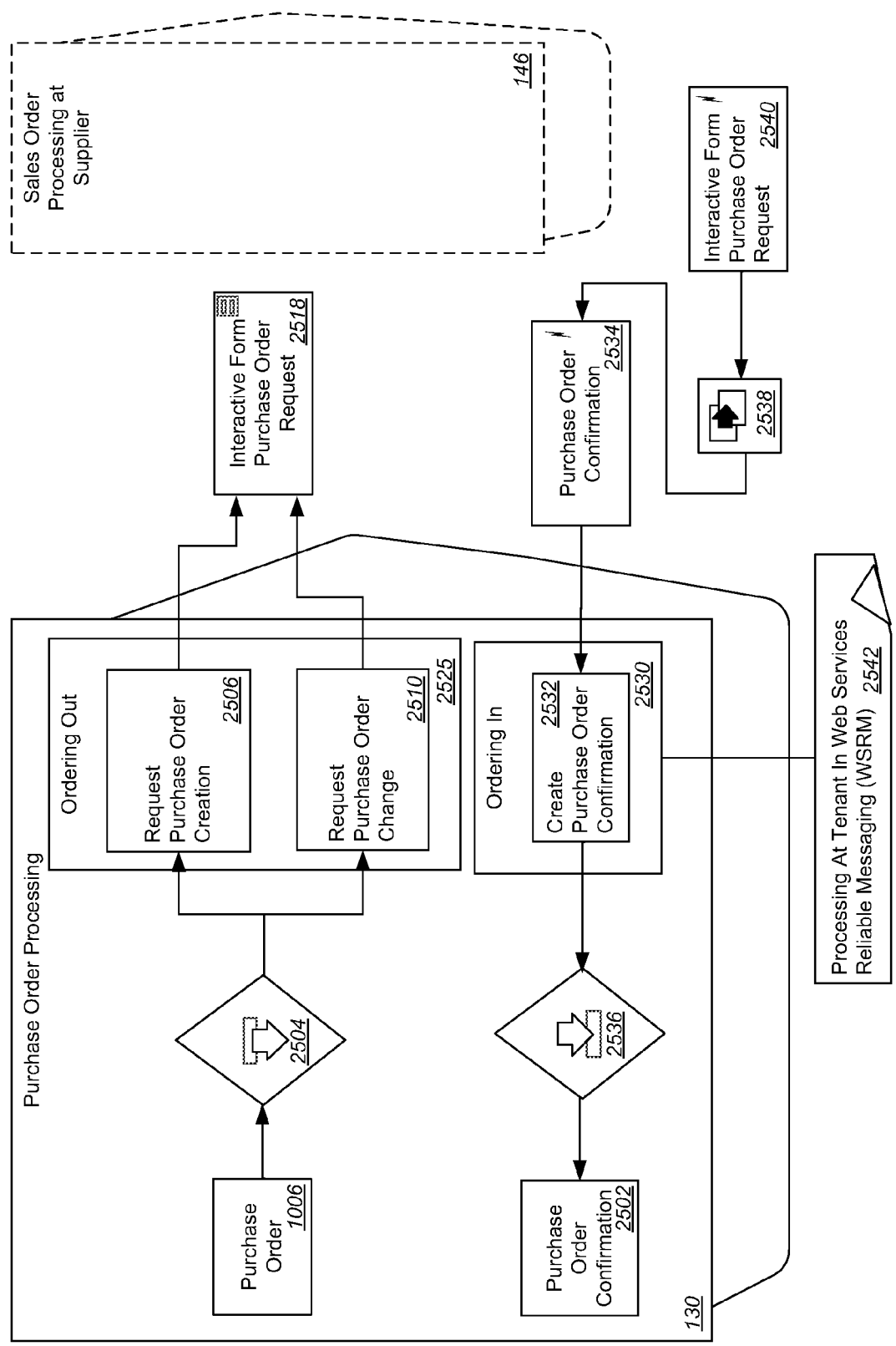
FIG. 25 is a block diagram showing example interactions between the Purchase Order Processing process component and a Sales Order Processing at Supplier process component.

FIG. 25 is a block diagram showing example interactions between the Purchase Order Processing process component 130 and the Sales Order Processing at Supplier process component 146 in the architectural design of FIG. 1.

As shown in FIG. 25, the Purchase Order Processing process component 130 includes the Purchase Order business object 1006 and a Purchase Order Confirmation business object 2502. The Purchase Order Confirmation business object 2502 represents a confirmation from a seller to deliver a specified quantity of goods, or perform a specified service, at a specified price within a specified time. The Purchase Order business object 1006 represents a request from a buyer to a seller to deliver a specified quantity of material, or perform a specified service, at a specified price within a specified time.

The Purchase Order business object 1006 uses a Request Purchase Order to Supplier outbound process agent 2504 to request a purchase order at a supplier. The outbound process agent 2504 invokes either a Request Purchase Order Creation operation 2506, or a Request Purchase Order Change operation 2510. The operations 2506 and 2510 are included in an Ordering Out interface 2525.

The Request Purchase Order Creation operation 2506 requests a purchase order from a supplier. The operation 2506 generates an Interactive Form Purchase Order Request message 2518. The Request Purchase Order Change operation 2510 requests a change of a purchase order that was formerly ordered at a supplier. The operation 2510 can also generate an Interactive Form Purchase Order Request message 2518.

The Interactive Form Purchase Order Request message 2518 is received at the external Sales Order Processing at Supplier process component 146. The external process component 146 can confirm the purchase order request by generating an Interactive Form Purchase Order Request Message 2540. The Interactive Form Purchase Order Request message 2540 uses Mapping Entity 2538 to transform the interactive form-based message type to a Purchase Order Confirmation message 2534 that can be received by the Create Purchase Order Confirmation operation 2532.

The operation 2532 creates a purchase order confirmation according to the confirmation, partial confirmation, or proposed changes sent from the seller to the buyer concerning the requested delivery of the product to trigger the creation of a purchase order confirmation. The Purchase Order Confirmation message 2534 is included in an Ordering In interface 2530. The operation 2532 uses a Create Purchase Order Confirmation inbound process component 2536 to update the Purchase Order Confirmation business object 2502. The Ordering In interface 2530 receives information from a Processing At Tenant In Web Services Reliable Messaging (WSRM) communication channel template 2542. The communication channel template 2542 can provide information from an external party about a purchase order confirmation.
Interactions between Process Components "RFQ Processing" and "Opportunity/Customer Quote Processing at Supplier"

Figure 26:
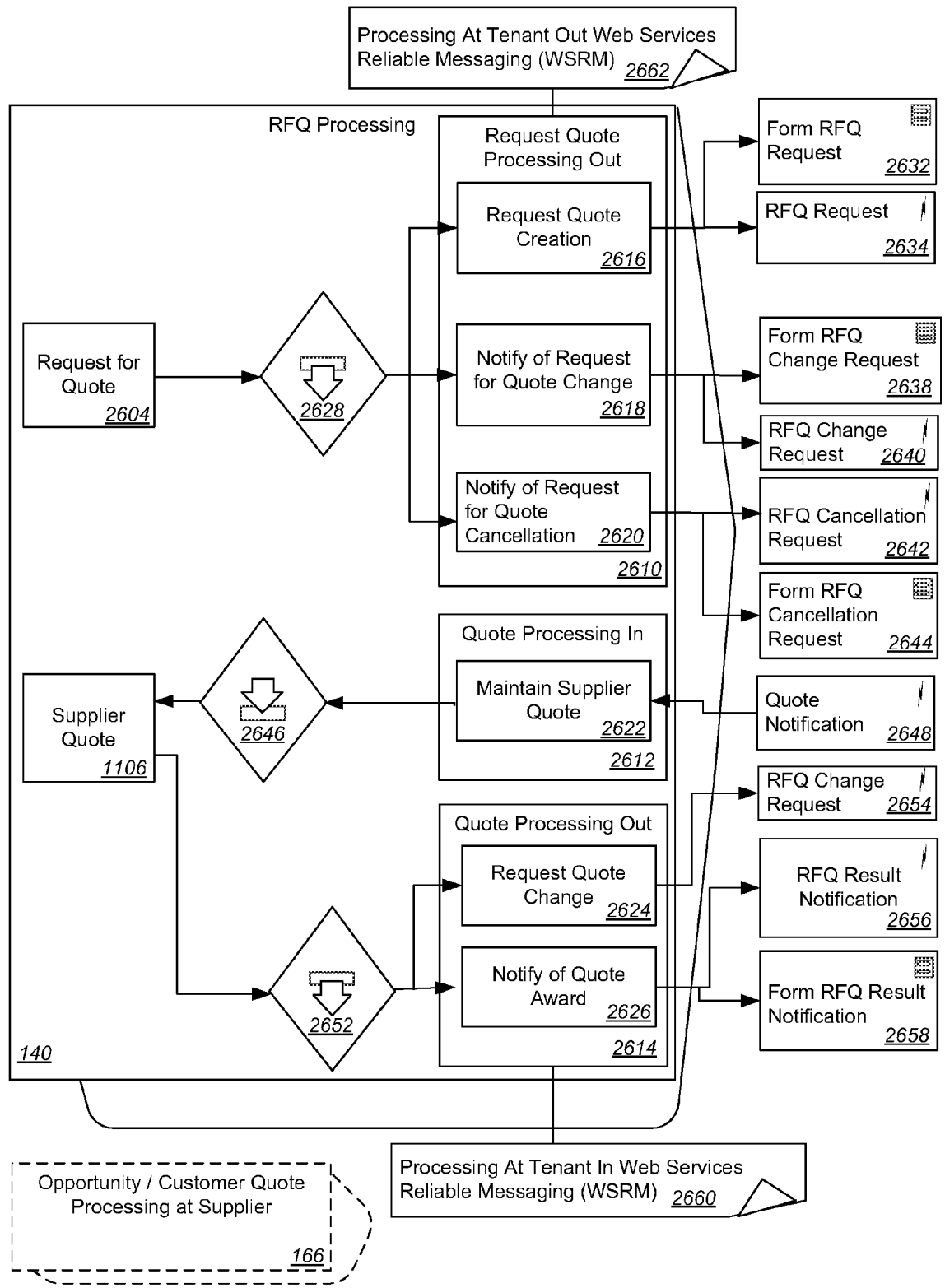
FIG. 26 is a block diagram showing example interactions between the RFQ Processing process component and an Opportunity/Customer Quote Processing at Supplier process component.

FIG. 26 is a block diagram showing example interactions between the RFQ Processing process component 140 and the Opportunity/Customer Quote Processing at Supplier process component 166 in the architectural design of FIG. 1. The interaction starts when a request for quote is created, changed, or cancelled. The RFQ Processing process component 140 can request the creation or update of a supplier quote from the Opportunity/Customer Quote Processing at Supplier process component 166. The RFQ Processing process component 140 can inform the supplier of the awarding result.

As shown in FIG. 26, the RFQ Processing process component 140 includes a Request for Quote business object 2604 and the Supplier Quote business object 1106. The Request for Quote business object 2604 represents a request from a buyer to a bidder to submit a quote for goods or services according to a set of specified criteria. The Supplier Quote business object 1106 represents a response to a quote request in which a bidder offers to sell goods and services to a buyer according to requested criteria.

The RFQ Processing process component 140 also includes a Request Quote Processing Out interface 2610, a Quote Processing In interface 2612, and a Quote Processing Out interface 2614. The Request Quote Processing Out interface 2610 includes a Request Quote Creation operation 2616, a Notify of Request for Quote Change operation 2618, and a Notify of Request for Quote Cancellation operation 2620. The Request Quote Creation operation 2616 requests the participation of the supplier in a bidding process. The Notify of Request for Quote Change operation 2618 notifies the supplier about changes to the request for quote. The Notify of Request for Quote Cancellation operation 2620 notifies the supplier about the cancellation of a request for quote. The Request Quote Processing Out interface 2610 receives information from a Processing At Tenant Out Web Services Reliable Messaging (WSRM) communication channel template 2662. The communication channel template 2662 can provide information from an external party about a purchase order confirmation.

The Quote Processing In interface 2612 includes a Maintain Supplier Quote operation 2622 that creates or updates a supplier quote on the basis of the received customer quote which was sent in response to the invitation from the buyer to submit a quotation.

The Quote Processing Out interface 2614 includes a Request Quote Change operation 2624 and a Notify of Quote Award operation 2626. The Request Quote Change operation 2624 requests the change of the customer quote. The Notify of Quote Award operation 2626 notifies the bidder about supplier quote items for which the quotation from the bidder has been awarded, including extending the award, or about a rejection if the quotation from the bidder is not successful. The Quote Processing Out interface 2614 receives information from a Processing At Tenant In Web Services Reliable Messaging (WSRM) communication channel template 2660. The communication channel template 2660 can provide information from an external party about a purchase order confirmation.

The Request for Quote business object 2604 uses a Request Quote Maintenance from Request for Quote to Supplier outbound process agent 2628 when the Request for Quote business object 1004 is published, re-published or cancelled. The Request Quote Maintenance from Request for Quote to Supplier outbound process agent 2628 invokes the Request Quote Creation operation 2616 to send a Form RFQ Request message 2632, or an RFQ Request message 2634 to the Opportunity/Customer Quote Processing at Supplier process component 166. The Request Quote Maintenance from Request for Quote to Supplier outbound process agent 2628 can also invoke the Notify of Request for Quote Change operation 2618 to send a Form RFQ Change Request message 2638, or an RFQ Change Request message 2640 to the Opportunity/Customer Quote Processing at Supplier process component 166. The Request Quote Maintenance from Request for Quote to Supplier outbound process agent 2628 can also invoke the Notify of Request for Quote Cancellation operation 2620 to send an RFQ Cancellation Request message 2642 or a Form RFQ Cancellation Request message 2644 to the Opportunity/Customer Quote Processing at Supplier process component 166.

A Quote Notification message 2648 is received by a Maintain Supplier Quote operation 2622 that uses a Maintain Supplier Quote inbound process agent 2646 to create or update the Supplier Quote business object 1106.

The Supplier Quote business object 1106 uses a Notify of Supplier Quote to Supplier outbound process agent 2652 to invoke the Request Quote Change operation 2624 when a supplier quote is submitted. The Request Quote Change operation 2624 sends a RFQ Change Request message 2654 to the Opportunity/Customer Quote Processing at Supplier process component 166. The Notify of Supplier Quote to Supplier outbound process agent 2652 invokes the Notify of Quote Award operation 2626 when a supplier quote is submitted. The Notify of Quote Award operation 2626 sends an RFQ Result Notification message 2656, or a Form RFQ Result Notification message 2658 to the Opportunity/Customer Quote Processing at Supplier process component 166.

Interactions between Process Components "Accounting Coding Block Distribution Processing" and "Project Processing"

Figure 27:
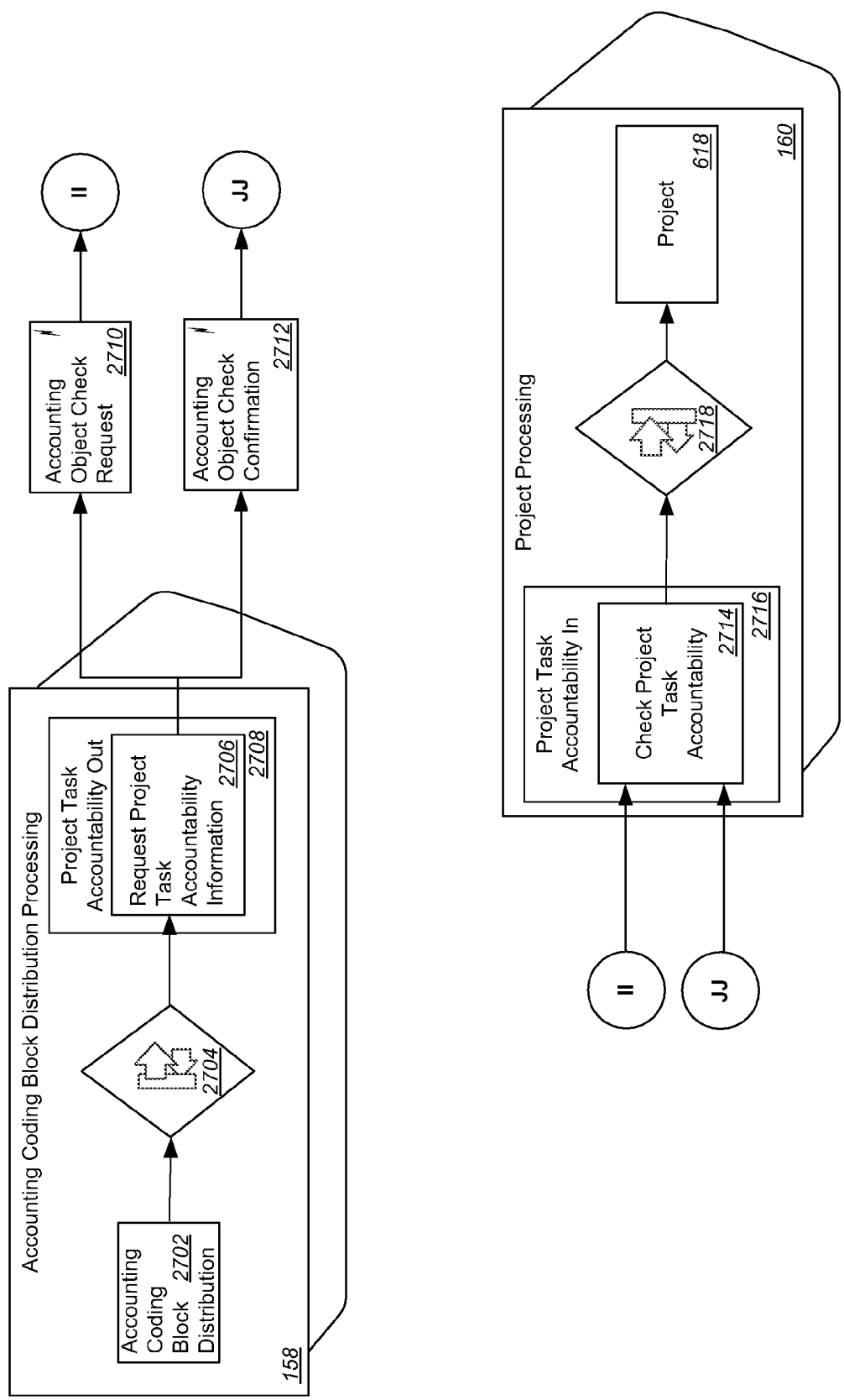
FIG. 27 is a block diagram showing example interactions between an Accounting Coding Block Distribution Processing process component and the Project Processing process component.

FIG. 27 is a block diagram showing example interactions between the Accounting Coding Block Distribution Processing process component 158 and the Project Processing process component 120 in the architectural design of FIG. 1.

As shown in FIG. 27, the Accounting Coding Block Distribution Processing process component 158 includes an Accounting Coding Block Distribution business object 2702. The Accounting Coding Block Distribution business object 2702 represents a distribution of coding blocks to enterprise resource changes, such as expenses or material movements. A Coding Block can be a set of accounting objects to which an enterprise resource change is assigned. The resource change can be assigned a value in an accounting process.

A Synchronous Request Project Task Accountability Information from Accounting Coding Block Distribution to Project Processing outbound process agent 2704 uses a Request Project Task Accountability Information operation 2706 to generate either an Accounting Object Check Request message 2710 or an Accounting Object Check Confirmation message 2712. The Request Project Task Accountability Information operation 2706 is included in a Project Task Accountability Out interface 2708. The operation 2706 can check given tasks for existence and availability for expense or resource assignment in financial accounting. The check can take place in the Project Processing process component 120.

A Check Project Task Accountability operation 2714 receives the Accounting Object Check Request message 2710 or the Accounting Object Check Confirmation message 2712. The operation 2714 is included in a Project Task Accountability In interface 2716, and can check whether a task can be posted for accounting. The operation 2714 uses a Synchronous Check Project Task Accountability inbound process agent 2718 to update the Project business object 618. The Project business object 618 represents a business undertaking with a defined goal that can be attained in a specified time frame. The business undertaking can be achieved using pre-defined funds and planned resources, while reaching an agreed quality level. The project can be characterized by the fact that it is unique, and that it involves an element of risk.

Interactions between Process Components "Supplier Invoice Processing" and "Balance of Foreign Payment Management"

Figure 28:
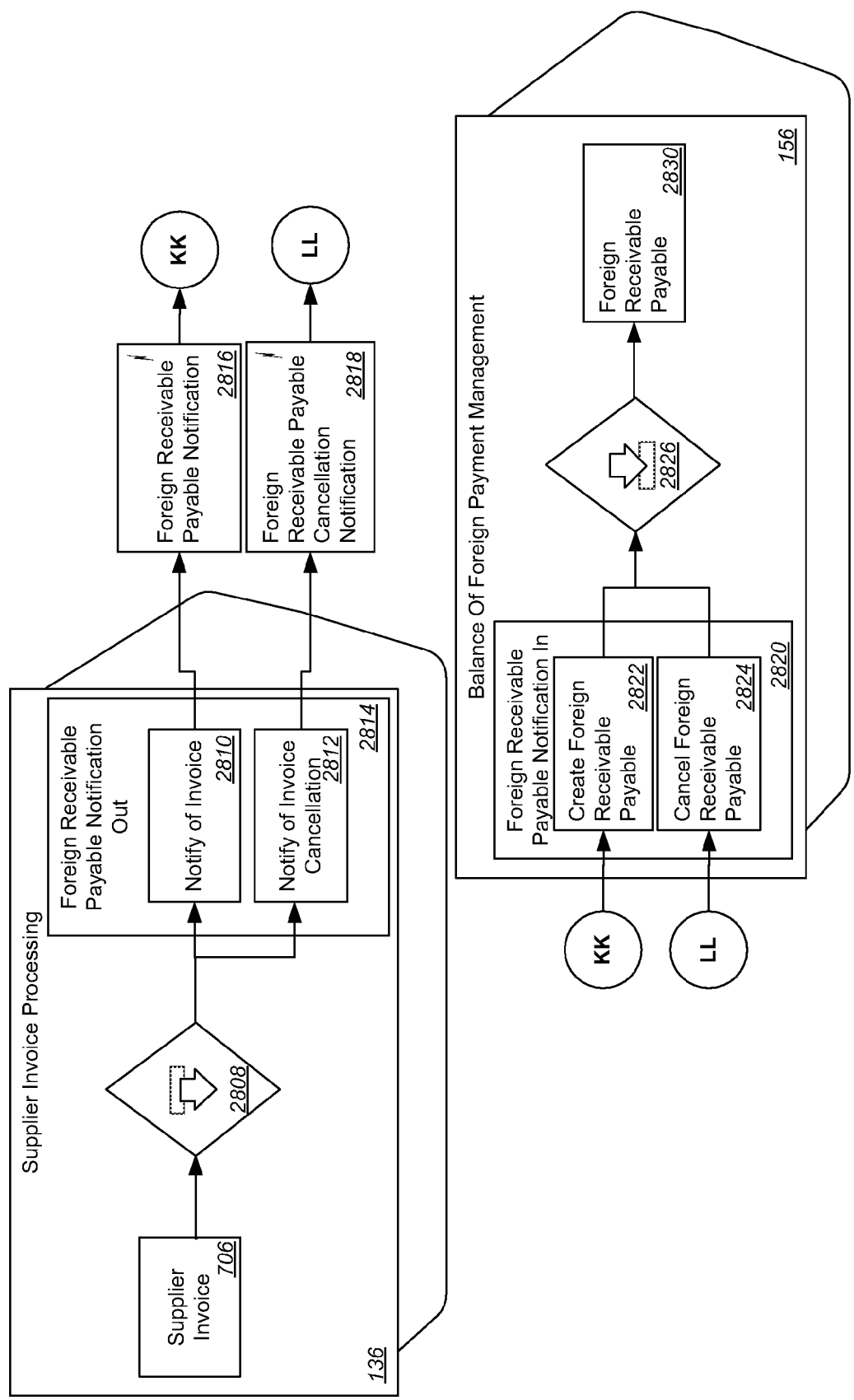
FIG. 28 is a block diagram showing example interactions between the Supplier Invoice Processing process component and a Balance of Foreign Payment Management process component.

FIG. 28 is a block diagram showing example interactions between a Supplier Invoice Processing process component 136 and a Balance Of Foreign Payment Management process component 156. The interaction starts when a supplier invoice is created or cancelled related to a non-resident seller. The Supplier Invoice Processing process component 136 can notify the Balance of Foreign Payments Management process component 156 about the creation or cancellation of a payable related to a non-resident seller.

As shown in FIG. 28, the Supplier Invoice Processing process component 136 includes a Supplier Invoice business object 706. The Supplier Invoice business object 706 represents a company's obligation to pay a supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 706 uses a Notify Supplier of Invoice to Balance of Foreign Payments Management outbound process agent 2808 to invoke a Notify of Invoice operation 2810. The operation 2810 notifies the Balance Of Foreign Payment Management process component 156 about the foreign receivables/payables of the supplier invoice. Alternatively, a Notify of Invoice Cancellation operation 2812 can be used to notify the process component 156 about the cancellation of a previously sent notification for foreign receivables/payables of the supplier invoice. Both operations are included in a Foreign Receivable Payable Notification Out interface 2814. The Notify of Invoice operation 710 generates a Foreign Receivable Payable Notification message 2816. The Notify of Invoice Cancellation operation 2812 generates a Foreign Receivable Payable Cancellation Notification message 2818.

The messages 2816 and 2818 are received by a Create Foreign Receivable Payable operation 2822 and a Cancel Foreign Receivable Payable operation 2824, respectively. The Foreign Receivable Payable operation 2822 creates a foreign receivable or payable. The Create Foreign Receivable Payable operation 2822 and the Cancel Foreign Receivable Payable operation 2824 are included in a Foreign Receivable Payable Notification In interface 2820.

Operations 2822 and 2824 use a Maintain Foreign Receivable Payable inbound process agent 2826 to create, change or cancel a foreign receivable or payable in a Foreign Receivable Payable business object 2830. The Foreign Receivable Payable business object 2830 represents a receivable from or payable to a non-resident business partner.

Interactions between Process Components "Customer Invoice Processing at Supplier" and "Supplier Invoice Processing"

Figure 29:
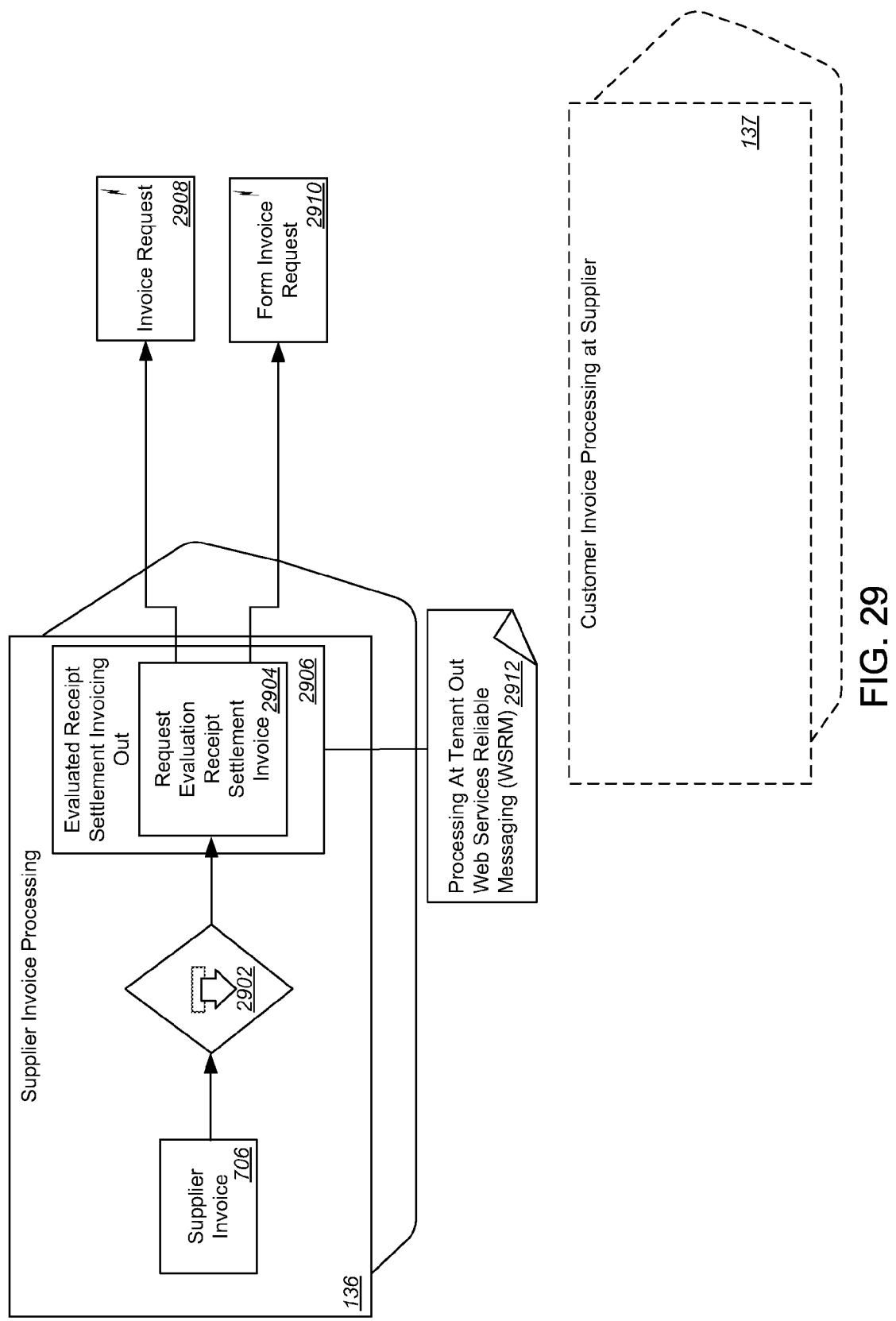
FIG. 29 is a block diagram showing example interactions between the Supplier Invoice Processing process component and a Customer Invoice Processing at Supplier process component.

FIG. 29 is a block diagram showing example interactions between the Supplier Invoice Processing process component 136 and the Customer Invoice Processing at Supplier process component 137 in the architectural design of FIG. 1. The interaction starts when a supplier invoice based on goods received or services rendered is created. The Supplier Invoice Processing process component 136 requests the creation of an invoice from the Customer Invoice Processing at Supplier process component 137.

As shown in FIG. 29, the Supplier Invoice Processing process component 136 includes the Supplier Invoice business object 706. The Supplier Invoice business object 706 represents a company's obligation to pay a supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 706 uses a Request Evaluated Receipt Settlement (ERS) Invoice to Supplier outbound process agent 2902 to invoke a Request ERS Invoice operation 2904. The operation 2904 can inform the seller party about a supplier invoice created by the buyer party using a credit memo procedure (e.g., Evaluated Receipt Settlement (ERS)). The process starts when an invoice which has been created from a business-to-business interface is posted (accepted) or deleted (rejected) and an answer is expected. The Request Evaluated Receipt Settlement Invoice operation 2904 is included in an Evaluated Receipt Settlement Invoicing Out interface 2906. The operation 2904 generates an Invoice Request message 2908 or a Form Invoice Request message 2910 which can both be sent to the Customer Invoice Processing at Supplier process component 137. The Evaluated Receipt Settlement Invoicing Out interface 2906 receives information from a Processing At Tenant Out Web Services Reliable Messaging (WSRM) communication channel template 2912. The communication channel template 2912 can define protocols and parameters used for communication with an external party.

Interactions between Process Components "Pricing Engine" and "External Tax Calculation"

Figure 30:
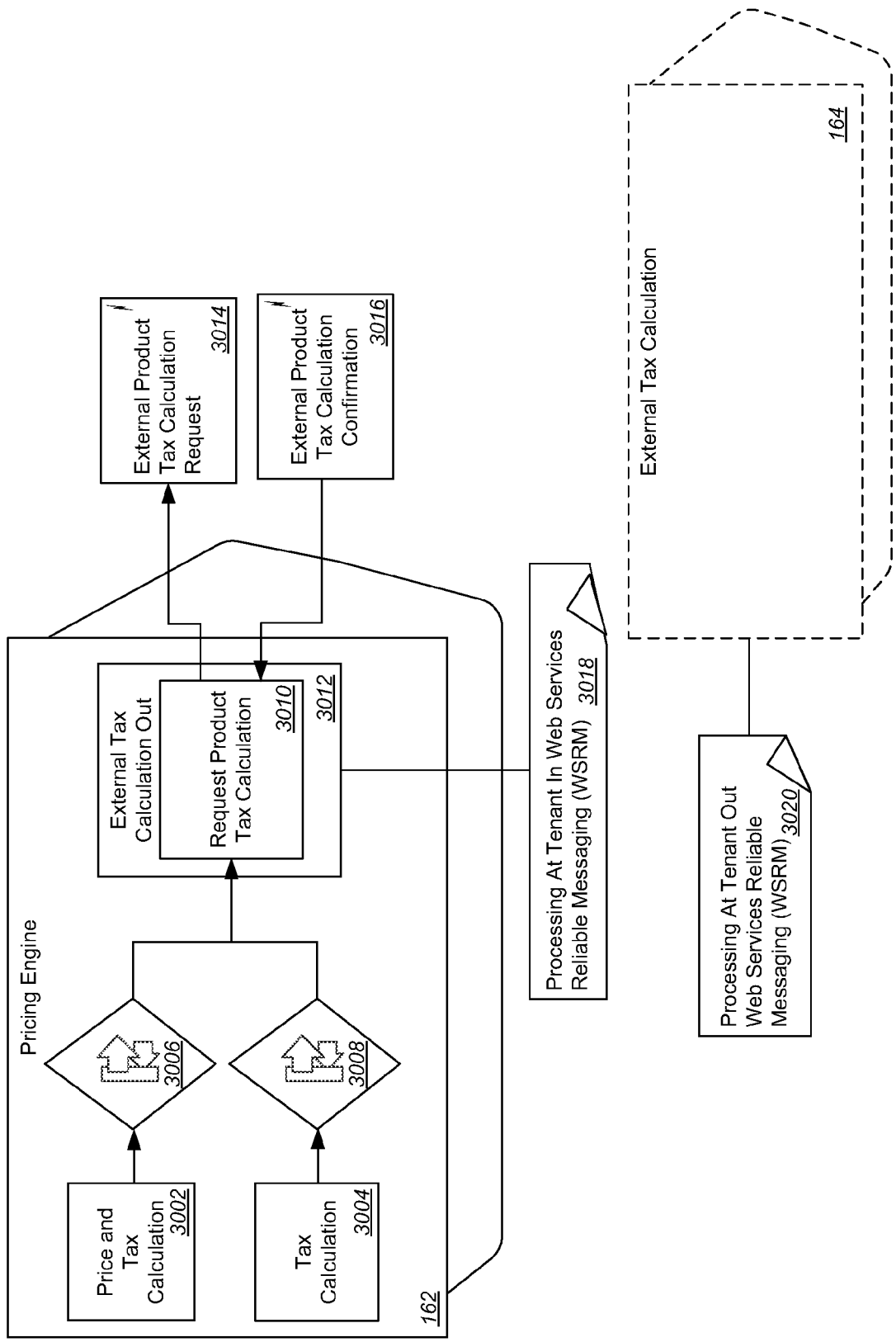
FIG. 30 is a block diagram showing example interactions between a Pricing Engine process component and an External Tax Calculation process component.

FIG. 30 is a block diagram showing example interactions between the Pricing Engine process component 162 and the External Tax Calculation process component 164 in the architectural design of FIG. 1. The interaction starts with the Pricing Engine process component 162 requesting a tax calculation from the External Tax Calculation process component 164.

As shown in FIG. 30, the Pricing Engine process component 162 includes a Price and Tax Calculation business object 3002 and a Tax Calculation business object 3004. The Price and Tax Calculation business object 3002 represents a summary of the determined price and tax components for a business case. The Tax Calculation business object 3004 represents a summary of the determined and calculated tax elements of a business case.

The Price and Tax Calculation business object 3002 uses a Synchronous Request Product Tax Calculation from Price and Tax Calculation to External Tax Calculation outbound process agent 3006 to invoke a Request Product Tax Calculation operation 3010. The Tax Calculation business object 3004 uses a Synchronous Request Product Tax Calculation from Tax Calculation to External Tax Calculation outbound process agent 3008 to invoke the Request Product Tax Calculation operation 3010 to calculate the product tax for a current document. The operation 3010 requests a product tax calculation from the External Tax Calculation process component 164. The Request Product Tax Calculation operation 3010 is included in an External Tax Calculation Out interface 3012. The Request Product Tax Calculation operation 3010 generates an External Product Tax Calculation Request message 3014 or an External Product Tax Calculation Confirmation message 3016. The messages 3014, 3016 can be received by the External Tax Calculation process component 164.

The External Tax Calculation Out interface 3012 receives information from a Processing At Tenant In Web Services Reliable Messaging (WSRM) communication channel template 3018. The communication channel template 3018 can provide information from an external party about a purchase order confirmation. The External Tax Calculation process component 164 receives information from a Processing At Tenant Out Web Services Reliable Messaging (WSRM) communication channel template 3020. The communication channel template 3020 can define protocols and parameters used for communication with an external party.

Interactions between Process Components "Time and Labor Management" and "Goods and Service Acknowledgement"

Figure 31:
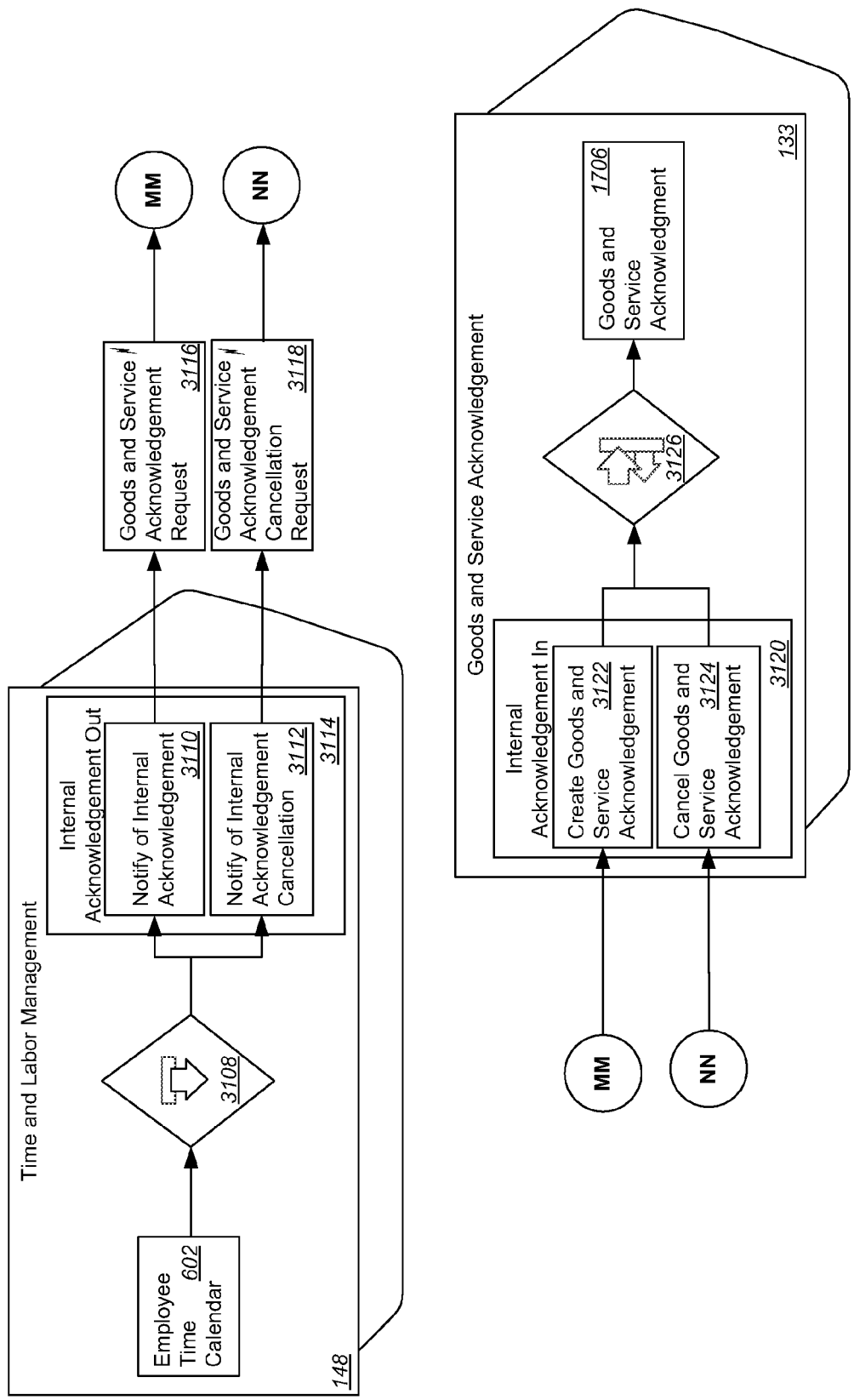
FIG. 31 is a block diagram showing example interactions between the Time and Labor Management process component and the Goods and Service Acknowledgement process component.

FIG. 31 is a block diagram showing example interactions between the Time and Labor Management process component 148 and the Goods and Service Acknowledgement process component 133 in the architectural design of FIG. 1. The interaction starts when a goods and service acknowledgement relevant employee time calendar item that represents a provided service of an external employee is created or canceled.

The Time and Labor Management process component 148 can request the creation or cancellation of a goods and service acknowledgement.

As shown in FIG. 31, the Time and Labor Management process component 148 includes the Employee Time Calendar business object 602. The Employee Time Calendar business object 602 represents a read-only calendar representation of time valuation results that are derived from the recorded times of an employee.

The Employee Time Calendar business object 602 uses a Notify of Internal Acknowledgement from Employee Time Confirmation to Goods and Service Acknowledgement (GSA) outbound process agent 3108 to invoke either a Notify of Internal Acknowledgement operation 3110 or a Notify of Internal Acknowledgement Cancellation operation 3112. The Notify of Internal Acknowledgement operation 3110 notifies the Goods and Service Acknowledgement process component 133 of a service provided by an external employee. The notification can be sent when an active employee time with goods and service acknowledgement relevant information is created, changed or cancelled. For example, an employee time calendar can include the derived data from the employee time that is sent. The Notify of Internal Acknowledgement Cancellation operation 3112 notifies the Goods and Service Acknowledgement process component 133 of the cancellation of an external provided service. The cancellation can be sent when an active employee time with goods and service acknowledgement relevant information is cancelled. For example, an employee time calendar can include the derived data from the employee time that is sent. The operations 3110 and 3112 are included in an Internal Acknowledgement Out interface 3114.

The Notify of Internal Acknowledgement operation 3110 generates a Goods and Service Acknowledgement Request message 3116. The Notify of Internal Acknowledgement Cancellation operation 3112 generates a Goods and Service Acknowledgement Request Cancellation message 3118.

The Goods and Service Acknowledgment Request message 3116 is received in a Create Goods and Service Acknowledgment operation 3122. The Goods and Service Acknowledgment Cancellation Request message 3118 is received in a Cancel Goods and Service Acknowledgment operation 3124. The Create Goods and Service Acknowledgement operation 3122 creates a goods and service acknowledgement based on time recording or express confirmation in internal request processing. The Cancel Goods and Service Acknowledgement operation 3124 cancels a goods and service acknowledgement based on a time recording cancellation. The operations 3122 and 3124 are included in an Internal Acknowledgement In interface 3120.

The operations 3122 and 3124 use a Maintain Goods and Service Acknowledgement based on Internal Acknowledgment inbound process agent 3126 to update the Goods and Service Acknowledgement business object 1706. The Goods and Service Acknowledgement business object 1706 represents a document that reports the receipt of goods and services.

Interactions between Process Components "Supplier Invoice Processing" and "Supplier Invoice Verification Exception Resolution at Processor"

Figure 32:
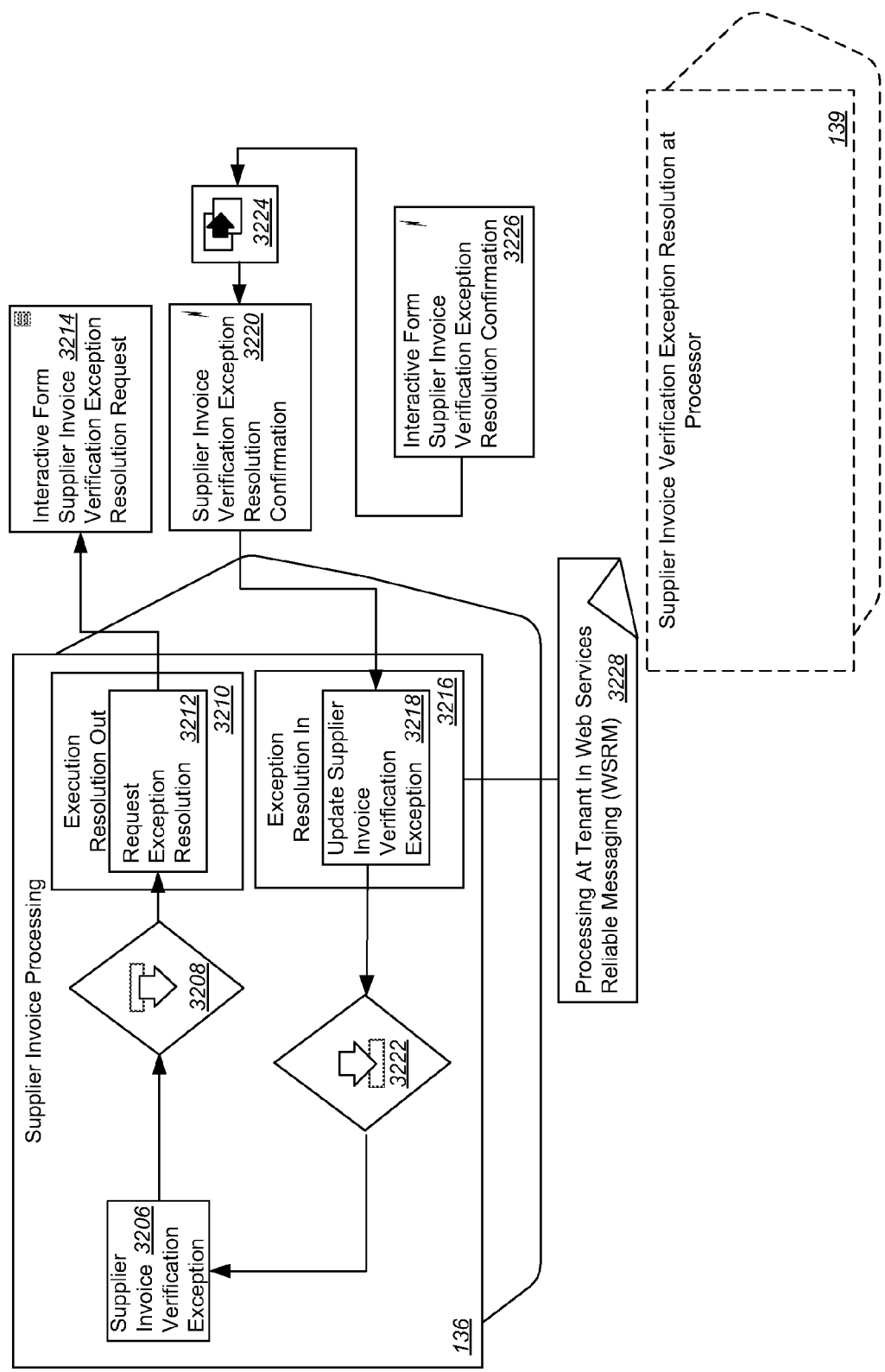
FIG. 32 is a block diagram showing example interactions between the Supplier Invoice Processing process component and a Supplier Invoice Verification Exception Resolution process component.

FIG. 32 is a block diagram showing example interactions between the Supplier Invoice Processing process component 136 and the Supplier Invoice Verification Exception Resolution at Processor process component 139 in the architectural design of FIG. 1.

As shown in FIG. 32, the Supplier Invoice Processing process component 136 includes a Supplier Invoice Verification Exception business object 3206. The Supplier Invoice Verification Exception business object 3206 represents a group of related issues arising during a supplier invoice verification process. In some implementations, the issues causing an exception can be bundled according to certain business criteria. A complex follow-up clarification process may be required to resolve the issues.

The Supplier Invoice Verification Exception business object 3206 uses a Request Resolution from Supplier Verification Exception to Processor outbound process agent 3208. The Request Resolution from Supplier Verification Exception to Processor outbound process agent 3208 invokes a Request Exception Resolution operation 3212 in an Exception Resolution Out interface 3210. The operation 3212 can request the resolution of a verification exception from an external party. The operation 3212 generates an Interactive Form Supplier Invoice Verification Exception Resolution Request message 3214 that can be received by the Supplier Invoice Verification Exception Resolution at Processor process component 139.

The Supplier Invoice Verification Exception Resolution at Processor process component 139 sends an Interactive Form Supplier Invoice Verification Exception Resolution Confirmation message 3226. The message 3226 uses a Mapping Entity 3224 to transform the interactive form-based message type to a Supplier Invoice Verification Exception Resolution Confirmation message 3220 that can be received by the Supplier Invoice Processing process component 136.

The Supplier Invoice Processing process component 136 includes an Exception Resolution In interface 3216. The interface 3216 includes an Update Supplier Invoice Verification Exception operation 3218. The Supplier Invoice Verification Exception Resolution Confirmation message 3220 is received by the Update Supplier Invoice Verification Exception operation 3218. The Update Supplier Invoice Verification Exception operation 3218 can update the Supplier Invoice Verification Exception business object 3206 according to changes made by an external party using an Update Supplier Invoice Verification Exception based on Resolution Confirmation inbound process agent 3222. The Exception Resolution In interface 3216 receives information from a Processing At Tenant In Web Services Reliable Messaging (WSRM) communication channel template 3228. The communication channel template 3228 can provide information from an external party about a purchase order confirmation.

Interactions between Process Components "Supplier Invoice Processing" and "Purchasing Contract Processing"

Figure 33:
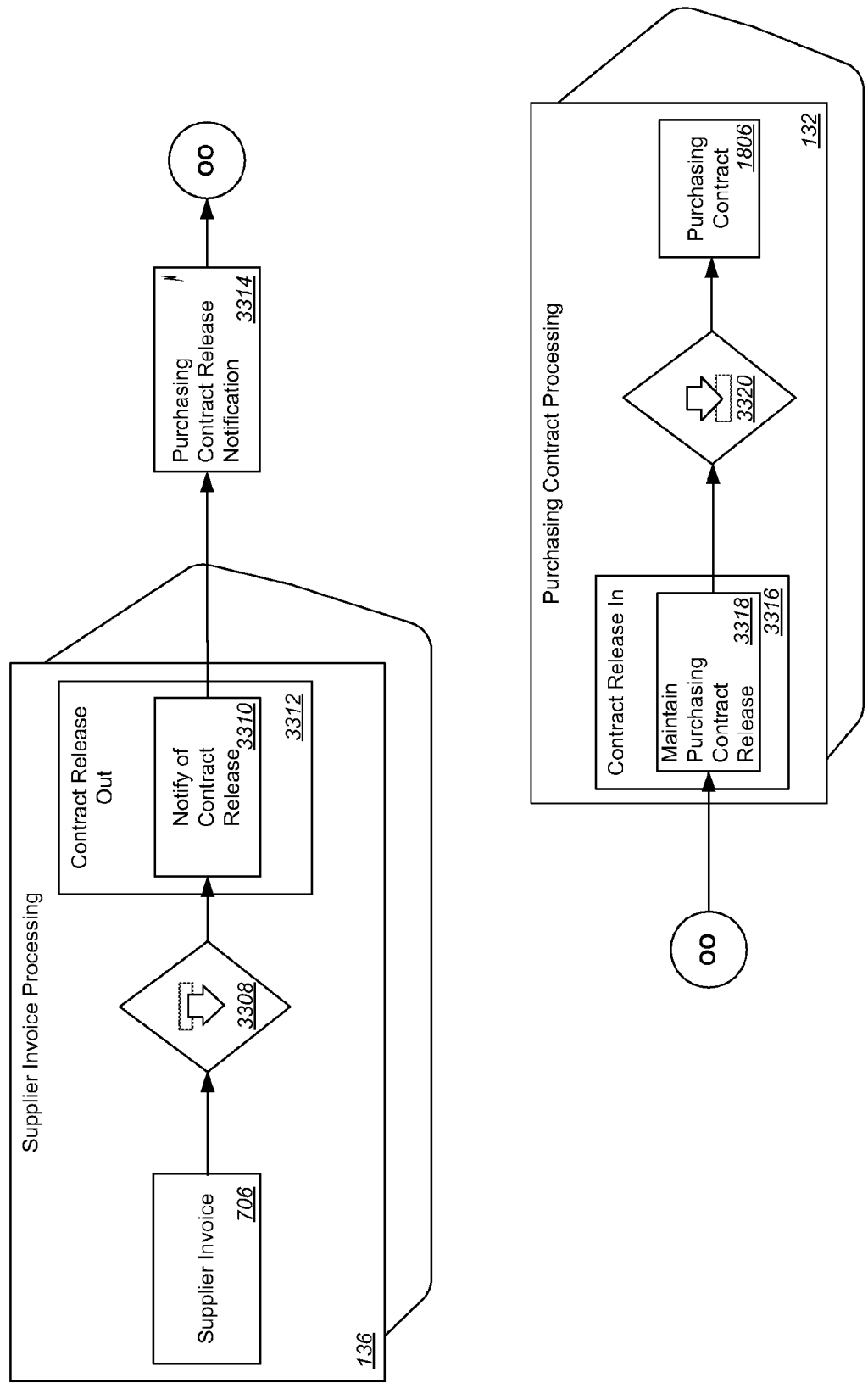
FIG. 33 is a block diagram showing example interactions between the Supplier Invoice Processing process component and a Purchasing Contract Processing process component.

FIG. 33 is a block diagram showing example interactions between the Supplier Invoice Processing process component 136 and the Purchasing Contract Processing process component 132 in the architectural design of FIG. 1. The interaction starts when a supplier invoice is created with reference to a purchasing contract. The Supplier Invoice Processing process component 136 notifies the Purchasing Contract Processing process component 132 of the release value and the release quantity made against the purchasing contract.

As shown in FIG. 33, the Supplier Invoice Processing process component 136 includes a Supplier Invoice business object 706. The Supplier Invoice business object 706 represents a company's obligation to pay a supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The business object 706 uses a Notify of Contract Release from Invoice to Purchasing Contract Processing outbound process agent 3308 to invoke a Notify of Contract Release operation 3310 when an invoice with reference to a purchasing contract and no reference to a purchase order has been posted The operation 3310 is included in a Contract Release Out interface 3312. The Notify of Contract Release operation 3310 informs the contract about the posting of a contract related invoice. The Notify of Contract Release operation 3310 generates a Purchasing Contract Release Notification message 3314 to notify the Purchasing Contract Processing process component 132 about a request or confirmation of a particular supplier invoice.

A Maintain Purchasing Contract Release operation 3318 receives the Purchasing Contract Release Notification message 3314. The operation 3318 can create or update releases in the purchasing contract. The operation 3318 is included in a Contract Releasing In interface 3316. The operation 3318 uses a Maintain Purchasing Contract Release inbound process agent 3320 to update the Purchasing Contract business object 1806. The business object 1806 represents a legally binding purchase agreement that can include special conditions that are negotiated between a buyer and a seller, covering goods to be supplied or services to be performed. The purchase agreement can be valid for a specific period, during which goods and services are released against the contract.

Interactions between Process Components "Purchase Order Processing" and "Time and Labor Management"

Figure 34:
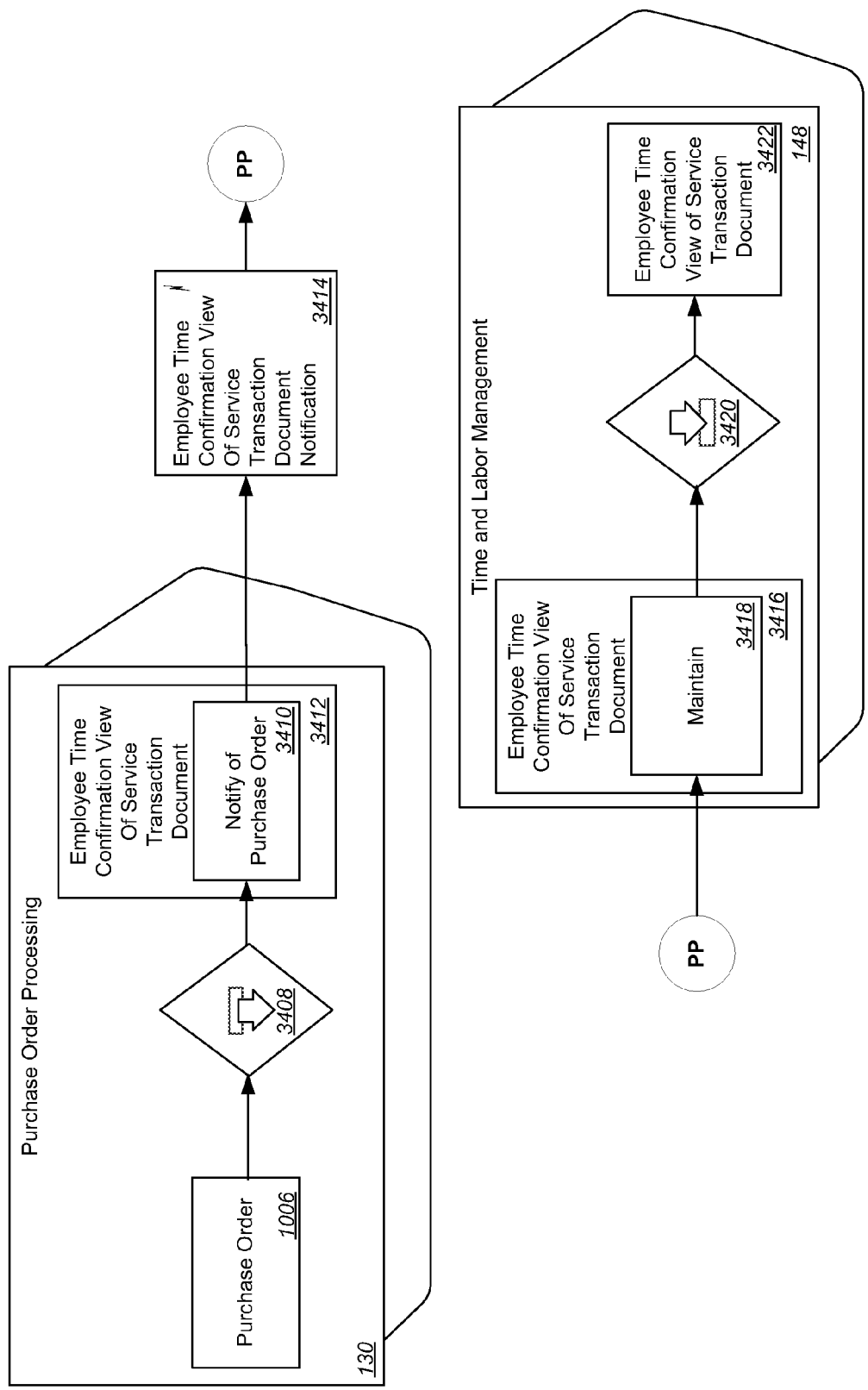
FIG. 34 is a block diagram showing example interactions between the Purchase Order Processing process component and the Time and Labor Management process component.

FIG. 34 is a block diagram showing example interactions between the Purchase Order Processing process component 130 and the Time and Labor Management process component 148 in the architectural design of FIG. 1. The interaction starts when a time confirmation relevant purchase order is created changed or canceled. The Time and Labor Management process component 148 is notified of purchase orders that can be used for time confirmations of external employees.

As shown in FIG. 34, the Purchase Order Processing process component 130 includes a Purchase Order business object 1006. The Purchase Order business object 1006 represents a request from a buyer to a seller to deliver a specified quantity of material, or perform a specified service, at a specified price within a specified time. The Purchase Order business object 1006 uses a Notify of Purchase Order to Time and Labor Management outbound process agent 3408 to invoke a Notify of Purchase Order operation 3410 when a purchase order has been created, changed or cancelled. The operation 3410 is included in an Employee Time Confirmation View Of Service Transaction Document Management Out interface 3412. The Notify of Purchase Order operation 3410 creates a notification about the created, changed or cancelled purchase order. The operation 3410 generates a Employee Time Confirmation View Of Service Transaction Document Notification message 3414 that is received by the Time and Labor Management process component 148.

The Time and Labor Management process component 148 includes an Employee Time Confirmation View Of Service Transaction Document Management In interface 3416. The interface 3416 includes a Maintain operation 3418 that creates, changes or deletes an employee time confirmation view of a service transaction document. The operation 3418 uses a Maintain Employee Time Confirmation View of Service Transaction Document inbound process agent 3420 to update an Employee Time Confirmation View of Service Transaction Document business object 3422. The Employee Time Confirmation View of Service Transaction Document business object 3422 represents a view of a business transaction document specifying sold or purchase services that are relevant for employee time confirmation.

Interactions between Process Components "Purchase Order Processing" and "Internal Request Processing"

Figure 35:
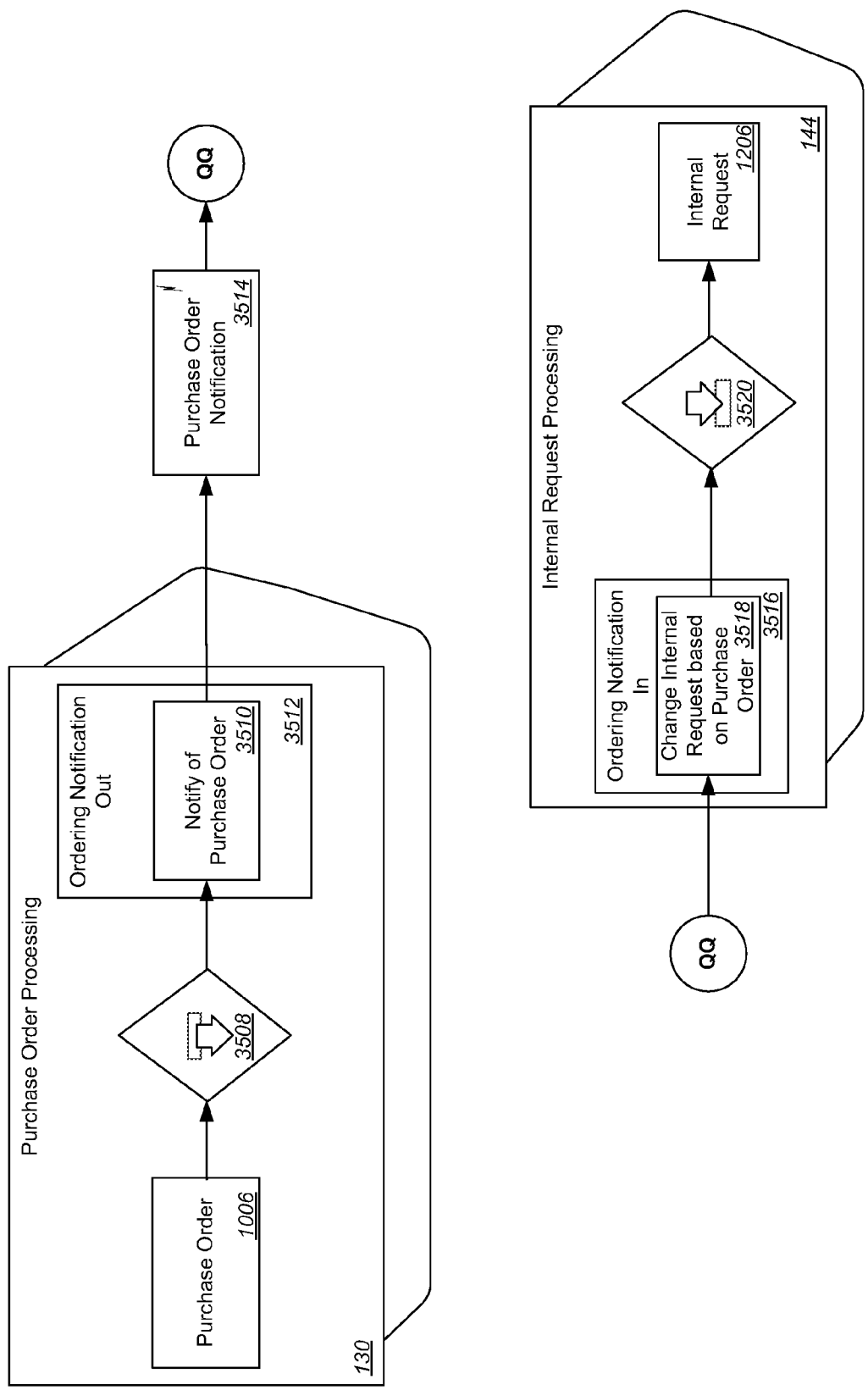
FIG. 35 is a block diagram showing example interactions between the Purchase Order Processing process component and an Internal Request Processing process component.

FIG. 35 is a block diagram showing example interactions between the Purchase Order Processing process component 130 and the Internal Request Processing process component 144 in the architectural design of FIG. 1.

As shown in FIG. 35, the Purchase Order Processing process component 130 includes a Purchase Order business object 1006. The Purchase Order business object 1006 represents a request from a buyer to a seller to deliver a specified quantity of material, or perform a specified service, at a specified price within a specified time. The Purchase Order business object 1006 uses a Notify of Purchase Order to Internal Request Processing outbound process agent 3508 to invoke a Notify of Purchase Order operation 3510 when a purchase order has been ordered, changed or cancelled and a purchase request was from internal request processing. The operation 3510 is included in an Ordering Notification Out interface 3512. The Notify of Purchase Order operation 3510 is a notification about a created, changed or cancelled purchase order. The operation 3512 generates a Purchase Order Notification message 3514 that is received by the Internal Request Processing process component 144.

The Internal Request Processing process component 144 includes an Ordering Notification In interface 3516. The interface 3516 includes a Change Internal Request based on Purchase Order operation 3518. The operation 3518 changes an internal request based on the notification of the buyer that informs the requester about the progress of procurement, and the meaning of changes to follow-on documents. For example, the creation of a goods and service acknowledgment can include the amount of received goods as well as the creation of supplier invoices.. The operation 3518 uses a Change Internal Request based on Purchase Order inbound process agent 3520 to update the Internal Request business object 1206. The Internal Request business object 1206 represents a request from an employee of a company for the procurement of goods or services for their own or for company use.

Interactions between Process Components "Payment Processing" and "Payment Processing at Business Partner"

Figure 36:
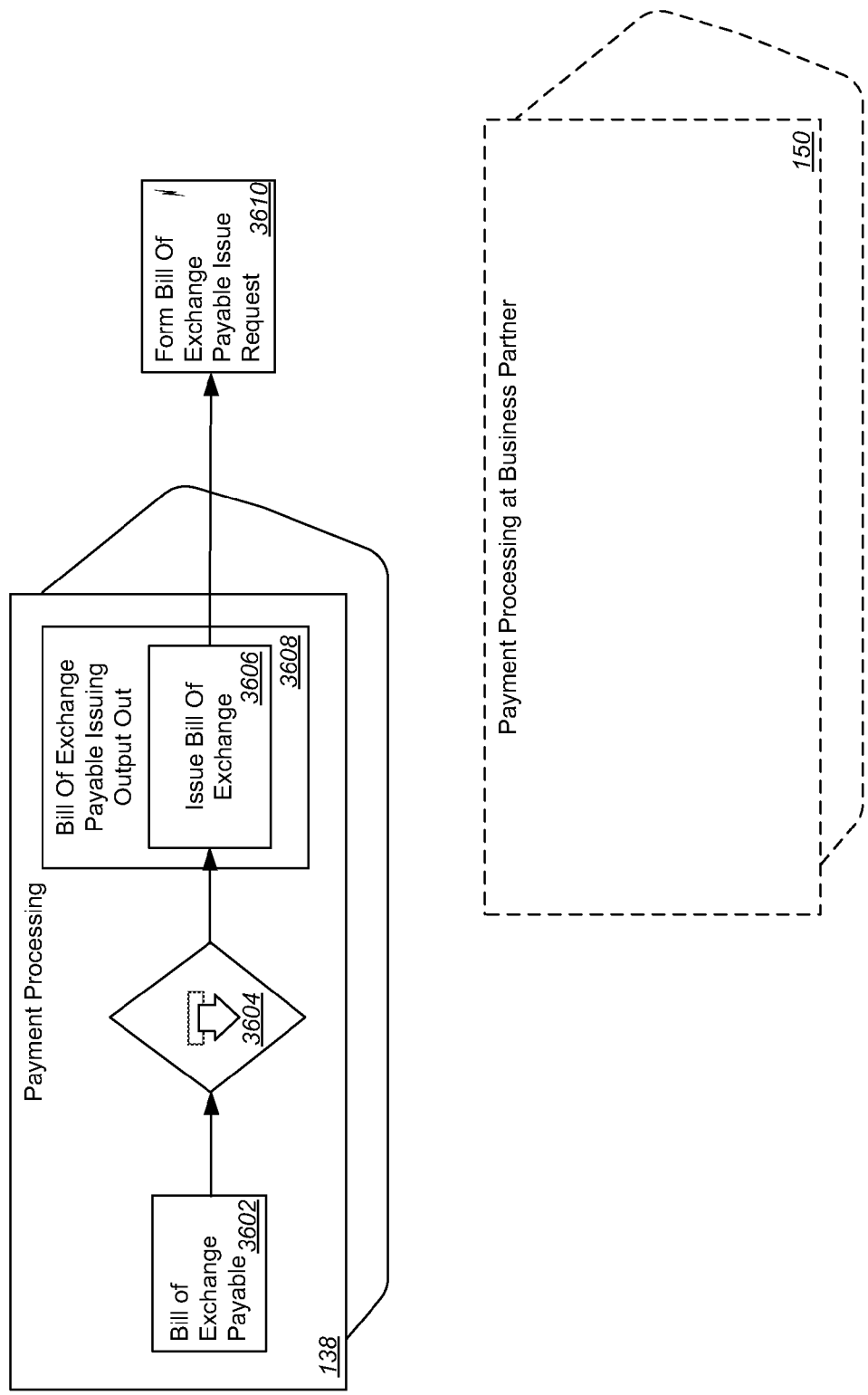
FIG. 36 is a block diagram showing example interactions between the Payment Processing process component and a Payment Processing at Business Partner process component related to a bill of exchange payable.

FIG. 36 is a block diagram showing example interactions between a Payment Processing process component 138 and a Payment Processing at Business Partner process component 150, related to a bill of exchange payable, in the architectural design of FIG. 1.

As shown in FIG. 36, the Payment Processing process component 138 includes a Bill Of Exchange Payable business object 3602. The Bill Of Exchange Payable business object 3602 represents a bill of exchange for an outgoing payment. The business object 3602 uses an Issue Bill Of Exchange Payable to Business Partner outbound process agent 3604 to invoke an Issue Bill Of Exchange operation 3606. The Issue Bill Of Exchange operation 3606 is included in a Bill Of Exchange Payable Issuing Output Out interface 3608. The Issue Bill Of Exchange operation 3606 can request the issuing of a bill of exchange. The Issue Bill Of Exchange operation 3606 generates a Form Bill Of Exchange Payable Issue Request message 3610 that is received by the Payment Processing at Business Partner process component 150.

Interactions between Process Components "Payment Processing" and "Payment Processing at Business Partner"

Figure 37:
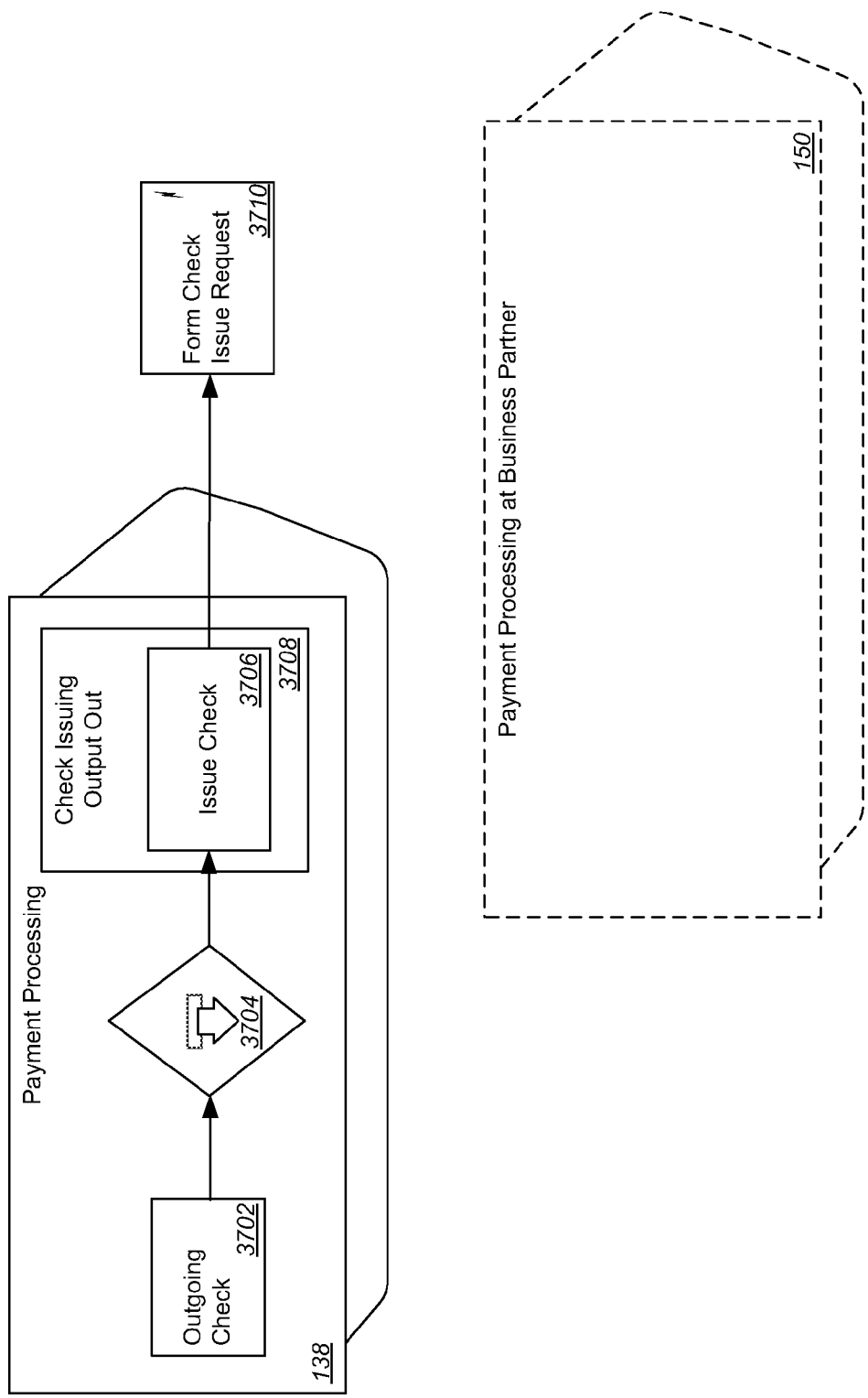
FIG. 37 is a block diagram showing example interactions between the Payment Processing process component and a Payment Processing at Business Partner process component related to an outgoing check.

FIG. 37 is a block diagram showing example interactions between a Payment Processing process component and a Payment Processing at Business Partner process component, related to an outgoing check, in the architectural design of FIG. 1. The interaction starts with the creation of an outgoing check from a payment order within the Payment Processing process component 138. The Payment Processing process component 138 prints an outgoing check that can be sent to the business partner.

As shown in FIG. 37, the Payment Processing process component 138 includes an Outgoing Check business object 3702. The Outgoing Check business object 3702 represents a check issued by a company payable to a business partner to fulfill a payment order. The business object 3702 uses an Issue Check From Outgoing Check to Business Partner outbound process agent 3704 to invoke an Issue Check operation 3706 when the status of an outgoing check changes to "issued" and internal printing of the check is requested. The Issue Check operation 3706 is included in a Check Issue Output Out interface 3708. The Issue Check operation 3706 can request the issuing of a check. The Issue Check operation 3706 generates a Form Check Issue Request message 3710 that is received by the Payment Processing at Business Partner process component 150.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer program product comprising instructions encoded on a non-transitory, computer-readable medium, the instructions being structured as process components interacting with each other through service interfaces, the instructions operable when executed by at least one processor to:
define a plurality of process components, each of the process components comprising a modular and application-independent package of reusable, granular software implementing a respective and distinct business process, the business process comprising functionality exposed by the process component via a corresponding service interface, the plurality of process components including:
a project processing process component that supports planning and execution of projects;
a purchase request processing process component that supports processing of purchase requests to locate appropriate external sources of supply;
a purchase order processing process component that supports creation and maintenance of purchase orders and purchase order confirmations;
a purchasing contract processing process component that supports creation and maintenance of purchasing contracts;
a goods and service acknowledgement process component that supports confirmation by an employee of goods received or services rendered;
an request for quote (RFQ) processing process component that supports processing of requests for quotes and supplier quotes; and
a time and labor management process component that supports management of employees timekeeping and work planning; and
define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:
the purchase request processing process component and the project processing process component, where the pair-wise interaction between the purchase request processing process component and the project processing process component includes the transmission of:
a purchase request notification message from the purchase request processing process component to the project processing process component, the purchase request notification message comprising a notification to the project processing process component regarding purchase requests having project accounting information;

the purchase request processing process component and the RFQ Processing process component, where the pair-wise interaction between the purchase request processing process component and the RFQ Processing process component includes the transmission of:
an RFQ execution request message from the purchase request processing process component and the RFQ Processing process component, the RFQ execution request message comprising a request to create an RFQ request from business documents associated with a bidding or negotiation process; and
an RFQ execution confirmation message from the RFQ processing process component to the purchase request processing process component, the RFQ execution confirmation message comprising a confirmation message of execution of an RFQ in response to the RFQ execution request message;
the time and labor management process component and the project processing process component, where the pair-wise interaction between the time and labor management process component and the project processing process component includes the transmission of:
a project task confirmation notification message from the time and labor management process component to the project processing process component, the project task confirmation notification message comprising a notification indicating when an active employee time item with project relevant information is created, changed or cancelled;
the project processing process component and the purchase request processing process component, where the pair-wise interaction between the project processing process component and the purchase request processing process component includes the transmission of:
a purchase request request message from the project processing process component to the purchase request processing process component, the purchase request request message comprising a request for procurement of goods and/or services to the purchase request processing process component; and
a purchase request confirmation message from the purchase request processing process component to the project processing process component, the purchase request confirmation message comprising a confirmation from purchasing about the degree to which a prior purchase request is fulfilled;
the purchase order processing process component and the project processing process component, where the pair-wise interaction between the purchase order processing process component and the project processing process component includes the transmission of:
a purchase order notification message from the purchase order processing process component to the project processing process component, the purchase order notification message comprising a notification of a creation, change, or cancellation of a purchase order;
the RFQ processing process component and the purchase order processing process component, where the pair-wise interaction between the RFQ processing process component and the purchase order processing process component includes the transmission of:
a supplier quote award notification message from the RFQ processing process component to the purchase order processing process component, the supplier quote award notification message comprising a notification and request for a purchase order based on the awarded respective winning supplier quote;

the project processing process component and the time and labor management process component, where the pair-wise interaction between the project processing process component and the time and labor management process component includes the transmission of:

an employee time confirmation view of project notification message from the project processing process component to the time and labor management process component, the employee time confirmation view of project notification message comprising a notification message providing information about tasks and assigned employees in a particular project;

the time and labor management process component and the goods and service acknowledgement process component, where the pair-wise interaction between the time and labor management process component and the goods and service acknowledgement process component includes the transmission of:

a goods and service acknowledgement request message from the time and labor management process component to the goods and service acknowledgement process component, the goods and service acknowledgment request message comprising a notification sent when an active employee time with goods and service acknowledgement relevant information is created, changed or cancelled; and a goods and service acknowledgement cancellation request message from the time and labor management process component to the goods and service acknowledgement process component, where the goods and service acknowledgement cancellation request message comprises a notification sent when an active employee time with goods and service acknowledgement relevant information is cancelled; and the purchase order processing process component and the time and labor management process component, where the pair-wise interaction between the purchase order processing process component and the time and labor management process component includes the transmission of:

an employee time confirmation view of service transaction document notification message from the purchase order processing process component to the time and labor management process component, the employee time confirmation view confirmation view of service transaction document notification message comprising a notification about a created, changed or cancelled purchase order to the time and labor management process component.

2. The product of claim 1, wherein:

the plurality of process components further includes:

a source of supply and determination process component that handles the maintenance of and access to sources of supply and quota arrangements for external and internal procurement processes;

a due item processing process component that handles the collection, management, and monitoring of trade receivables or payables and corresponding sales tax or withholding tax;

a balance of foreign payment management process component that handles the collection, processing, and reporting of receivables and payables according to foreign trade regulations that are required by central banks to create the balance of payments of a country;

a pricing engine process component that handles the processing of price and tax calculations;

an accounting coding block distribution processing process component that handles the registration and checking of all accounting objects that can be assigned in a source document for a business transaction, such as cost center or project, as well as the dispatching of a check request;

a payment processing process component that handles the processing and management of all payments as well as associated communications with financial institutions and provides input for liquidity management;

an accounting process component that handles the representation of all relevant business transactions for valuation and profitability analysis;

a supplier invoice processing process component that handles the management and volume processing of supplier invoices, including exception handling and approval;

an internal request processing process component that handles the management and processing of internal requests from employees; and wherein:

the pair-wise interactions between pairs of the process components further include interactions between:

a bank statement creation at bank process component and the payment processing process component;

the supplier invoice processing process component and the due item processing process component;

the payment processing process component and a payment processing at business partner process component;

the internal request processing process component and the purchase request processing process component;

the due item processing process component and the payment processing process component;

the payment processing process component and a payment order processing at house bank process component;

a customer invoice processing at supplier process component and the supplier invoice processing process component;

the due item processing process component and the accounting process component;

the goods and service acknowledgement process component and the accounting process component;

the purchasing contract processing process component and the supplier invoice processing process component;

the supplier invoice processing process component and the accounting process component;

the purchase order processing process component and the supplier invoice processing process component;

the goods and service acknowledgement process component and the supplier invoice processing process component;

the purchase order processing process component and the accounting process component;

the payment processing process component and the accounting process component;

the purchase order processing process component and a sales order processing at supplier process component;

the RFQ processing process component and an opportunity/customer quote processing at supplier process component;
the accounting coding block distribution processing process component and the project processing process component;
the supplier invoice processing process component and the balance of foreign payment management process component;
the supplier invoice processing process component and the customer invoice processing at supplier process component;
the pricing engine process component and an external tax calculation process component;
the supplier invoice processing process component and a supplier invoice verification exception resolution process component;
the supplier invoice processing process component and the purchasing contract processing process component;
the purchase order processing process component and the internal request processing process component;
the payment processing process component and the payment processing at business partner process component related to the bill of exchange payable; and
the payment processing process component and the payment processing at business partner process component related to the outgoing check.

3. The product of claim 1, wherein:
each of the plurality of process components is associated with exactly one deployment unit among a plurality of deployment units, and each deployment unit is deployable on a separate computer hardware platform independent of every other deployment unit; and
all interaction between a process component in one deployment unit and any other process component in any other deployment unit takes place through the respective service interfaces of the two process components.

4. The product of claim 3, wherein the deployment units comprise:
a financial accounting deployment unit that includes the accounting process component;
a project management deployment unit that includes the project processing process component;
a purchasing deployment unit that includes the purchase request processing process component, the purchase order processing process component, the purchasing contract process component, and the goods and service acknowledgement process component;
a supplier invoicing deployment unit that includes the supplier invoice processing process component;
a payment deployment unit that includes the payment process component;
a strategic sourcing processing deployment unit that includes the RFQ processing process component;
a due item management deployment unit that includes the due item processing process component, and the balance of foreign payment management processing component;
a requisitioning deployment unit that includes the internal request processing process component; and
a human capital management deployment unit that includes the time and labor management process component.

5. The product of claim 1, wherein:
each of the process components includes one or more business objects; and
none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, at least a subset of the process components including at least one process agent, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start execution of a business process step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system comprising:
a computer system comprising at least one hardware platform for executing computer instructions, the computer instructions structured as a plurality of process components interacting with each other through service interfaces, each hardware platform including at least one processor for executing the computer instructions;
memory storing a plurality of process components executable by the respective at least one processor of the particular hardware platform, each of the process components comprising a modular and application-independent package of reusable, granular software implementing a respective and distinct business process, the business process comprising functionality exposed by the process component via at least one service interface, the plurality of process components including:
a project processing process component that supports planning and execution of projects;
a purchase request processing process component that supports processing of purchase requests to locate appropriate external sources of supply;
a purchase order processing process component that supports creation and maintenance of purchase orders and purchase order confirmations;
a purchasing contract processing process component that supports creation and maintenance of purchasing contracts;
a goods and service acknowledgement process component that supports confirmation by an employee of goods received or services rendered;
an RFQ processing process component that supports processing of requests for quotes and supplier quotes; and
a time and labor management process component that supports management of employees timekeeping and work planning; and
the memory further storing a plurality of service interfaces, each service interface associated with exactly one process component and comprising at least one operation, each being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based, pair-wise interaction between the respective process components of the respective operations, the pair the purchase request processing process component and the project processing process component, where the pair-wise interaction between the purchase request processing process component and the project processing process component includes the transmission of:
  a purchase request notification message from the purchase request processing process component to the project processing process component, the purchase request notification message comprising a notification to the project processing process component regarding purchase requests having project accounting information;

the purchase request processing process component and the RFQ Processing process component, where the pair-wise interaction between the purchase request processing process component and the RFQ Processing process component includes the transmission of:
  an RFQ execution request message from the purchase request processing process component and the RFQ Processing process component, the RFQ execution request message comprising a request to create an RFQ request from business documents associated with a bidding or negotiation process; and
  an RFQ execution confirmation message from the RFQ processing process component to the purchase request processing process component, the RFQ execution confirmation message comprising a confirmation message of execution of an RFQ in response to the RFQ execution request message;

the time and labor management process component and the project processing process component, where the pair-wise interaction between the time and labor management process component and the project processing process component includes the transmission of:
  a project task confirmation notification message from the time and labor management process component to the project processing process component, the project task confirmation notification message comprising a notification indicating when an active employee time item with project relevant information is created, changed or cancelled;

the project processing process component and the purchase request processing process component, where the pair-wise interaction between the project processing process component and the purchase request processing process component includes the transmission of:
  a purchase request request message from the project processing process component to the purchase request processing process component, the purchase request request message comprising a request for procurement of goods and/or services to the purchase request processing process component; and
  a purchase request confirmation message from the purchase request processing process component to the project processing process component, the purchase request confirmation message comprising a confirmation from purchasing about the degree to which a prior purchase request is fulfilled;

the purchase order processing process component and the project processing process component, where the pair-wise interaction between the purchase order processing process component and the project processing process component includes the transmission of:
  a purchase order notification message from the purchase order processing process component to the project processing process component, the purchase order notification message comprising a notification of a creation, change, or cancellation of a purchase order;

the RFQ processing process component and the purchase order processing process component, where the pair-wise interaction between the RFQ processing process component and the purchase order processing process component includes the transmission of:
  a supplier quote award notification message from the RFQ processing process component to the purchase order processing process component, the supplier quote award notification message comprising a notification and request for a purchase order based on the awarded respective winning supplier quote;

the project processing process component and the time and labor management process component, where the pair-wise interaction between the project processing process component and the time and labor management process component includes the transmission of:
  an employee time confirmation view of project notification message from the project processing process component to the time and labor management process component, the employee time confirmation view of project notification message comprising a notification message providing information about tasks and assigned employees in a particular project;

the time and labor management process component and the goods and service acknowledgement process component, where the pair-wise interaction between the time and labor management process component and the goods and service acknowledgement process component includes the transmission of:
  a goods and service acknowledgement request message from the time and labor management process component to the goods and service acknowledgement process component, the goods and service acknowledgment request message comprising a notification sent when an active employee time with goods and service acknowledgement relevant information is created, changed or cancelled; and
  a goods and service acknowledgement cancellation request message from the time and labor management process component to the goods and service acknowledgement process component, where the goods and service acknowledgement cancellation request message comprises a notification sent when an active employee time with goods and service acknowledgement relevant information is cancelled; and the purchase order processing process component and the time and labor management process component, where the pair-wise interaction between the purchase order processing process component and the time and labor management process component includes the transmission of:
  an employee time confirmation view of service transaction document notification message from the purchase order processing process component to the time and labor management process component, the employee time confirmation view confirmation view of service transaction document notification message comprising a notification about a created, changed or cancelled purchase order to the time and labor management process component.

13. The system of claim 12, wherein:
the plurality of process components further includes:
 a source of supply and determination process component that handles the maintenance of and access to sources of supply and quota arrangements for external and internal procurement processes;
 a due item processing process component that handles the collection, management, and monitoring of trade receivables or payables and corresponding sales tax or withholding tax;
 a balance of foreign payment management process component that handles the collection, processing, and reporting of receivables and payables according to foreign trade regulations that are required by central banks to create the balance of payments of a country;
 a pricing engine process component that handles the processing of price and tax calculations;
 an accounting coding block distribution processing process component that handles the registration and checking of all accounting objects that can be assigned in a source document for a business transaction, such as cost center or project, as well as the dispatching of a check request;
 a payment processing process component that handles the processing and management of all payments as well as associated communications with financial institutions and provides input for liquidity management;
 an accounting process component that handles the representation of all relevant business transactions for valuation and profitability analysis;
 a supplier invoice processing process component that handles the management and volume processing of supplier invoices, including exception handling and approval;
 an internal request processing process component that handles the management and processing of internal requests from employees; and wherein
the pair-wise interactions between pairs of the process components further include interactions between:
 a bank statement creation at bank process component and the payment processing process component;
 the supplier invoice processing process component and the due item processing process component;
 the payment processing process component and a payment processing at business partner process component;
 the internal request processing process component and the purchase request processing process component;
 the due item processing process component and the payment processing process component;
 the payment processing process component and a payment order processing at house bank process component;
 a customer invoice processing at supplier process component and the supplier invoice processing process component;
 the due item processing process component and the accounting process component;
 the goods and service acknowledgement process component and the accounting process component;
 the purchasing contract processing process component and the supplier invoice processing process component;
 the supplier invoice processing process component and the accounting process component;
 the purchase order processing process component and the supplier invoice processing process component;
 the goods and service acknowledgement process component and the supplier invoice processing process component;
 the purchase order processing process component and the accounting process component;
 the payment processing process component and the accounting process component;
 the purchase order processing process component and a sales order processing at supplier process component;
 the RFQ processing process component and an opportunity/customer quote processing at supplier process component;
 the accounting coding block distribution processing process component and the project processing process component;
 the supplier invoice processing process component and the balance of foreign payment management process component;
 the supplier invoice processing process component and the customer invoice processing at supplier process component;
 the pricing engine process component and an external tax calculation process component;
 the supplier invoice processing process component and a supplier invoice verification exception resolution process component;
 the supplier invoice processing process component and the purchasing contract processing process component;
 the purchase order processing process component and the internal request processing process component;
 the payment processing process component and the payment processing at business partner process component related to the bill of exchange payable; and
 the payment processing process component and the payment processing at business partner process component related to the outgoing check.

14. The system of claim 12, wherein:
each of the process components includes one or more business objects; and
none of the business objects of any one of the process components interacts directly with any of the business objects included in any of the other process components.

15. The system of claim 12, wherein none of the business objects included in any one of the process components is included in any of the other process components.

16. The system of claim 12, wherein at least a subset of the process components includes at least one process agent, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

17. The system of claim 12, the system comprising multiple hardware platforms, wherein:
 the project processing process component is deployed on a first hardware platform;

the purchase request processing process component, the purchase order processing process component, the purchasing contract processing process component, and the goods and service acknowledgement process component are deployed on a second hardware platform;

the supplier invoice processing process component is deployed on a third hardware platform;

the RFQ processing process component is deployed on a fourth hardware platform;

the time and labor management process component is deployed on a fifth hardware platform;

the internal request processing process component is deployed on a sixth hardware platform;

the due item processing process component and the balance of foreign payment management process component are deployed on a seventh hardware platform;

the accounting process component is deployed on an eighth hardware platform; and the payment processing process component is deployed on an ninth hardware platform.

18. The system of claim 17, wherein each of the first through the ninth hardware platforms are distinct and separate from each other.

* * * * *